(12) United States Patent  
Bharathwaj et al.

(10) Patent No.: US 12,495,739 B2
(45) Date of Patent: Dec. 16, 2025

(54) AGRICULTURAL TOOL AND PROCESS

(71) Applicant: KUBOTA CORPORATION, Osaka (JP)

(72) Inventors: Sai Bharathwaj, Bangalore (IN); Ridhwan Luthra, Bangalore (IN); Suhas Prabhu, Bangalore (IN); Shan Wan, Fremont, CA (US); Pius Ng, Fremont, CA (US); Srikanth Kadiyala, Fremont, CA (US); Anattasakul Roatchanatam, Fremont, CA (US)

(73) Assignee: KUBOTA CORPORATION, Osaka (JP)

( * ) Notice: Subject to any disclaimer, the term of this patent is extended or adjusted under 35 U.S.C. 154(b) by 190 days.

(21) Appl. No.: 18/379,631

(22) Filed: Oct. 12, 2023

(65) Prior Publication Data

US 2024/0281997 A1   Aug. 22, 2024

Related U.S. Application Data

(60) Provisional application No. 63/447,471, filed on Feb. 22, 2023.

(51) Int. Cl.
*A01D 46/30* (2006.01)
*A01D 46/253* (2006.01)
*A01G 17/08* (2006.01)
*G06T 7/11* (2017.01)
*G06T 7/50* (2017.01)
(Continued)

(52) U.S. Cl.
CPC .......... *A01D 46/30* (2013.01); *A01D 46/253* (2013.01); *A01G 17/085* (2013.01); *G06T 7/11* (2017.01); *G06T 7/50* (2017.01); *G06T 7/593* (2017.01); *G06T 7/73* (2017.01); *G06V 10/26* (2022.01); *G06V 10/44* (2022.01); *G06V 10/774* (2022.01); *G06V 20/188* (2022.01); *G06T 2207/10028* (2013.01); *G06T 2207/20081* (2013.01); *G06T 2207/30188* (2013.01)

(58) Field of Classification Search
None
See application file for complete search history.

(56) References Cited

U.S. PATENT DOCUMENTS

2023/0399136 A1* 12/2023 Budu .................. B25J 9/0084
2024/0373787 A1* 11/2024 Robertson ............ A01D 46/30

OTHER PUBLICATIONS

Noguchi et al., "research on Multi-Cutter Robotic Hand for Smart Vineyard", The 65th Japan Joint Automatic Control Conference, Dec. 15, 2022, pp. 241-245 (Year: 2022).*

(Continued)

*Primary Examiner* — Jelani A Smith
*Assistant Examiner* — Davin Seol
(74) *Attorney, Agent, or Firm* — Keating & Bennett, LLP

(57) ABSTRACT

A method includes generating an image, segmenting the image to identify a component of an agricultural item, detecting one or more agricultural features of the agricultural item based on the image, the one or more agricultural features being associated with the component of the agricultural item, generating a two-dimensional grab-point based on the component of the agricultural item and the one or more agricultural features, and generating a three-dimensional grab-point based on the two-dimensional grab-point and a depth estimation of the agricultural item.

17 Claims, 50 Drawing Sheets
(2 of 50 Drawing Sheet(s) Filed in Color)

(51) Int. Cl.
    *G06T 7/593*     (2017.01)
    *G06T 7/73*     (2017.01)
    *G06V 10/26*     (2022.01)
    *G06V 10/44*     (2022.01)
    *G06V 10/774*     (2022.01)
    *G06V 20/10*     (2022.01)

(56) References Cited

OTHER PUBLICATIONS

Hiramatsu et al., "Grape Harvesting Robot", Journal of the Robotics Society of Japan, vol. 39 No. 10, Dec. 16, 2021, pp. 896-900 (Year: 2021).*
Bharathwaj et al., "Agricultural Cutting System and Cut-Point Method", U.S. Appl. No. 18/379,630, filed Oct. 12, 2023.
Ng et al., "Agricultural Cutting System and Cut-Point Method", U.S. Appl. No. 18/379,632, filed Oct. 12, 2023.
Official Communication issued in International Patent Application No. PCT/IB2024/051551, mailed on Apr. 2, 2024.
Noguchi et al., "Research on Multi-Cutter Robotic Hand for Smart Vineyard", The 65th Japan Joint Automatic Control Conference, Dec. 15, 2022, pp. 241-245.
Hiramatsu et al., "Grape Harvesting Robot", Journal of the Robotics Society of Japan, vol. 39 No. 10, Dec. 16, 2021, pp. 896-900.

* cited by examiner

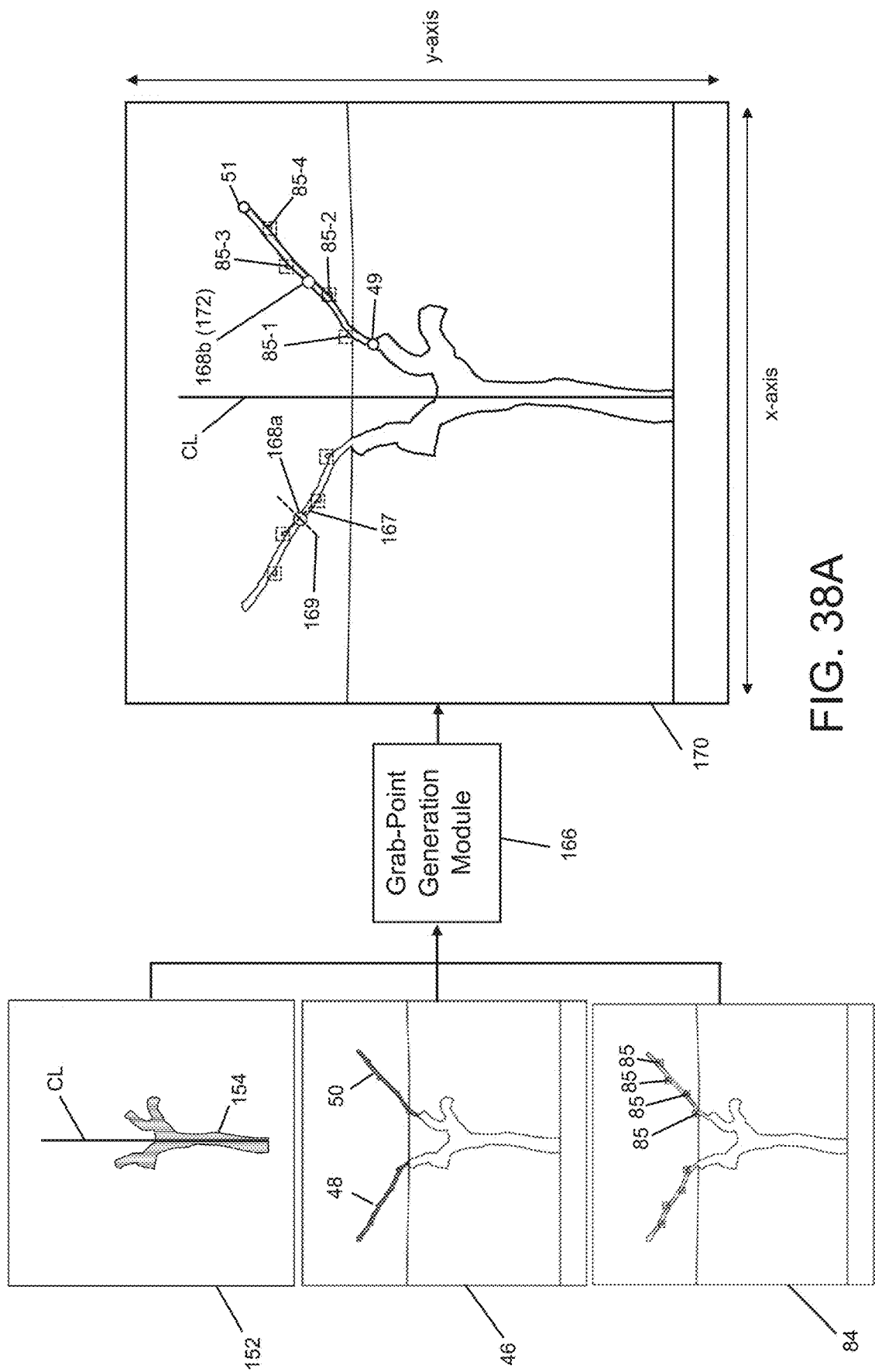

AGRICULTURAL TOOL AND PROCESS

CROSS REFERENCE TO RELATED APPLICATIONS

This application claims the benefit of priority to U.S. Provisional Application No. 63/447,471 filed on Feb. 22, 2023. The entire contents of this application are hereby incorporated herein by reference.

BACKGROUND

1. Field of the Invention

The present invention relates to tools and agricultural processes. More specifically, the present invention relates to agricultural tools and agricultural processes that are each able to tie/twist an agricultural item of interest and a support structure together, and/or fasten or attach the agricultural item of interest to the support structure.

2. Description of the Related Art

Conventionally, tasks including tying or twisting an agricultural item of interest and a support structure together, and fastening the agricultural item of interest to the support structure have been manual labor tasks that are expensive and time-consuming. For example, in a case in which the agricultural item of interest is a grape vine cane and a support structure is a wire trellis found in a vineyard, the tasks of tying or twisting the grape vine cane to the wire trellis and fastening the grape vine cane to the wire trellis with tape requires a person to walk through the vineyard and manually perform these tasks. Furthermore, a technique of tying or twisting the grape vine cane to the wire trellis, and fastening or attaching the grape vine cane to the wire trellis with tape, may vary from person to person, which can decrease the reliability and consistency of the grape vine cane being secured and fastened to the wire trellis. This unreliability and inconsistency is undesirable because the grape vine cane being secured and fastened to the wire trellis is important with respect to the health and growth of the grape vine and the quality of the grapes produced by the grape vine.

For the foregoing reasons, there is a need for tools and processes that can inexpensively and reliably tie/twist an agricultural item of interest and a support structure together, and/or fasten or attach the agricultural item of interest to the support structure.

SUMMARY OF THE INVENTION

Preferred embodiments of the present invention are directed to agricultural tools and agricultural methods that can each tie/twist an agricultural item of interest and a support structure together, and/or fasten or attach the agricultural item of interest to the support structure.

A method according to a preferred embodiment of the present invention includes generating an image, segmenting the image to identify a component of an agricultural item, detecting one or more agricultural features of the agricultural item based on the image, the one or more agricultural features being associated with the component of the agricultural item, generating a two-dimensional grab-point based on the component of the agricultural item and the one or more agricultural features, and generating a three-dimensional grab-point based on the two-dimensional grab-point and a depth estimation of the agricultural item.

In a method according to a preferred embodiment of the present invention, the segmenting the image to identify the component of the agricultural item includes segmenting the image using an instance segmentation AI architecture.

In a method according to a preferred embodiment of the present invention, the method further includes determining agricultural feature locations of the one or more agricultural features, and associating the one or more agricultural features with the component of the agricultural item based on the agricultural feature locations of the one or more agricultural features.

In a method according to a preferred embodiment of the present invention, the segmenting the image to identify the component of the agricultural item includes generating a segmented image that identifies different components of the agricultural item including the component of the agricultural item, the segmented image includes masks that identify the different components of the agricultural item, the masks that identify the different components include a particular mask that identifies the component of the agricultural item, and the one or more agricultural features are associated with the component of the agricultural item when the agricultural feature locations of the one or more agricultural features are within the particular mask or are within a predetermined distance of the particular mask.

In a method according to a preferred embodiment of the present invention, the method further includes determining agricultural feature locations of the one or more agricultural features using an object detection model that receives the image and detects the one or more agricultural features within the image.

In a method according to a preferred embodiment of the present invention, the method further includes segmenting the image to identify a base component of the agricultural item, and the two-dimensional grab-point is generated based on the component of the agricultural item, the one or more agricultural features, and the base component of the agricultural item.

In a method according to a preferred embodiment of the present invention, the segmenting the image to identify the base component of the agricultural item includes segmenting the image using a semantic segmentation AI architecture.

In a method according to a preferred embodiment of the present invention, the method further includes determining a proposed location of the two-dimensional grab-point, determining whether or not the proposed location of the two-dimensional grab-point lies on any of the one or more agricultural features, and determining a start point and an end point of the component of the agricultural item, and a point between the start point and the end point of the component of the agricultural item is determined as the proposed location of the two-dimensional grab-point.

In a method according to a preferred embodiment of the present invention, the method further includes determining a proposed location of the two-dimensional grab-point, determining whether or not the proposed location of the two-dimensional grab-point lies on any of the one or more agricultural features, setting the proposed location of the two-dimensional grab-point as a final location of the two-dimensional grab-point when the proposed location of the two-dimensional grab-point does not lie on any of the one or more agricultural features, and setting the final location of the two-dimensional grab-point in a location that does not lie on any of the one or more agricultural features when the proposed location of the two-dimensional grab-point lies on any of the one or more agricultural features.

In a method according to a preferred embodiment of the present invention, when the proposed location of the two-dimensional grab-point lies on any of the one or more agricultural features and the one or more agricultural features includes a plurality of agricultural features, the location in which the final location of the two-dimensional grab-point is set is between two of the plurality of agricultural features.

In a method according to a preferred embodiment of the present invention, the method further includes determining an angle of a portion of the component of the agricultural item on which the two-dimensional grab-point is generated, and determining a grab-point angle of the two-dimensional grab-point based on the angle of the portion of the component of the agricultural item on which the two-dimensional grab-point is generated.

In a method according to a preferred embodiment of the present invention, the method further includes segmenting the image to identify a support structure.

In a method according to a preferred embodiment of the present invention, the segmenting the image to identify the support structure includes segmenting the image using a semantic segmentation AI architecture.

In a method according to a preferred embodiment of the present invention, the method further includes segmenting the image to identify a base component of the agricultural item, and generating a two-dimensional tie-point based on the base component of the agricultural item, the support structure, and the two-dimensional grab-point.

In a method according to a preferred embodiment of the present invention, the two-dimensional tie-point is set at a location that lies on the support structure, is spaced away from the base component of the agricultural item, and is located on a same side of the base component of the agricultural item where the two-dimensional grab-point is located.

In a method according to a preferred embodiment of the present invention, a distance between the base component and the location at which the two-dimensional tie-point is set is based on a distance between a start point of the component of the agricultural item and the two-dimensional grab-point.

In a method according to a preferred embodiment of the present invention, the method further includes segmenting the image to identify a support structure, generating a two-dimensional tie-point that lies on the support structure, and generating a three-dimensional tie-point based on the two-dimensional tie-point and a depth estimation of the support structure.

In a method according to a preferred embodiment of the present invention, the method further includes positioning an agricultural tool based on the three-dimensional grab-point, capturing the agricultural item with the agricultural tool that has been positioned based on the three-dimensional grab-point, positioning the agricultural tool based on the three-dimensional tie-point, capturing the support structure with the agricultural tool that has been positioned based on the three-dimensional tie-point, and attaching the agricultural item and the support structure together.

In a method according to a preferred embodiment of the present invention, the attaching includes twisting the agricultural item and the support structure such that the agricultural item and the support structure are intertwined.

A system according to a preferred embodiment of the present invention includes a camera to capture image data, and a processor configured or programmed to generate an image based on the image data, segment the image to identify a component of an agricultural item, detect one or more agricultural features of the agricultural item based on the image, the one or more agricultural features being associated with the component of the agricultural item, generate a two-dimensional grab-point based on the component of the agricultural item and the one or more agricultural features, and generate a three-dimensional grab-point based on the two-dimensional grab-point and a depth estimation of the agricultural item.

In a system according to a preferred embodiment of the present invention, the processor is configured or programmed to segment the image to identify the component of the agricultural item using an instance segmentation AI architecture.

In a system according to a preferred embodiment of the present invention, the processor is configured or programmed to determine agricultural feature locations of the one or more agricultural features, and associate the one or more agricultural features with the component of the agricultural item based on the agricultural feature locations of the one or more agricultural features.

In a system according to a preferred embodiment of the present invention, the processor is configured or programmed to generate a segmented image that identifies different components of the agricultural item including the component of the agricultural item to segment the image to identify the component of the agricultural item, the segmented image includes masks that identify the different components of the agricultural item, the masks that identify the different components include a particular mask that identifies the component of the agricultural item, the one or more agricultural features are associated with the component of the agricultural item when the agricultural feature locations of the one or more agricultural features are within the particular mask or are within a predetermined distance of the particular mask.

In a system according to a preferred embodiment of the present invention, the processor is configured or programmed to determine agricultural feature locations of the one or more agricultural features using an object detection model that receives the image and detects the one or more agricultural features within the image.

In a system according to a preferred embodiment of the present invention, the processor is configured or programmed to segment the image to identify a base component of the agricultural item, and the two-dimensional grab-point is generated based on the component of the agricultural item, the one or more agricultural features, and the base component of the agricultural item.

In a system according to a preferred embodiment of the present invention, the processor is configured or programmed to segment the image using a semantic segmentation AI architecture to segment the image to identify the base component of the agricultural item.

In a system according to a preferred embodiment of the present invention, the processor is configured or programmed to determine a proposed location of the two-dimensional grab-point, determine whether or not the proposed location of the two-dimensional grab-point lies on any of the one or more agricultural features, determine a start point and an end point of the component of the agricultural item, and determine a point between the start point and the end point of the component of the agricultural item as the proposed location of the two-dimensional grab-point.

In a system according to a preferred embodiment of the present invention, the processor is configured or programmed to determine a proposed location of the two-dimensional grab-point, determine whether or not the proposed location of the two-dimensional grab-point lies on any of the one or more agricultural features, set the proposed location of the two-dimensional grab-point as a final location of the two-dimensional grab-point when the proposed location of the two-dimensional grab-point does not lie on any of the one or more agricultural features, and set the final location of the two-dimensional grab-point in a location that does not lie on any of the one or more agricultural features when the proposed location of the two-dimensional grab-point lies on any of the one or more agricultural features.

In a system according to a preferred embodiment of the present invention, when the proposed location of the two-dimensional grab-point lies on any of the one or more agricultural features and the one or more agricultural features includes a plurality of agricultural features, the location in which the final location of the two-dimensional grab-point is set is between two of the plurality of agricultural features.

In a system according to a preferred embodiment of the present invention, the processor is configured or programmed to determine an angle of a portion of the component of the agricultural item on which the two-dimensional grab-point is generated, and determine a grab-point angle of the two-dimensional grab-point based on the angle of the portion of the component of the agricultural item on which the two-dimensional grab-point is generated.

In a system according to a preferred embodiment of the present invention, the processor is configured or programmed to segment the image to identify a support structure.

In a system according to a preferred embodiment of the present invention, the processor is configured or programmed to segment the image to identify the support structure using a semantic segmentation AI architecture.

In a system according to a preferred embodiment of the present invention, the processor is configured or programmed to segment the image to identify a base component of the agricultural item, and generate a two-dimensional tie-point based on the base component of the agricultural item, the support structure, and the two-dimensional grab-point.

In a system according to a preferred embodiment of the present invention, the processor is configured or programmed to set the two-dimensional tie-point at a location that lies on the support structure, is spaced away from the base component of the agricultural item, and is located on a same side of the base component of the agricultural item where the two-dimensional grab-point is located.

In a system according to a preferred embodiment of the present invention, the processor is configured or programmed to set a distance between the base component and the location at which the two-dimensional tie-point is set based on a distance between a start point of the component of the agricultural item and the two-dimensional grab-point.

In a system according to a preferred embodiment of the present invention, the processor is configured or programmed to segment the image to identify a support structure, generate a two-dimensional tie-point that lies on the support structure, and generate a three-dimensional tie-point based on the two-dimensional tie-point and a depth estimation of the support structure.

In a system according to a preferred embodiment of the present invention, the system further includes an agricultural tool, and the processor is configured or programmed to position the agricultural tool based on the three-dimensional grab-point, control the agricultural tool to capture the agricultural item with the agricultural tool that has been positioned based on the three-dimensional grab-point, position the agricultural tool based on the three-dimensional tie-point, control the agricultural tool to capture the support structure with the agricultural tool that has been positioned based on the three-dimensional tie-point, and control the agricultural tool to attach the agricultural item and the support structure together.

In a system according to a preferred embodiment of the present invention, the processor is configured or programmed to control the agricultural tool to twist the agricultural item and the support structure such that the agricultural item and the support structure are intertwined to attach the agricultural item and the support structure together.

The above and other features, elements, steps, configurations, characteristics, and advantages of the present invention will become more apparent from the following detailed description of preferred embodiments of the present invention with reference to the attached drawings.

BRIEF DESCRIPTION OF THE DRAWINGS

The patent or application file contains at least one drawing executed in color. Copies of this patent or patent application publication with color drawing(s) will be provided by the U.S. Patent and Trademark Office upon request and payment of the necessary fee.

FIG. 38A shows an example of a grab-point generation step according to a preferred embodiment of the present invention.

DETAILED DESCRIPTION OF PREFERRED EMBODIMENTS

Figure 1:
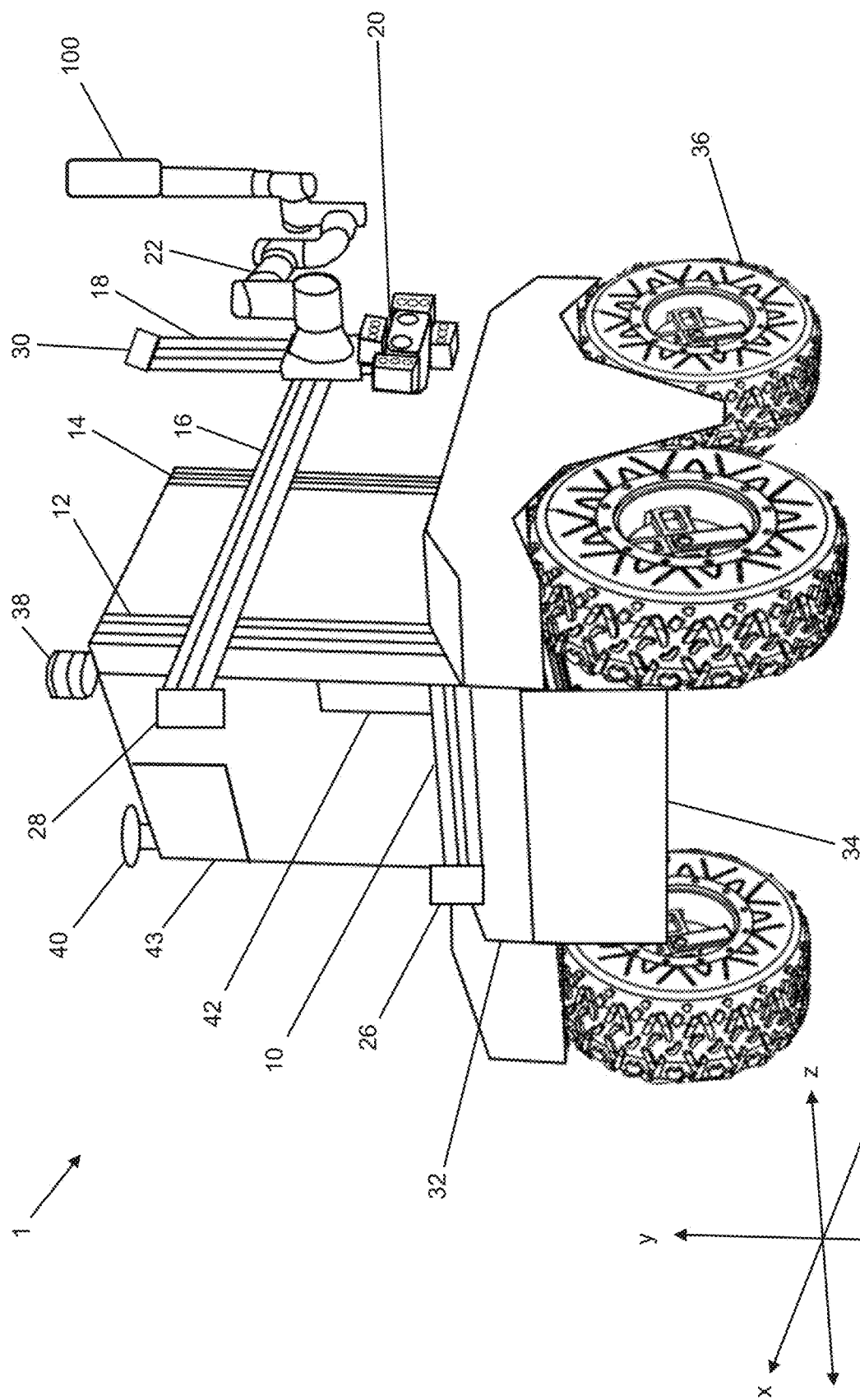
FIG. 1 shows a front perspective view of a system according to a preferred embodiment of the present invention.

FIG. 1 shows a front perspective view of an agricultural system 1 according to a preferred embodiment of the present invention. As shown in FIG. 1, the agricultural system 1 can include a vehicle or the like. However, the agricultural system 1 can be mounted on a cart that is able to be towed by a vehicle or a person, or a self-driving or self-propelled cart or vehicle.

As shown in FIG. 1, the agricultural system 1 includes a base frame 10, side frames 12 and 14, a horizontal frame 16, and a vertical frame 18. The side frames 12 and 14 are mounted to the base frame 10, and the side frames 12 and 14 directly support the horizontal frame 16. The vertical frame 18 is mounted on the horizontal frame 16. One or more devices, such as a camera 20, a robotic arm 22, and/or an agricultural tool 100, can be mounted on and supported by the vertical frame 18, and/or others of the frames 10, 12, 14, or 16, for example.

The base frame 10 includes a base frame motor 26 that is able to move the side frames 12 and 14 along the base frame 10, such that the one or more devices can be moved in a depth direction (the z-axis shown in FIG. 1). The horizontal frame 16 includes a horizontal frame motor 28 that is able to move the vertical frame 18 along the horizontal frame 16, such that the one or more devices can be moved in a horizontal direction (the x-axis shown in FIG. 1). The vertical frame 18 includes a vertical frame motor 30 that is able to move the one or more devices along the vertical frame 18 in a vertical direction (the y-axis shown in FIG. 1). Each of the base frame motor 26, the horizontal frame motor 28, and the vertical frame motor 30 can be a screw motor, for example. Screw motors can provide a relatively high level of precision to accurately move and locate the one or more devices. However, each of the base frame motor 26, the horizontal frame motor 28, and the vertical frame motor 30 can be any motor that provides a continuous torque greater than or equal to about 0.2 N m, and preferably any motor that provides a continuous torque greater than or equal to about 0.3 N m, for example.

Each of the base frame motor 26, the horizontal frame motor 28, and the vertical frame motor 30 can be designed and/or sized according to an overall weight of the one or more devices. In addition, a coupler for each of the base frame motor 26, the horizontal frame motor 28, and the vertical frame motor 30 can be changed according to a motor shaft diameter and/or a corresponding mounting hole pattern.

Figure 3:
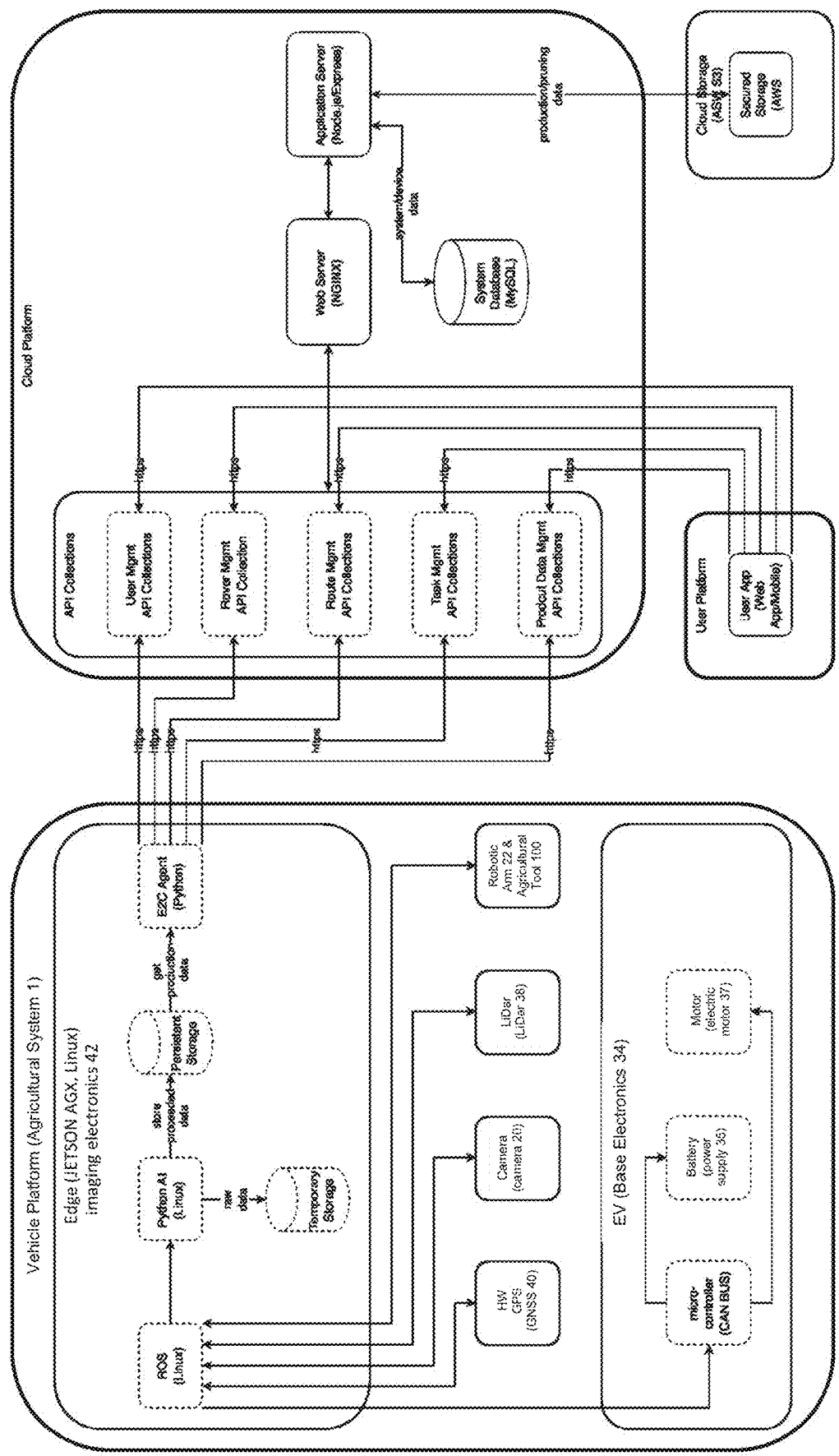
FIG. 3 shows an example of a block diagram of a cloud system that includes a system, a cloud platform, and a user platform according to a preferred embodiment of the present invention.

The base frame 10 can be mounted on a base 32, and base electronics 34 can also be mounted to the base 32. A plurality of wheels 36 can be mounted to the base 32. The plurality of wheels 36 can be controlled by the base electronics 34, and the base electronics 34 can include a power supply 35 to drive an electric motor 37 or the like, as shown in FIG. 3, for example. As an example, the plurality of wheels 36 can be driven by an electric motor 37 with a target capacity of about 65 KW to about 75 KW and a power supply 35 for the electric motor 37 can be a battery with a capacity of about 100 kWh.

The base electronics 34 can also include processor and memory components that are programmed or configured to perform autonomous navigation of the agricultural system 1. Furthermore, as shown in FIG. 1, a LIDAR (light detection and ranging) system 38 and a Global Navigation Satellite System (GNSS) 40 can also be mounted to or supported by the base frame 10 or the base 32, and/or others of the frames 10, 12, 14, or 16, for example, so that position data of the agricultural system 1 can be determined. The LiDAR system 38 and GNSS 40 can be used for obstacle avoidance and navigation when the agricultural system 1 is autonomously moved. Preferably, for example, the system 1 can be implemented with a remote control interface, and can communicate via one or more of Ethernet, USB, wireless communications, and GPS RTK (real time kinematics). The remote control interface and communications devices can be included in one or both of the base electronics 34 and imaging electronics 42 (described below). As shown in FIG. 1, the agricultural system 1 can also include, or be communicatively connected with, a display device 43 to display data and/or images obtained by the one or more devices and to display information provided by the base electronics 34 (for example, location, speed, battery life, and the like of the system 1). Alternatively, data and/or images obtained by the one or more devices and provided by the base electronics 34 can be displayed to a user through a user platform.

Figure 2:
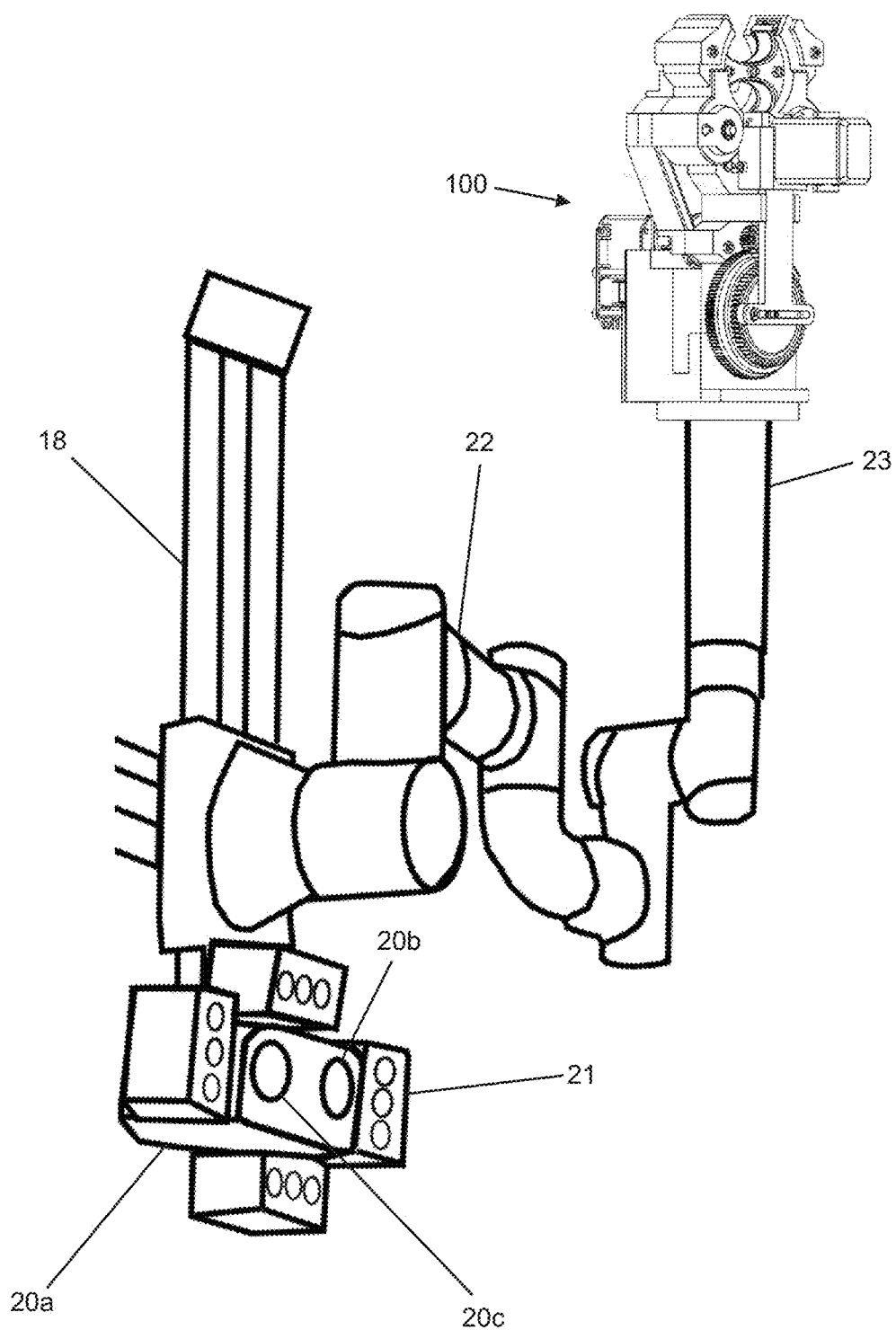
FIG. 2 shows an enlarged view of a portion of a system according to a preferred embodiment of the present invention.

FIG. 2 is a close-up view of a portion of the agricultural system 1 that includes the one or more devices. As shown in FIG. 2, the one or more devices can include the camera 20, the robotic arm 22, and the agricultural tool 100, which can be mounted to the vertical frame 18, and/or others of the frames 10, 12, 14, or 16, for example. Additional ones of the one or more devices can also be provided on the vertical frame 18, and/or others of the frames 10, 12, 14, or 16, for example.

The camera 20 can include a depth camera such as an INTEL® REALSENSE™ Depth Camera D405 or INTEL® REALSENSE™ LIDAR Camera L515, a stereo camera, an RGB camera, and the like. As shown in FIG. 2, the camera 20 can include a main body 20a that includes a first camera/lens 20b (e.g., a left camera/lens) and a second camera/lens 20c (e.g., a right camera/lens). Alternatively, the main body 20a is able to include more than two cameras/lenses. The resolution of the camera 20 can be 1536×2048 pixels or 2448×2048 pixels, for example, but the camera 20 can alternatively have a different resolution. The camera 20 can include, for example, PointGrey CM3-U3-31S4C-CS or PointGrey CM3-U3-50S5C sensors, 3.5 mm f/2.4 or 5 mm f/1.7 lens, and a field of view of 74.2535×90.5344 or 70.4870×80.3662, however the camera 20 is able to include other sensors and lenses, and have a different field of view.

One or more light sources 21 can be attached to one or more sides of the main body 20a of the camera 20. The light sources 21 can include an LED light source that faces a same direction as the one or more devices such as the camera 20, for example, along the z-axis shown in FIG. 1. The light sources 21 can provide illumination of an object or objects to be imaged by the camera 20. For example, the light sources 21 can operate as a flash during daytime operation to compensate for ambient light when capturing images with the camera 20. During nighttime operation, the light sources 21 can operate as either a flash for the camera 20, or the light sources can provide constant illumination for the camera 20. In a preferred embodiment, the one or more light sources 21 include 100 watt LED modules, for example, but LED modules having a different wattage (e.g., 40 watts or 60 watts) can also be used.

The robotic arm 22 can include a robotic arm known to a person of ordinary skill in the art, such as the Universal Robot 3 e-series robotic arm and the Universal Robot 5 e-series robotic arm. The robotic arm 22, also known as an articulated robotic arm, can include a plurality of joints that act as axes that enable a degree of movement, wherein the higher number of rotary joints the robotic arm 22 includes, the more freedom of movement the robotic arm 22 has. For example, the robotic arm 22 can include four to six joints, which provide the same number of axes of rotation for movement.

In a preferred embodiment of the present invention, a controller can be configured or programed to control movement of the robotic arm 22. For example, the controller can be configured or programed to control the movement of the robotic arm 22 to which the agricultural tool 100 is attached to position the agricultural tool 100 in accordance with the steps discussed below. For example, the controller can be configured or programed to control movement of the robotic arm 22 based on a location of a grab-point and a tie-point discussed in more detail below.

In a preferred embodiment of the present invention, the agricultural tool 100 can be attached to the robotic arm 22 using a robotic arm mount assembly 23. The robotic arm mount assembly 23 can include, for example, a robotic arm mount assembly as disclosed in U.S. application Ser. No. 17/961,668 titled "Robotic Arm Mount Assembly including Rack and Pinion" which is incorporated in its entirety by reference herein.

The agricultural system 1 can include imaging electronics 42 that can be mounted on the side frame 12 or the side frame 14, as shown in FIG. 1, for example. The imaging electronics 42 can supply power to and control each of the base frame motor 26, the horizontal frame motor 28, and the vertical frame motor 30. That is, the imaging electronics 42 can include a power source to supply power to each of the base frame motor 26, the horizontal frame motor 28, and the vertical frame motor 30. In addition, the imaging electronics 42 can include processor and memory components that are programmed or configured to control each of the base frame motor 26, the horizontal frame motor 28, and the vertical frame motor 30. The processor and memory components of the imaging electronics 42 can also be configured or programmed to control the one or more devices, including the camera 20, the robotic arm 22, the robotic arm mount assembly 23, and the agricultural tool 100. In addition, the processor and memory components of the imaging electronics 42 can be configured or programmed to process image data obtained by the camera 20.

As described above, the imaging electronics 42 and the base electronics 34 can include processors and memory components. The processors may be hardware processors, multipurpose processors, microprocessors, special purpose processors, digital signal processors (DPSs), and/or other types of processing components configured or programmed to process data. The memory components may include one or more of volatile, non-volatile, and/or replaceable data store components. For example, the memory components may include magnetic, optical, and/or flash storage components that may be integrated in whole or in part with the processors. The memory components may store instructions and/or instruction sets or programs that are able to be read and/or executed by the processors.

According to another preferred embodiment of the present invention, the imaging electronics 42 can be partially or completely implemented by the base electronics 34. For example, each of the base frame motor 26, the horizontal frame motor 28, and the vertical frame motor 30 can receive power from and/or be controlled by the base electronics 34 instead of the imaging electronics 42.

According to further preferred embodiments of the present invention, the imaging electronics 42 can be connected to a power supply or power supplies that are separate from the base electronics 34. For example, a power supply can be included in one or both of the imaging electronics 42 and the base electronics 34. In addition, the base frame 10 may be detachably attached to the base 32, such that the base frame 10, the side frames 12 and 14, the horizontal frame 16, the vertical frame 18, and the components mounted thereto can be mounted on another vehicle or the like.

The base frame motor 26, the horizontal frame motor 28, and the vertical frame motor 30 are able to move the one or more devices in three separate directions or along three separate axes. However, according to another preferred embodiment of the present invention, only a portion of the one or more devices such as the camera 20, the robotic arm 22, and the agricultural tool 100, can be moved by the base frame motor 26, the horizontal frame motor 28, and the vertical frame motor 30. For example, the base frame motor 26, the horizontal frame motor 28, and the vertical frame motor 30 may move only the camera 20. Furthermore, the agricultural system 1 can be configured to linearly move the camera 20 along only a single axis while the camera captures a plurality of images, as discussed below. For example, the horizontal frame motor 28 can be configured to linearly move the camera 20 across an agricultural item of interest, such as a grape vine, and the camera 20 can capture a plurality of images of the grape vine.

The imaging electronics 42 and the base electronics 32 of the agricultural system 1 can each be partially or completely implemented by edge computing to provide a vehicle platform, for example, by an NVIDIA® JETSON™ AGX computer. In a preferred embodiment of the present invention, the edge computing provides all of the computation and communication needs of the agricultural system 1. FIG. 3 shows an example of a block diagram of a cloud system that includes the vehicle platform and interactions with a cloud platform and a user platform. As shown in FIG. 3, the edge computing of the vehicle platform includes a cloud agent, which is a service-based component that facilitates communication between the vehicle platform and the cloud platform. For example, the cloud agent can receive command and instruction data from the cloud platform (e.g., a web application on the cloud platform), and then transfer the command and instruction data to corresponding components of the vehicle platform. As another example, the cloud agent can transmit operation data and production data to the cloud platform. Preferably, the cloud platform can include software components and data storage to maintain overall operation of the cloud system. The cloud platform preferably provides enterprise-level services with on-demand capacity, fault tolerance, and high availability (for example, AMAZON WEB SERVICES™). The cloud platform includes one or more application programming interfaces (APIs) to communicate with the vehicle platform and with the user platform. Preferably, the APIs are protected with a high level of security and a capacity of each of the APIs can be automatically adjusted to meet computational loads. The user platform provides a dashboard to control the cloud system and to receive data obtained by the vehicle platform and the cloud platform. The dashboard can be implemented by a web-based (e.g., internet browser) application, a mobile application, a desktop application, and the like.

As an example, the edge computing of the vehicle platform shown in FIG. 3 can obtain data from a HW (hardware) GPS (Global Positioning System) (for example, GNSS 40) and LiDAR data (for example, from LiDAR system 38). In addition, the vehicle platform can obtain data from the camera 20. The edge computing of the vehicle platform can include a temporary storage, for example, to store raw data obtained by the camera 20. The edge computing of the vehicle platform can also include a persistent storage, for example, to store processed data. As a specific example, camera data stored in the temporary storage can be processed by an artificial intelligence (AI) model, the camera data can then be stored in the persistent storage, and the cloud agent can retrieve and transmit the camera data from the persistent storage.

Figure 4:
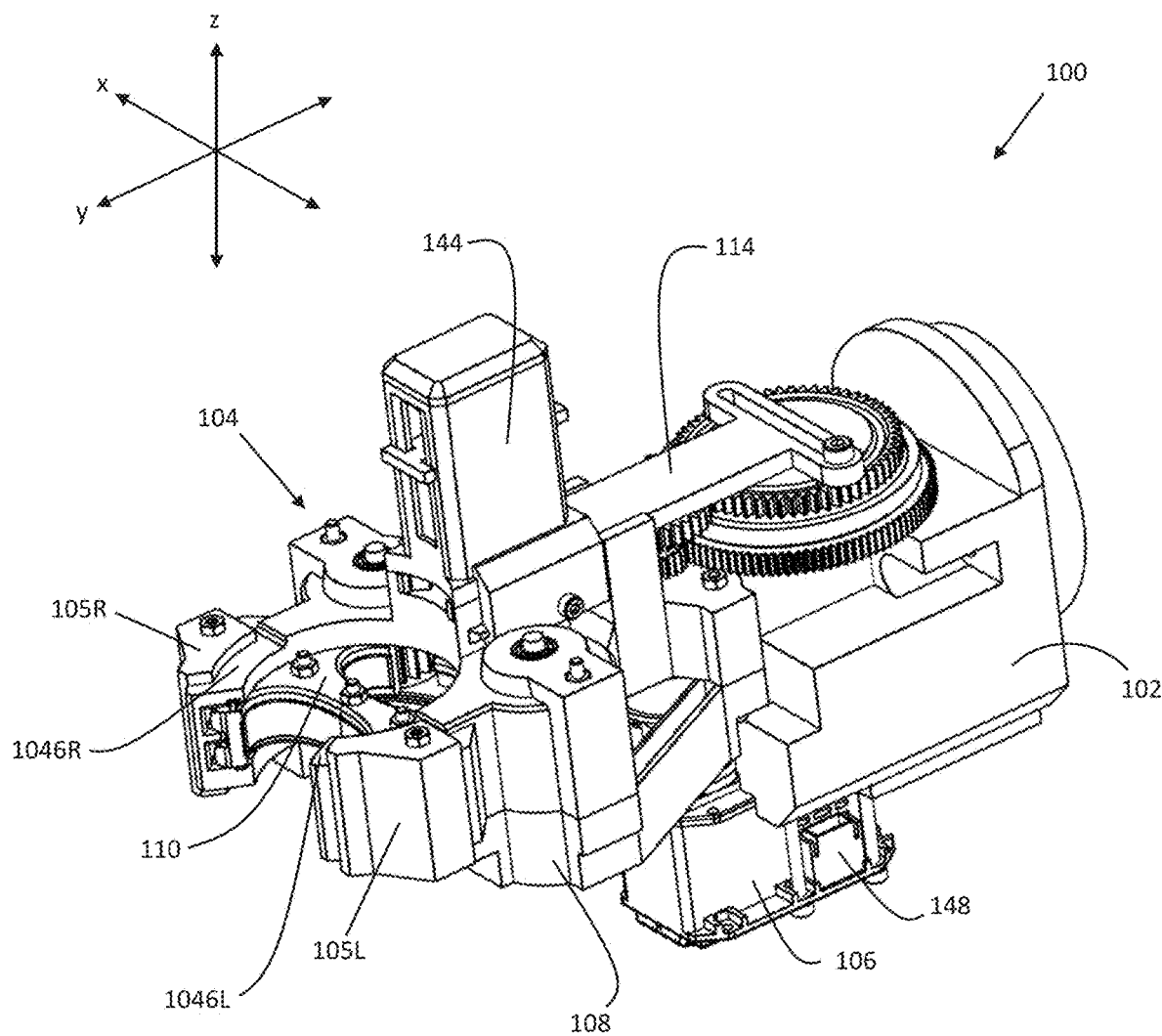
FIG. 4 shows a front perspective view of an agricultural tool according to a preferred embodiment of the present invention.

FIG. 4 shows a front perspective view of an agricultural tool 100 according to a preferred embodiment of the present invention. As shown in FIG. 4, the agricultural tool 100 includes a mounting assembly 102, a frame 104 attached to the mounting assembly 102, a motor 106 attached to the mounting assembly 102, a cover 108 attached to the frame 104, a main gear 110 supported by the frame 104, a magazine 144 attached to the frame 104, and a sliding arm 114 that is supported by the frame 104. FIG. 4 shows a y-axis (a front-rear direction of the agricultural tool 100), an x-axis (a right-left direction of the agricultural tool 100), and a z-axis (an up-down direction of the of the agricultural tool 100).

Figure 5:
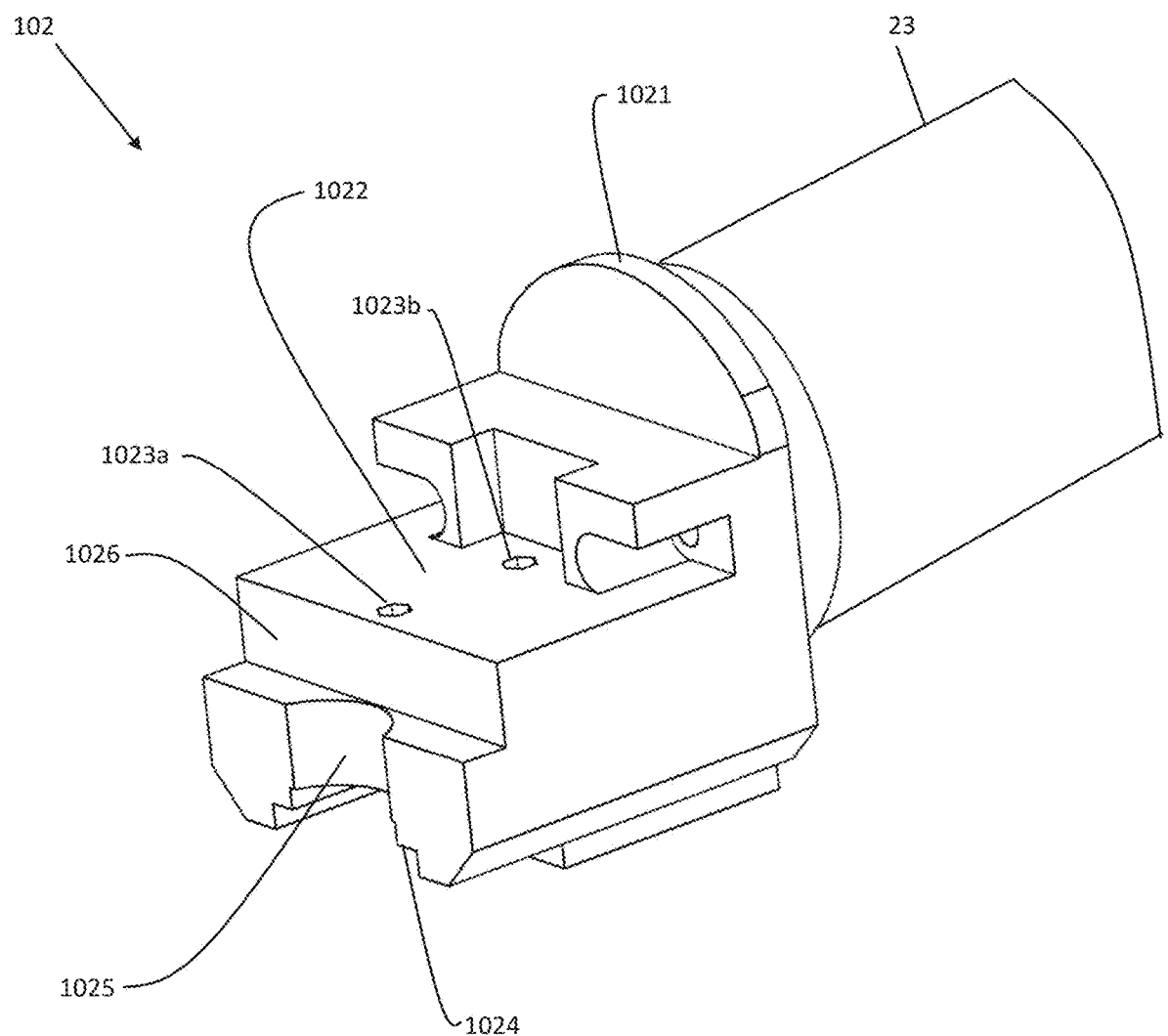
FIG. 5 shows a front perspective view of a mounting assembly included in an agricultural tool according to a preferred embodiment of the present invention.

FIG. 5 is a front perspective view of the mounting assembly 102 according to a preferred embodiment of the present invention. The mounting assembly 102 includes a base plate 1021, which can be mounted to the robotic arm mount assembly 23. Alternatively, the base plate 1021 can be mounted to the robotic arm 22 or another structure (e.g., a handle that can be held by a person). The base plate 1021 preferably has a circular shape, but the base plate 1021 can be shaped differently and have a rectangular or substantially rectangular shape, for example. The mounting assembly 102 includes a first recess 1022 to accommodate a portion of the frame 104 (e.g., a base portion 1041 of the frame 104), as discussed in more detail below. The first recess 1022 includes a plurality of mounting holes for mounting the frame 104 to the mounting assembly 102. For example, FIG. 5 shows a front mounting hole 1023a and a rear mounting hole 1023b which can be used to mount the frame 104 to the mounting assembly 102, as discussed in more detail below.

In a preferred embodiment of the present invention, the mounting assembly 102 includes a second recess 1024 to accommodate the motor 106, and the second recess 1024 includes a motor mount recess 1025 to accommodate a motor mount 1062 of the motor 106. Preferably, the motor mount recess 1025 has a rounded shape to accommodate a circular shape of the motor mount 1062 shown in FIG. 13, however, the motor mount recess 1025 can be shaped differently, for example, based on a shape of the motor mount.

In a preferred embodiment of the present invention, the mounting assembly 102 includes a third recess 1026 located between the first recess 1022 and the second recess 1024. Preferably, the third recess 1026 is a stepped recess portion located between the first recess 1022 and the second recess 1024 and accommodates a motor pulley 116 in a front-rear direction, as discussed in more detail below with respect to FIG. 13.

As shown in FIG. 4, the motor 106 is attached to the mounting assembly 102. For example, the motor 106 can be fixed to the mounting assembly 102 using a plurality of bolts or screws or other fasteners, such that a main body of the motor 106 is accommodated within the second recess 1024 of the mounting assembly 102, and the motor mount 1062 is accommodated within the motor mount recess 1025.

Figure 6:
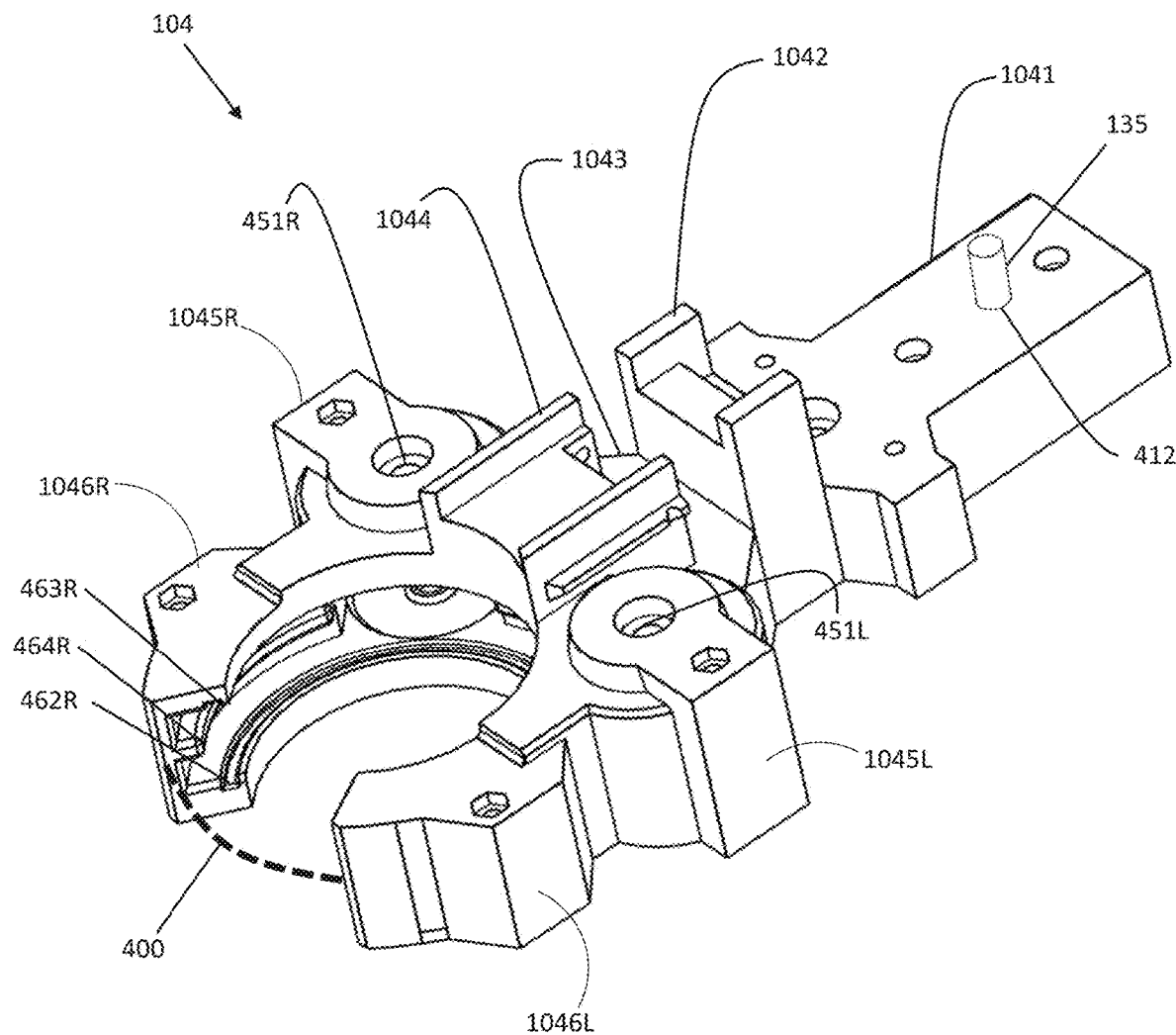
FIG. 6 shows a front perspective view of a frame included in an agricultural tool according to a preferred embodiment of the present invention.
Figure 7:
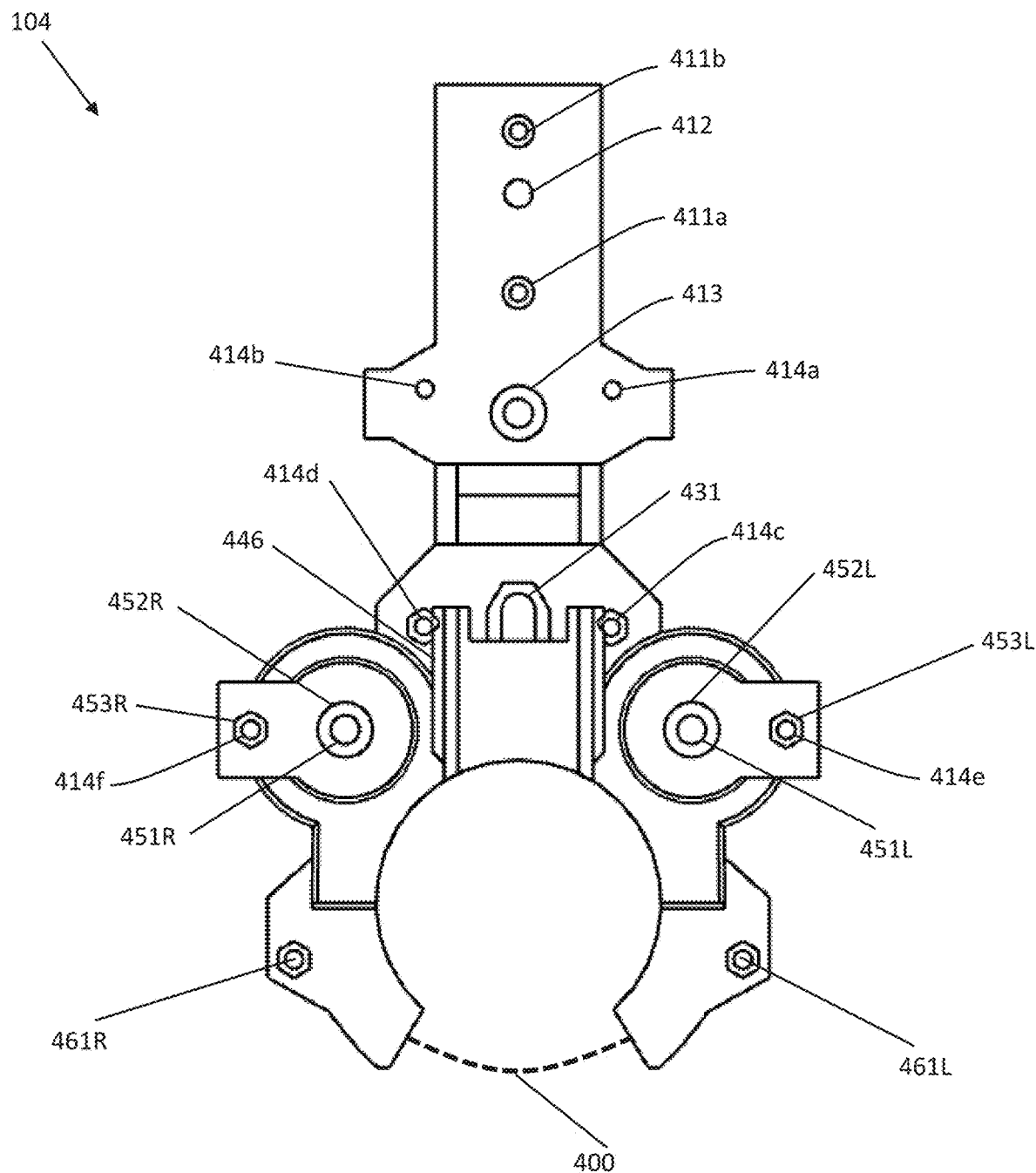
FIG. 7 shows a plan view of a frame included in an agricultural tool according to a preferred embodiment of the present invention.
Figure 8:
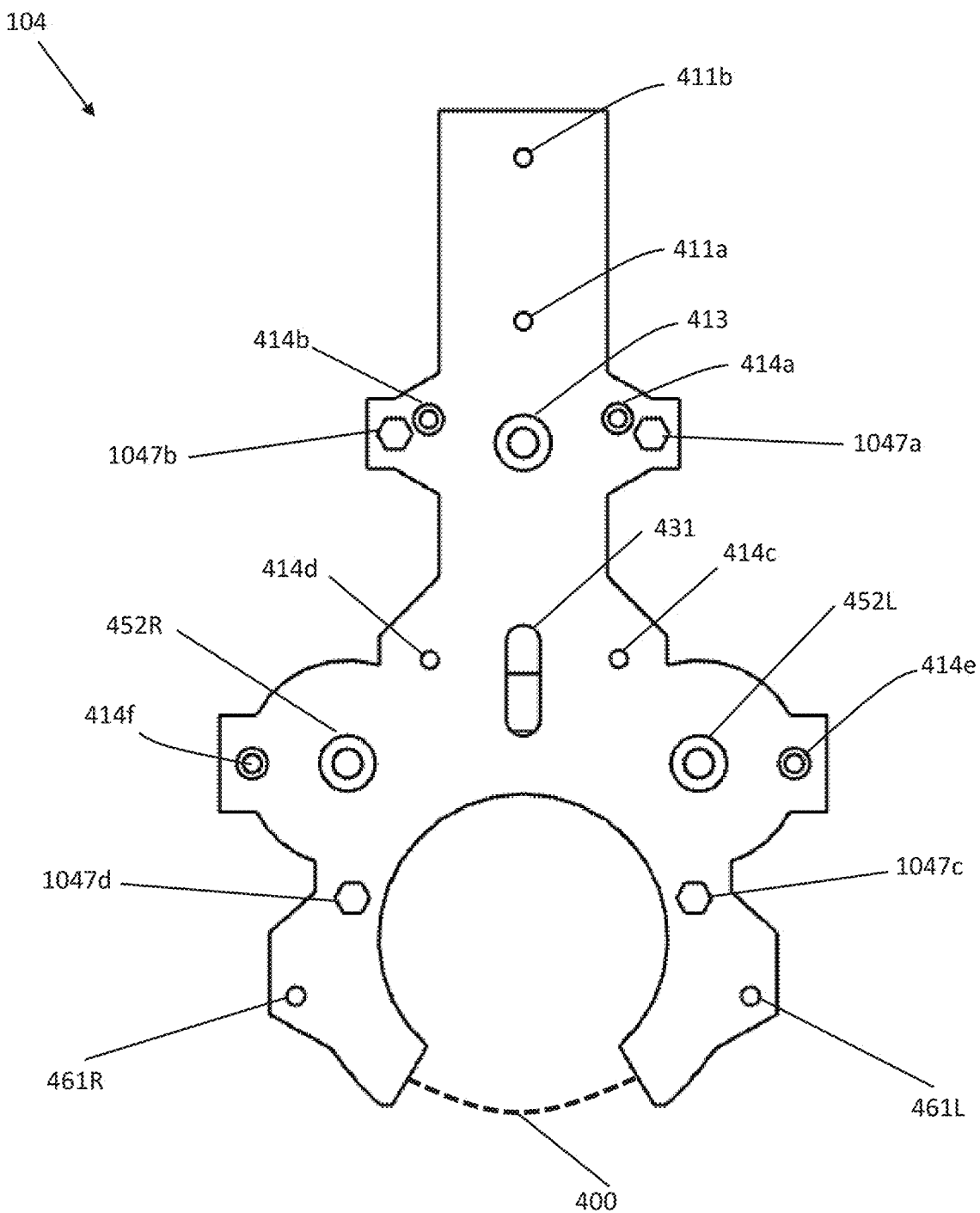
FIG. 8 shows a bottom view of a frame included in an agricultural tool according to a preferred embodiment of the present invention.
Figure 9:
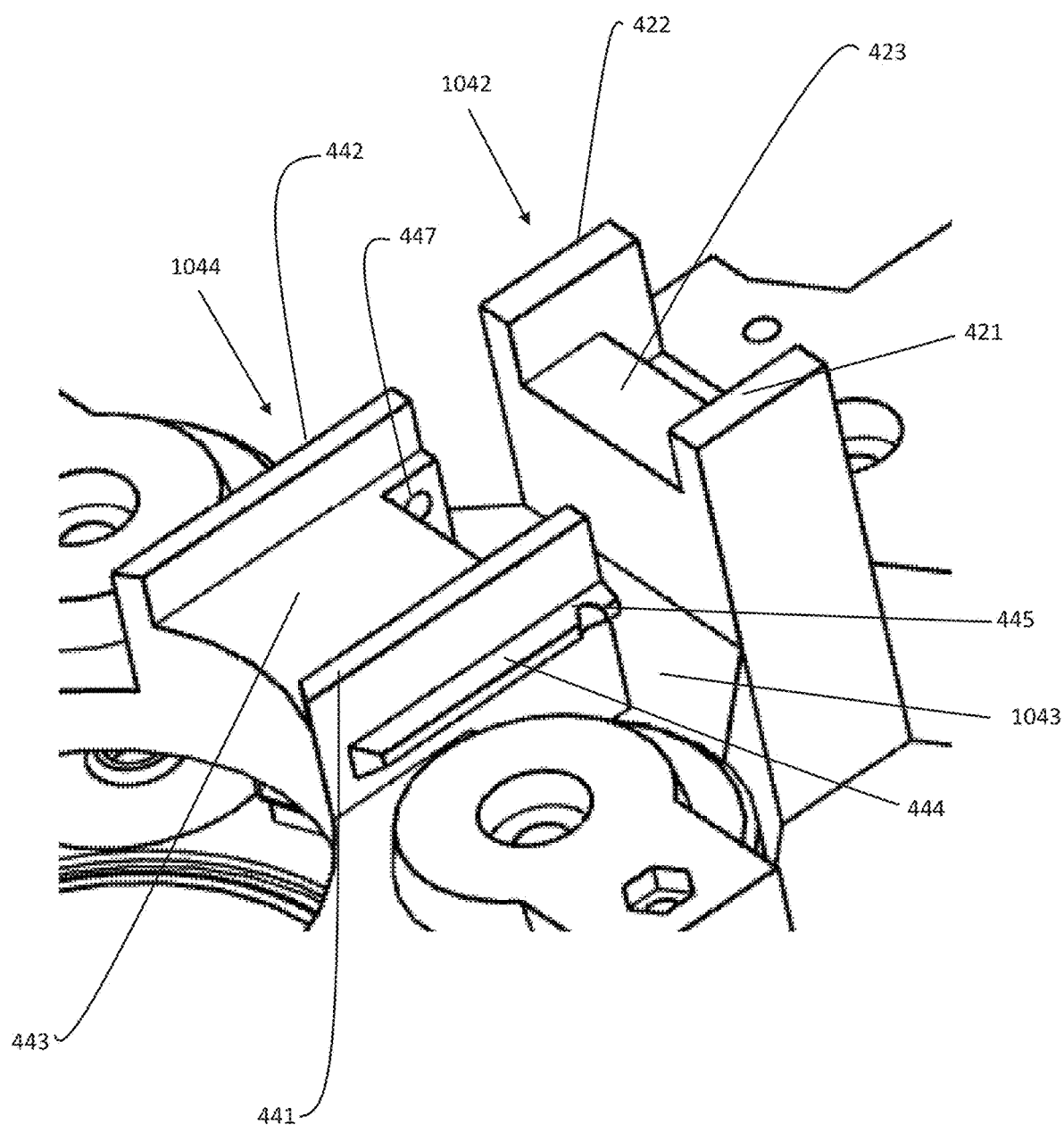
FIG. 9 shows a close-up front perspective view of a portion of a frame included in an agricultural tool according to a preferred embodiment of the present invention.
Figure 10:
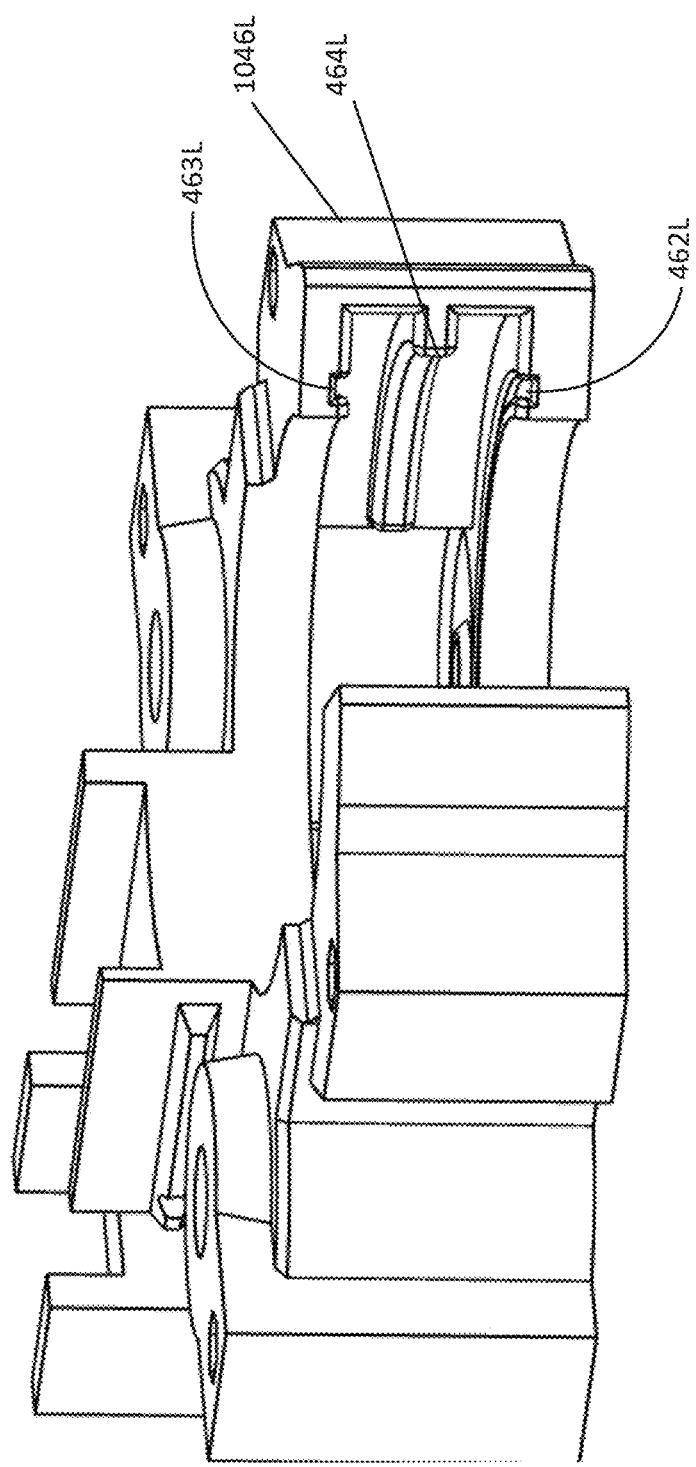
FIG. 10 shows a front perspective view of a portion of a frame included in an agricultural tool according to a preferred embodiment of the present invention.

FIG. 6 is a front perspective view of the frame 104, FIG. 7 is a plan view of the frame 104, FIG. 8 is a bottom view of the frame 104, and FIGS. 9 and 10 are front perspective views of portions of the frame 104. The frame 104 according to a preferred embodiment of the present invention will be described below with respect to FIGS. 6-10.

As shown in FIG. 6, the frame 104 includes a base portion 1041, a first sliding arm support portion 1042 attached to the base portion 1041, a connection portion 1043 connected to the first sliding arm support portion 1042, and a second sliding arm support portion 1044 connected to the connection portion 1043. The frame 104 further includes a left driving gear frame portion 1045L attached to the second sliding arm support portion 1044, a right driving gear frame portion 1045R attached to the second sliding arm support portion 1044, a left main gear frame portion 1046L connected to the left driving gear frame portion 1045L, and a right main gear frame portion 1046R connected to the right driving gear frame portion 1045R. The left main gear frame portion 1046L and the right main gear frame portion 1046R surround, house, and support the main gear 110, as shown in FIG. 4, for example.

In a preferred embodiment of the present invention, the frame 104 can include a plurality of frame layers that, in combination, define the frame 104 described herein. For example, the frame 104 can include an upper portion (e.g., an upper layer), a middle portion (e.g., a middle layer), and a lower portion (e.g., a lower layer) which are fastened together to form the frame 104. The frame 104 can include a plurality of frame shaft holes, e.g., frame shaft holes 414a, 414b, 414c, 414d, 414e, and 414f shown in FIG. 7 through which a frame connection shaft or bolt that connects the plurality of frame layers together extends. Preferably, the plurality of frame shaft holes 414a, 414b, 414c, 414d, 414e, and 414f are spaced apart in a left-right direction of the agricultural tool 100, as shown in FIG. 7. Alternatively to the plurality of frame layers discussed above, the frame 104 can be defined by a single unitary structure.

As shown in FIG. 7, which is a plan view of the frame 104, the base portion 1041 includes a plurality of mounting holes, e.g., a front mounting hole 411a and a rear mounting hole 411b. In a preferred embodiment of the present invention, a first shaft or bolt that attaches the frame 104 (the base portion 1041) to the mounting assembly 102 extends through the front mounting hole 411a of the frame 104 and the front mounting hole 1023a of the mounting assembly 102, and a second shaft or bolt that attaches the frame 104 (the base portion 1041) to the mounting assembly 102 extends through the rear mounting hole 411b of the frame 104 and the rear mounting hole 1023b of the mounting assembly 102.

The base portion 1041 can include a gear shaft hole 412 that holds a gear shaft 135, shown in FIG. 6 and discussed in more detail below. Preferably, the gear shaft hole 412 does not extend completely through the base portion 1041, such that a bottom end of the gear shaft 135 abuts a bottom of the gear shaft hole 412 when the gear shaft 135 is located within the gear shaft hole 412. Preferably, the base portion 1041 includes a motor shaft hole 413 forward of the gear shaft hole 412 in a front-rear direction of the agricultural tool 100, and a motor shaft 1061 of the motor 106 extends through the motor shaft hole 413, as discussed in more detail below.

As shown in FIG. 6, for example, the base portion 1041 is attached to the first sliding arm support portion 1042. As shown in FIG. 9, the first sliding arm support portion 1042 includes a left wall portion 421, a right wall portion 422, and a sliding arm platform portion 423 located between the left wall portion 421 and the right wall portion 422. Preferably, the left wall portion 421 and the right wall portion 422 extend higher than the sliding arm platform portion 423 in the up-down direction of the agricultural tool 100.

In a preferred embodiment of the present invention, the frame 104 includes the connection portion 1043 that is connected to the first sliding arm support portion 1042 and the second sliding arm support portion 1044. Preferably, the second sliding arm support portion 1044 includes a left wall portion 441, a right wall portion 442, and a clip platform portion 443, discussed in more detail below. Preferably, the left wall portion 441 and the right wall portion 442 extend higher than the clip platform portion 443 in the up-down direction of the agricultural tool 100.

In a preferred embodiment of the present invention, the frame 104 includes a left magazine slide track 444 attached to an outer surface of the left wall 441 of the second sliding arm support portion 1044, as shown in FIG. 9, for example. Preferably, the left magazine slide track includes a hole 445 that extends through the left magazine slide track 444 in a left-right direction. The frame 104 includes a right magazine slide track 446 attached to an outer surface of the right wall 442 of the second sliding arm support portion 1044, as shown in FIG. 7, for example. The right magazine slide track 446 includes a hole 447 that extends through the right magazine slide track 446 in the left-right direction.

In a preferred embodiment of the present invention, the frame 104 includes the left driving gear frame portion 1045L attached to the second sliding arm support portion 1044, as shown in FIG. 6, for example. The left driving gear frame portion 1045L houses and surrounds a first driving gear 128 (a left driving gear), as discussed in more detail below. As shown in FIGS. 6 and 7, the left driving gear frame portion 1045L includes a left driving gear shaft hole 451L through which a first driving shaft 124 (a left driving shaft) extends, and a left driving shaft bearing recess 452L that holds a first driving shaft bearing 1241, as discussed in more detail below. The left driving gear frame portion 1045L also includes a frame connection shaft nut recess 453L that holds a nut used with a bolt or shaft that extends through frame shaft hole 414e.

In a preferred embodiment of the present invention, the frame 104 includes the right driving gear frame portion 1045R attached to the second sliding arm support portion 1044, as shown in FIG. 6, for example. The right driving gear frame portion 1045R houses and surrounds a second driving gear 130 (a right driving gear), as discussed in more detail below. As shown in FIGS. 6 and 7, for example, the right driving gear frame portion 1045R includes a right driving gear shaft hole 451R through which a second driving shaft 126 (a right driving shaft) extends, and a driving shaft bearing recess 452R that holds a second driving shaft bearing 1261, as discussed in more detail below. The right driving gear frame portion 1045R also includes a frame connection shaft nut recess 453R that holds a nut used with a bolt or shaft that extends through frame shaft hole 414f.

In a preferred embodiment of the present invention, the frame 104 includes a left main gear frame portion 1046L, as shown in FIG. 6, for example. The left main gear frame portion 1046L includes a first end attached to the left driving gear frame portion 1045L and a second end which is a free end. The left main gear frame portion 1046L includes a frame connection hole 461L, as shown in FIG. 7, through which a bolt or shaft that connects the plurality of frame layers extends.

As shown in FIG. 4, in a preferred embodiment, a left clasp 105L is attached to an outer surface of the left main gear frame portion 1046L and holds the plurality of frame layers of the frame 104. The bolt or shaft that extends through the frame connection hole 461L also extends through the left clasp 105L such that the left clasp is fixed to the left main gear frame portion 1046L.

In a preferred embodiment of the present invention, a portion of the left main gear frame portion 1046L (e.g., an inner surface of the left main gear frame portion 1046L) includes a bottom groove portion 462L, a top groove portion 463L, and a track portion 464L, as shown in FIG. 10. The bottom groove portion 462L, the top groove portion 463L, and the track portion 464L assist with movement of the main gear 110, as discussed in more detail below.

In a preferred embodiment of the present invention, the frame 104 includes a right main gear frame portion 1046R, as shown in FIG. 6, for example. The right main gear frame portion 1046R includes a first end attached to the right driving gear frame portion 1045R and a second end which is a free end. The right main gear frame portion 1046R includes a frame connection hole 461R, as shown in FIG. 7, through which a bolt or shaft that connects the plurality of frame layers extends.

In a preferred embodiment, as shown in FIG. 4, for example, a right clasp 105R is attached to an outer surface of the right main gear frame portion 1046R and holds the plurality of frame layers of the frame 104. The bolt or shaft that extends through the frame connection hole 461R also extends through the right clasp 105R such that the right clasp 105R is fixed to the right main gear frame portion 1046R.

In a preferred embodiment of the present invention, a portion of the right main gear frame portion 1046R (e.g., an inner surface of the right main gear frame portion 1046R) includes one or more of a bottom groove portion 462R, a top groove portion 463R, and a track portion 464R, as shown in FIG. 6. The bottom groove portion 462R, the top groove portion 463R, and the track portion 464R assist with movement of the main gear 110, as discussed in more detail below.

In a preferred embodiment of the present invention, the frame 104 includes a frame opening 400 which is located between the second end of the left main gear frame portion 1046L and the second end of the right main gear frame portion 1046R, as shown in FIGS. 6 and 7, for example. Preferably, the frame 104 also includes an elongated hole 431 that extends through a bottom surface of the frame 104 and extends in a front-rear direction of the agricultural tool 100, as shown in FIGS. 7 and 8, for example. In a preferred embodiment, the elongated hole 431 is included at least partially in the connection portion 1043 of the frame 104.

Figure 11:
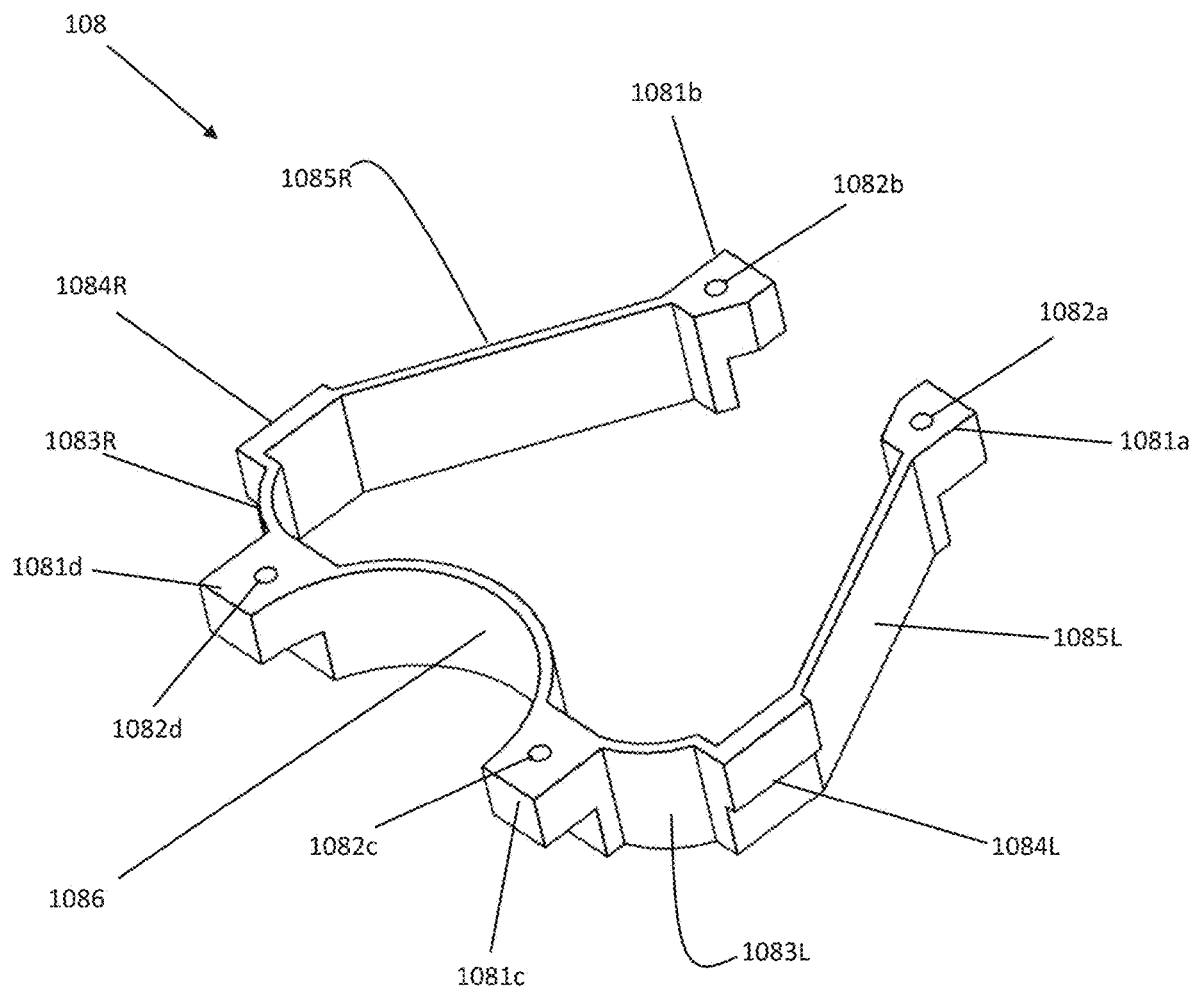
FIG. 11 shows a front perspective view of a cover included in an agricultural tool according to a preferred embodiment of the present invention.

In a preferred embodiment of the present invention, the cover 108 (e.g., shown in FIG. 4) is attached to the frame 104. For example, the cover 108 includes a plurality of tabs that each include a tab hole through which a bolt or shaft that connects the cover 108 to the frame 104 extends. For example, as shown in FIG. 11, the plurality of tabs can include a rear left tab 1081a that includes a tab hole 1082a, a rear right tab 1081b that includes a tab hole 1082b, a front left tab 1081c that includes a tab hole 1082c, and a front right tab 1081d that includes a tab hole 1082d. In a preferred embodiment, a plurality of bolts that connect the cover 108 to the frame 104 extend through the tab hole 1082a, the tab hole 1082b, the tab hole 1082c, and the tab hole 1082d and attach to nuts housed within a plurality of nut recesses 1047a, 1047b, 1047c, and 1047d located on a bottom surface of the frame 104 (see FIG. 8).

In a preferred embodiment of the present invention, the cover 108 houses and surrounds a belt 118, a first driving pulley 120, a second driving pulley 122, a tensioner bearing 1322, and at least a portion of a tensioner shaft 1321, shown in FIG. 13 and as discussed in more detail below. Preferably, the cover 108 includes a first driving pulley portion 1083L (left driving pulley portion) that surrounds the first driving pulley 120 and a second driving pulley portion 1083R (right driving pulley portion) that surrounds the second driving pulley 122. Preferably, the cover 108 includes a first stepped portion 1084L (left stepped portion) and a second stepped portion 1084R (right stepped portion). The cover 108 can include a first diagonal portion 1085L (left diagonal portion) that extends between the left rear tab 1081a and the left stepped portion 1084L, and a second diagonal portion 1085R (right diagonal portion) that extends between the right rear tab 1081b and the right stepped portion 1084R. The first driving pulley portion 1083L extends from the left stepped portion 1084L to the left front tab 1081c, and the second driving pulley portion 1083R extends from the right stepped portion 1084R to the right front tab 1081d. Preferably, the cover 108 includes a curved portion 1086 that extends between the left front tab 1081c and the right front tab 1081d.

Figure 12:
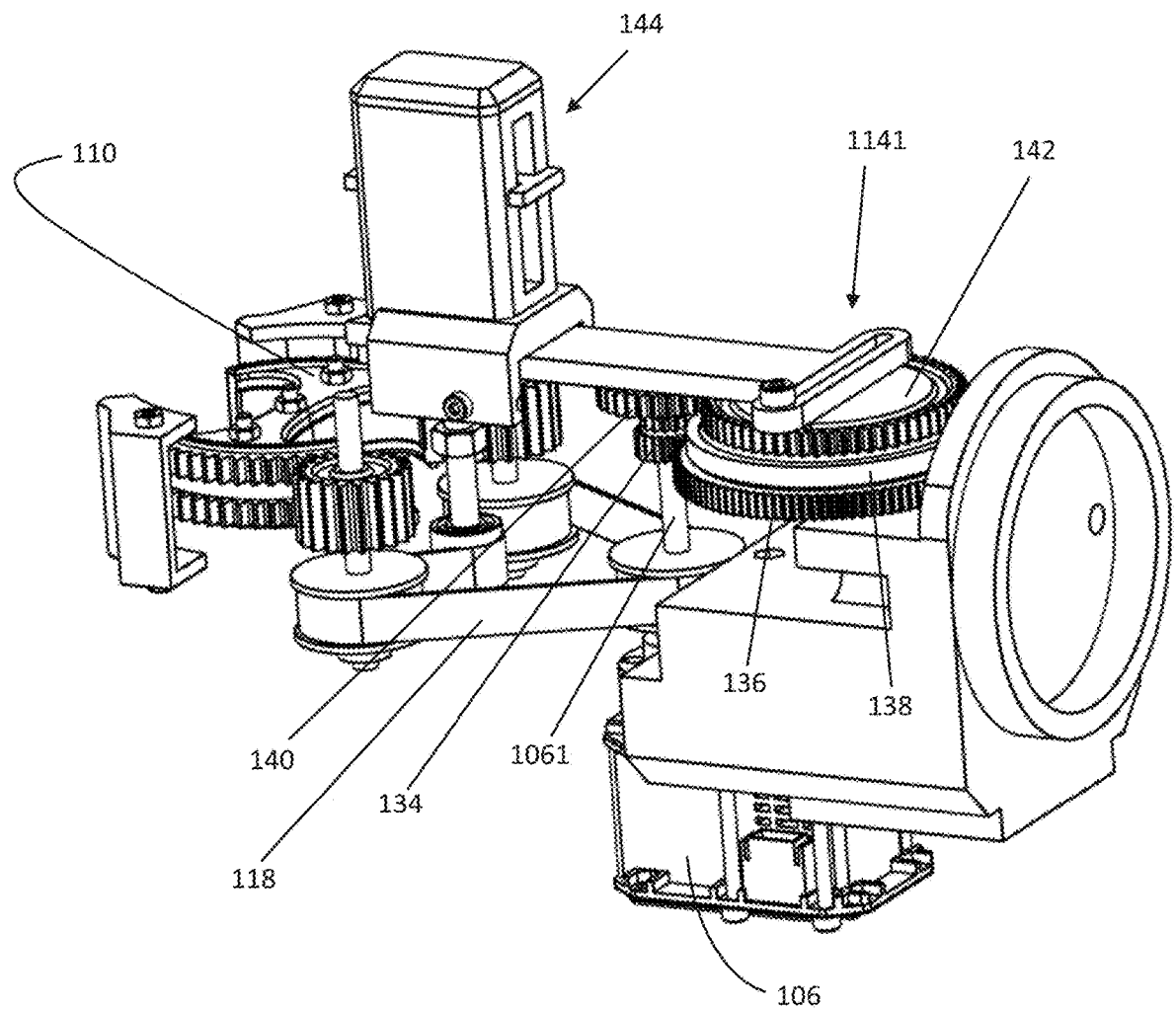
FIG. 12 shows a rear perspective view of an agricultural tool according to a preferred embodiment of the present invention in which a frame and a cover have been removed.

In a preferred embodiment of the present invention, the motor 106 is used to rotate the main gear 110 as discussed in more detail below with reference to FIGS. 12 and 13. FIG. 12 is a rear perspective view of the agricultural tool 100 in which the frame 104 and the cover 108 have been removed to facilitate the illustration of how the motor 106 is used to rotate the main gear 110. FIG. 13 is a rear perspective view that shows components used to rotate the main gear 110 using the motor 106.

Figure 13:
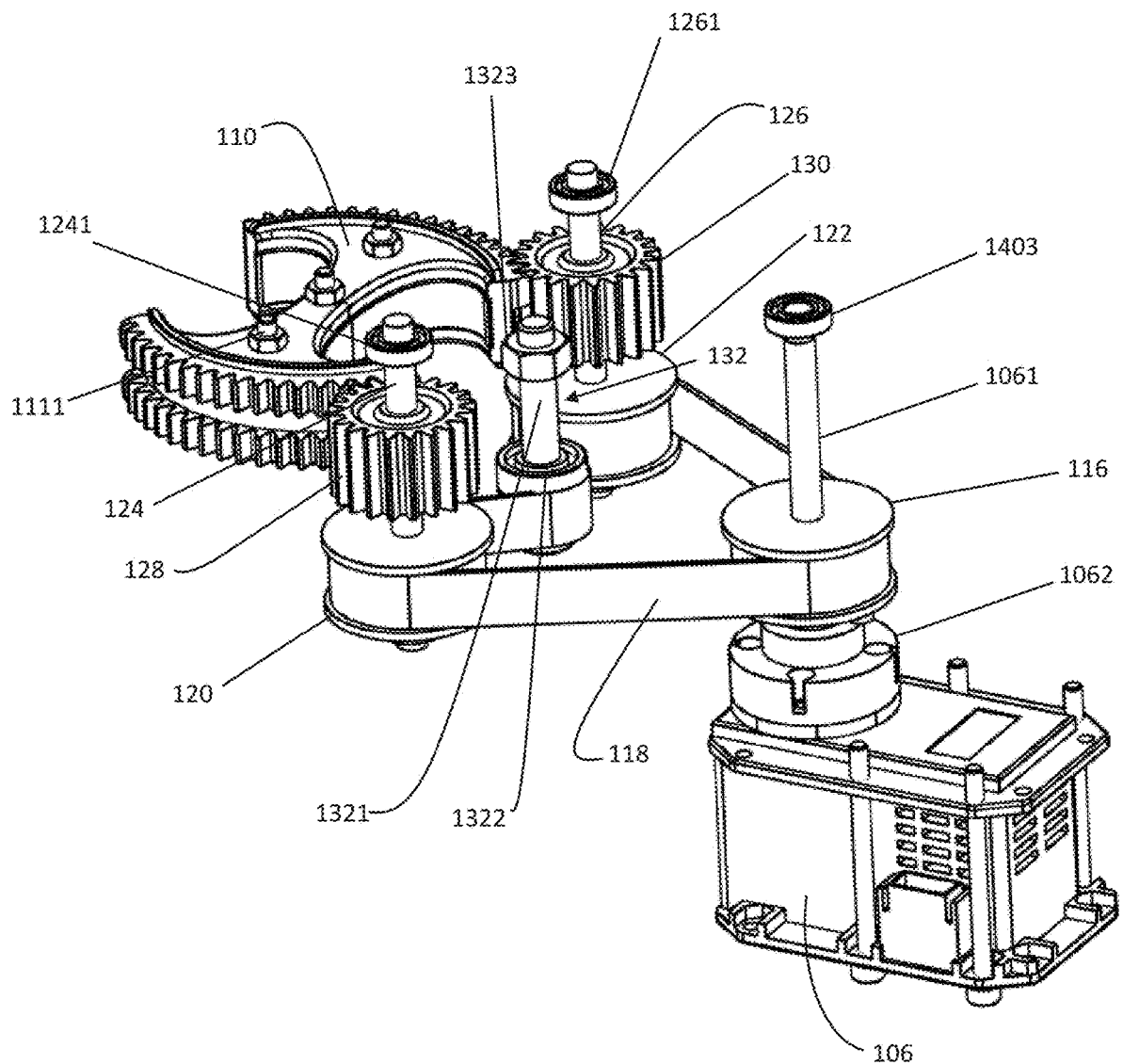
FIG. 13 shows a rear perspective view of components used to rotate a main gear in an agricultural tool according to a preferred embodiment of the present invention.

As shown in FIG. 13, the motor 106 includes a motor shaft 1061 that is driven when the motor 106 is running. The motor 106 includes a motor mount 1062, and the motor shaft 1061 extends through a center hole of the motor mount 1062. As shown in FIG. 13, in a preferred embodiment of the present invention, a motor pulley 116 is attached to the motor shaft 1061 such that the motor pulley 116 rotates when the motor 106 is driven. For example, the motor pulley 116 can be press fit onto the motor shaft 1061 or can be attached the motor shaft 1061 using another fastening technique.

In a preferred embodiment of the present invention, as shown in FIG. 13, a belt 118 is driven by the motor pulley 116. For example, the belt 118 can include teeth which mesh with teeth provided on the motor pulley such that the belt 118 is driven when the motor pulley 116 is driven by the motor 106. In a preferred embodiment, a first driving pulley 120 (e.g., a left driving pulley) and a second driving pulley 122 (e.g., a right driving pulley) are in contact with, and driven by, the belt 118. For example, the belt 118 can include teeth which mesh with teeth provided on the first driving pulley 120 and teeth provided on the second driving pulley 122 such that the first driving pulley 120 and the second driving pulley 122 are driven and rotated when the belt 118 is driven.

In a preferred embodiment of the present invention, the first driving pulley 120 includes a center hole through which a first driving shaft 124 extends. Preferably, the first driving pulley 120 is press fit onto the first driving shaft 124, but the first driving pulley 120 can be attached to the first driving shaft 124 using another fastening technique. Similarly, the second driving pulley 122 includes a center hole through which a second driving shaft 126 extends. Preferably, the second driving pulley 122 is press fit onto the second driving shaft 126, but the second driving pulley 122 can be attached to the second driving shaft 126 using another fastening technique.

In a preferred embodiment of the present invention, as shown in FIG. 13, a first driving gear 128 (a left driving gear) is attached to the first driving shaft 124, and the first driving gear 128 rotates when the first driving shaft 124 rotates. For example, the first driving gear 128 includes a center hole through which the first driving shaft 124 extends, and the first driving gear 128 is press fit onto the first driving shaft 124 such that when the first driving shaft 124 rotates when the first driving pulley 120 is driven by the belt 118, the first driving gear 128 is driven. In a preferred embodiment of the present invention, the first driving gear 128 includes 20 teeth, for example.

In a preferred embodiment of the present invention, as shown in FIG. 13, a second driving gear 130 is attached to the second driving shaft 126, and the second driving gear 130 rotates when the second driving shaft 126 rotates. For example, the second driving gear 130 includes a center hole through which the second driving shaft 126 extends, and the second driving gear 130 is press fit onto the second driving shaft 126 such that when the second driving shaft 126 rotates when the second driving pulley 122 is driven by the belt 118, the second driving gear 130 is driven. In a preferred embodiment of the present invention, the second driving gear 130 includes 20 teeth, for example.

In a preferred embodiment, a first driving shaft bearing 1241 is attached to an upper portion of the first driving shaft 124. Preferably, the first driving shaft bearing 1241 is housed within the driving shaft bearing recess 452L of the frame 104, and the first driving shaft bearing 1241 is press fit into the driving shaft bearing recess 452L. The first driving shaft bearing 1241 rotatably supports the first driving shaft 124 via the frame 104 and facilitates rotation of the first driving shaft 124 with respect to the frame 104.

Similarly, as shown in FIG. 13, a second driving shaft bearing 1261 is attached to an upper portion of the second driving shaft 126. Preferably, the second driving shaft bearing 1261 is housed within the driving shaft bearing recess 452R of the frame 104, and the second driving shaft bearing 1261 is press fit into the driving shaft bearing recess 452R. The second driving shaft bearing 1261 rotatably supports the second driving shaft 126 via the frame 104 and facilitates rotation of the second driving shaft 126 with respect to the frame 104.

In a preferred embodiment of the present invention, as shown in FIG. 13, the agricultural tool 100 includes a tensioner 132, which is attached to the frame 104. Preferably, the tensioner 132 includes a tensioner shaft 1321, a tensioner bearing 1322 attached to a first end of the tensioner shaft 1321, and a tensioner nut 1323 attached to a second end of the tensioner shaft 1321. The tensioner shaft 1321 extends through the tensioner bearing 1322, and the tensioner bearing 1322 is in contact with the belt 118. The tensioner shaft 1321 can slide within the elongated hole 431 of the frame 104 in a front-rear direction to adjust an amount of tension applied to the belt 118. The tensioner nut 1323 is used to fix the tensioner shaft 1321 at a fixed position within the elongated hole 431 when a desired amount of tension is being applied to the belt 118.

As discussed above with respect to FIGS. 12 and 13, for example, the motor 106 drives the motor pulley 116 which in turn drives the belt 118. When the belt 118 is driven, the first driving pulley 120 and the second driving pulley 122, which are in contact with the belt 118, are driven and rotated. When the first driving pulley 120 and the second driving pulley 122 rotate, the first driving shaft 124 and the second driving shaft 126 rotate. As a result, the first driving gear 128 which is attached to the first driving shaft 124 rotates, and the second driving gear 130 which is attached the second driving shaft 126 rotates. Thus, a single motor (the motor 106) can be used to drive (simultaneously drive) the first driving gear 128 and the second driving gear 130.

Although a preferred embodiment of the present invention discussed above includes the motor pulley 116, the belt 118, the first driving pulley 120, and the second driving pulley 122 to drive the first driving gear 128 and the second driving gear 130 using the motor 106, a gear system including a plurality of gears (e.g., gear with teeth, magnetic gears, etc.) can be used in place of the motor pulley 116, the belt 118, the first driving pulley 120, and the second driving pulley 122 to drive the first driving gear 128 and the second driving gear 130 using the motor 106.

Figure 14:
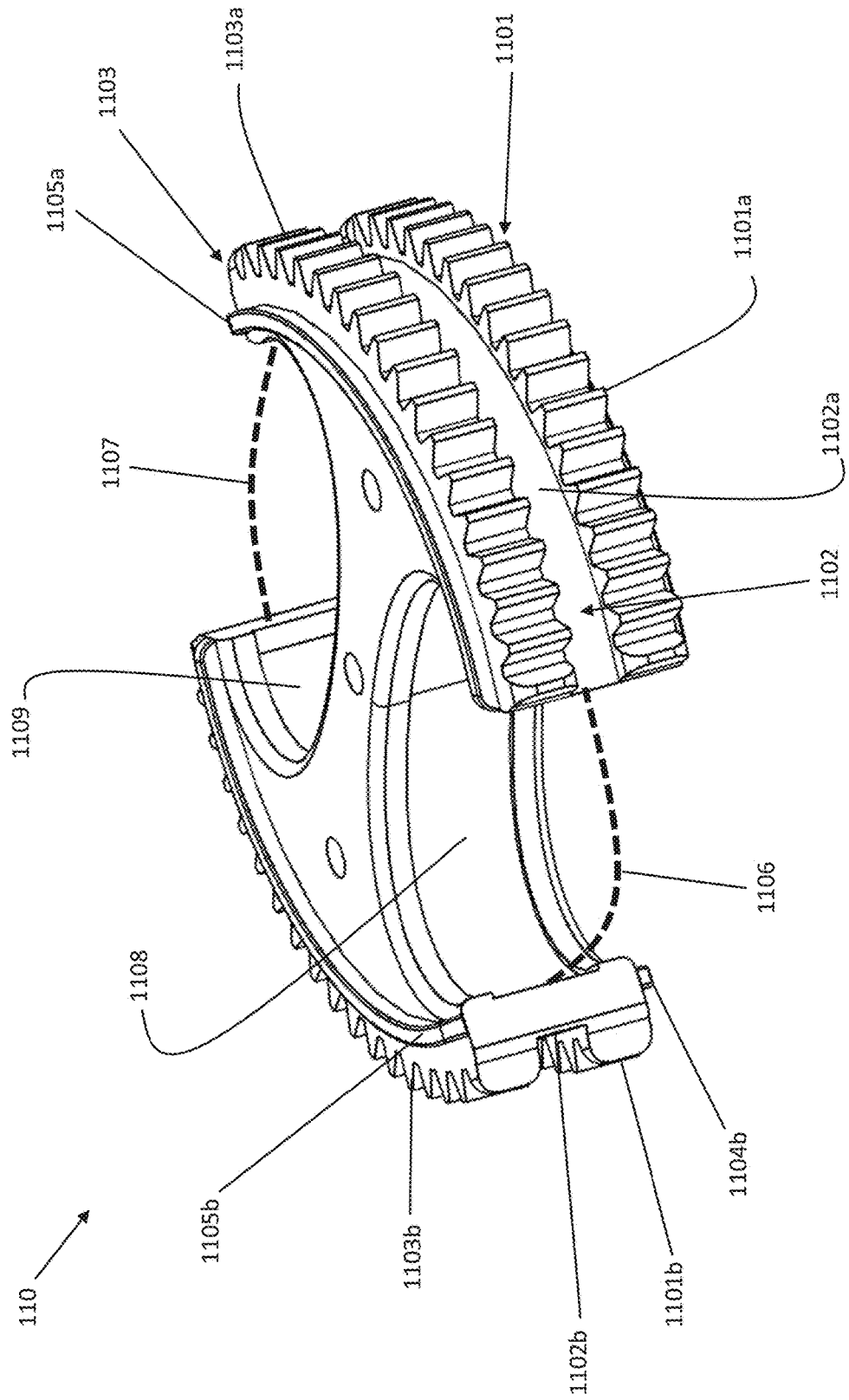
FIG. 14 shows a front perspective view of a main gear included in an agricultural tool according to a preferred embodiment of the present invention.
Figure 15:
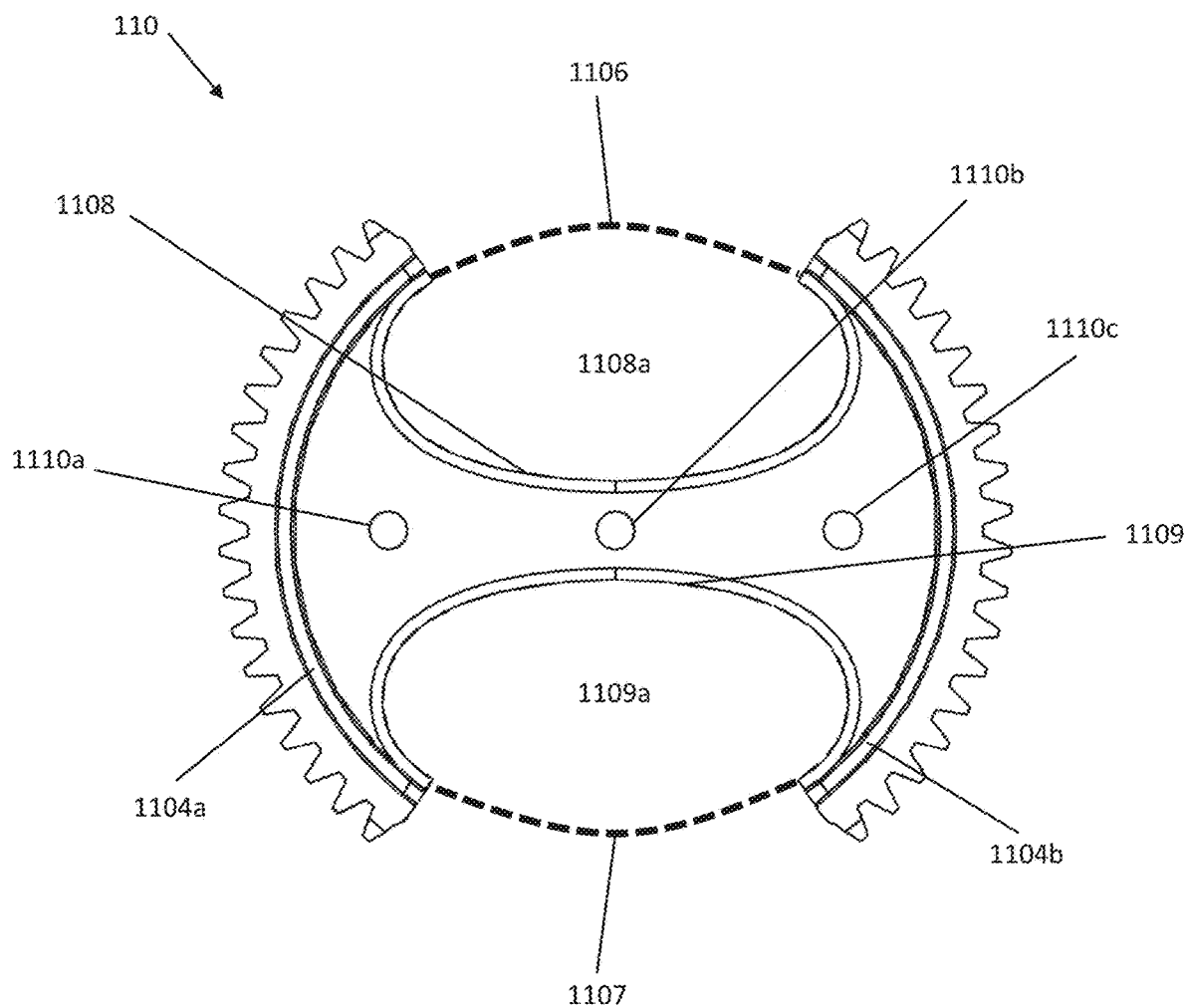
FIG. 15 shows a bottom view of a main gear included in an agricultural tool according to a preferred embodiment of the present invention.

FIG. 14 is a front perspective view of a main gear 110 according to a preferred embodiment of the present invention. FIG. 15 is a bottom view of a main gear 110 according to a preferred embodiment of the present invention. A main gear 110 according to a preferred embodiment of the present invention will be discussed below with respect to FIGS. 14 and 15.

In a preferred embodiment, the main gear 110 includes a plurality of layers. For example, the main gear can include a bottom layer 1101, a center layer 1102, and an upper layer 1103, as shown in FIG. 14. The plurality of layers of the main gear 110 can be fastened together using bolts, screws, or the like that extend through fastening holes of the bottom layer 1101, the center layer 1102, and the upper layer 1103. For example, FIG. 15 shows fastening holes 1110a, 1110b, and 1110c that extend through each of the bottom layer 1101, the center layer 1102, and the upper layer 1103, and FIG. 13 shows an example of a main gear shaft 1111 that extends through fastening holes of the bottom layer 1101, the center layer 1102, and the upper layer 1103 to fix the bottom layer 1101, the center layer 1102, and the upper layer 1103 together.

Preferably, the bottom layer 1101 includes a plurality of teeth portions along a periphery of the bottom layer 1101, and a plurality of openings between the plurality of teeth portions along the periphery of the bottom layer 1101. For example, FIG. 14 shows a preferred embodiment in which the bottom layer 1101 includes a first teeth portion 1101a and a second teeth portion 1101b along the periphery of the bottom layer 1101, and two openings between the first teeth portion 1101a and the second teeth portion 1101b, along the periphery of the bottom layer 1101. In the preferred embodiment shown in FIG. 14, the first teeth portion 1101a and the second teeth portion 1101b each include 18 teeth, for example. Furthermore, although FIG. 14 shows a bottom layer 1101 of the main gear 110 that includes two teeth portions (the first teeth portion 1101a and the second teeth portion 1101b) and two openings, the bottom layer 1101 of the main gear 110 can include three or more teeth portions and openings along the periphery of the bottom layer 1101.

In a preferred embodiment of the present invention, as shown in FIGS. 14 and 15, the main gear 110 includes a bottom track portion 1104 that is attached to a bottom surface of the bottom gear layer 1101. Preferably, the bottom track portion 1104 includes a first bottom track portion 1104a that is attached only to a portion of the bottom surface of the bottom layer 1101 that corresponds to the first teeth portion 1101a. Preferably, the bottom track portion 1104 includes a second bottom track portion 1104b that is attached only to a portion of the bottom surface of the bottom layer 1101 that corresponds to the second teeth portion 1101b. The bottom track portion 1104 extends within the left bottom groove portion 462L and the right bottom groove portion 462R of the frame 104 when the main gear 110 rotates within the frame 104, as discussed in more detail below.

Preferably, the center layer 1102 includes a plurality of curved portions along the periphery of the center layer 1102, and a plurality of openings between the plurality of curved portions, along a periphery of the center layer 1102. For example, FIG. 14 shows a preferred embodiment in which the center layer 1102 includes a first curved portion 1102a and a second curved portion 1102b along the periphery of the center layer 1102, and two openings between the first curved portion 1102a and the second curved portion 1102b, along the periphery of the center layer 1102. Furthermore, although FIG. 14 shows a main gear 110 that includes two curved portions (the first curved portion 1102a and the second curved portion 1102b) and two openings, the center layer 1102 of the main gear can include three or more curved portions and openings along a periphery of the center layer 1102.

Preferably, the upper layer 1103 includes a plurality of teeth portions along the periphery of the upper layer 1103, and a plurality of openings between the plurality of teeth portions, along the periphery of the upper layer 1103. For example, FIG. 14 shows a preferred embodiment of the present invention in which the upper layer 1103 includes a first teeth portion 1103a and a second teeth portion 1103b along the periphery of the upper layer 1103, and two openings between the first teeth portion 1103a and the second teeth portion 1103b, along the periphery of the upper layer 1103. In the preferred embodiment shown in FIG. 14, the first teeth portion 1103a and the second teeth portion 1103b each include 18 teeth, for example. Furthermore, although FIG. 14 shows an upper layer 1103 of the main gear 110 that includes two teeth portions (the first teeth portion 1103a and the second teeth portion 1103b) and two openings, the upper layer 1103 of the main gear 1101 can include three or more teeth portions and openings along a periphery of the upper layer 1103.

In a preferred embodiment of the present invention, as shown in FIG. 14, the main gear 110 includes a top track portion 1105 that is attached to an upper surface of the upper gear layer 1103. Preferably, the top track portion 1105 includes a first top track portion 1105a that is attached only to a portion of the upper surface of the upper layer 1103 that corresponds to the first teeth portion 1103a of the upper layer 1103, and a second top track portion 1105b that is attached only to a portion of the upper surface of the upper layer 1103 that corresponds to the second teeth portion 1103b of the upper layer 1103. The top track portion 1105 extends within the left top groove portion 463L and the right top groove portion 463R of the frame 104 when the main gear 110 rotates within the frame 104, as discussed in more detail below.

In a preferred embodiment of the present invention, the main gear 110 can include the bottom track portion 1104 without including the top track portion 1105. Similarly, in a preferred embodiment, the main gear 110 can include the top track portion 1105 without including the bottom track portion 1104.

In a preferred embodiment of the present invention, and as shown in FIG. 14, a diameter of the bottom layer 1101 and a diameter of the upper layer 1103 are larger than a diameter of the center layer 1102. Thus, a combination of the bottom layer 1101, the upper layer 1103, and the center layer 1102 defines a first channel that corresponds to the first curved portion 1102a and a second channel that corresponds to the second curved portion 1102b. The left track portion 464L and the right track portion 464R of the frame 104 slide within the first channel and the second channel when the main gear 110 rotates within the frame 104.

In a preferred embodiment of the present invention, the openings of the bottom layer 1101, the center layer 1102, and the upper layer 1103 are included in and define a plurality of openings of the main gear 110. For example, as shown in FIGS. 14 and 15, the main gear includes a first opening 1106 and a second opening 1107 along a periphery of the main gear 110.

In a preferred embodiment of the present invention, the first opening 1106 corresponds and is attached to a first receiving space 1108a (see FIG. 15) defined by a first receiving portion 1108, shown in FIG. 14, for example. In a preferred embodiment, the first receiving portion 1108 includes a curved portion and is C-shaped, however the first receiving portion 1108 may have a different shape. Preferably, at least a portion of an inside surface of the first receiving portion 1108 includes rubber or felt.

In a preferred embodiment of the present invention, the second opening 1107 corresponds and is attached to a second receiving space 1109a (see FIG. 15) defined by a second receiving portion 1109, shown in FIG. 14, for example. In a preferred embodiment of the present invention, the second receiving portion 1109 includes a curved portion and is C-shaped, however the second receiving portion 1109 may have a different shape. Preferably, at least a portion of an inside surface of the second receiving portion 1109 includes rubber or felt or a similar material.

In a preferred embodiment of the present invention, the plurality of openings of the main gear 110 along a periphery of the main gear 110 (e.g., the first opening 1106 and the second opening 1107) are equally spaced along the periphery of the main gear 110. However, the plurality of openings of the main gear 110 do not need to be equally spaced along the periphery of the main gear 110. For example, the first opening 1106 and the second opening 1107 can both be located on a same half of the main gear 110 along the periphery of the main gear 110.

In a preferred embodiment of the present invention, the first driving gear 128 and the second driving gear 130 are configured to engage the main gear 110 to drive and rotate the main gear 110 when the motor 106 is driven, as discussed below. As discussed above with respect to FIG. 13, the motor 106 can simultaneously drive the first driving gear 128 and the second driving gear 130. In a preferred embodiment of the present invention, the main gear 110 is driven by both the first driving gear 128 and the second driving gear 130 when each of the first driving gear 128 and the second driving gear 130 is in contact with the main gear 110. For example, when the first driving gear 128 is in contact with the first teeth portion 1101a of the bottom layer 1101 and the first teeth portion 1103a of the upper layer 1103 (or the second teeth portion 1101b of the bottom layer 1101 and the second teeth portion 1103b of the upper layer 1103) and the second driving gear 130 is in contact with the second teeth portion 1101b of the bottom layer 1101 and the second teeth portion 1103b of the upper layer 1103 (or the first teeth portion 1101a of the bottom layer 1101 and the first teeth portion 1103a of the upper layer 1103) the main gear 110 is driven by both the first driving gear 128 and the second driving gear 130.

However, when the first driving gear 128 is not in contact with the main gear 110 (e.g., when the main gear 110 has been rotated such that the first opening 1106 or the second opening 1107 of the main gear 110 faces the first driving gear 128), the main gear 110 can still be driven by the second driving gear 130, which is still in contact with the main gear 110. Similarly, when the second driving gear 130 is not in contact with the main gear 110 (e.g., when the main gear 110 has been rotated such that the first opening 1106 or the second opening 1107 of the main gear 110 faces the second driving gear 130), the main gear 110 can still be driven by the first driving gear 128, which is still in contact with the main gear 110. In this manner, because at least one of the first driving gear 128 and the second driving gear 130 is always in contact with the main gear 110, the motor 106 (a single motor) can continuously drive and rotate the main gear 110 even though the main gear 110 includes the first opening 1106 and the second opening 1107 along the periphery of the main gear 110.

In a preferred embodiment of the present invention discussed above, the first driving gear 128, the second driving gear 130, and the main gear 110 include teeth. However, one or more of the first driving gear 128, the second driving gear 130, and the main gear 110 can be a magnetic gear or another type of gear.

In a preferred embodiment of the present invention, as shown in FIG. 12, the motor 106 can also be used to drive a taping gear 134, which is attached to the motor shaft 1061. For example, the taping gear 134 can be press fit onto the motor shaft 1061 such that the taping gear 134 rotates when the motor shaft 1061 rotates. In a preferred embodiment of the present invention, the taping gear 134 includes 20 teeth, for example.

Figure 16:
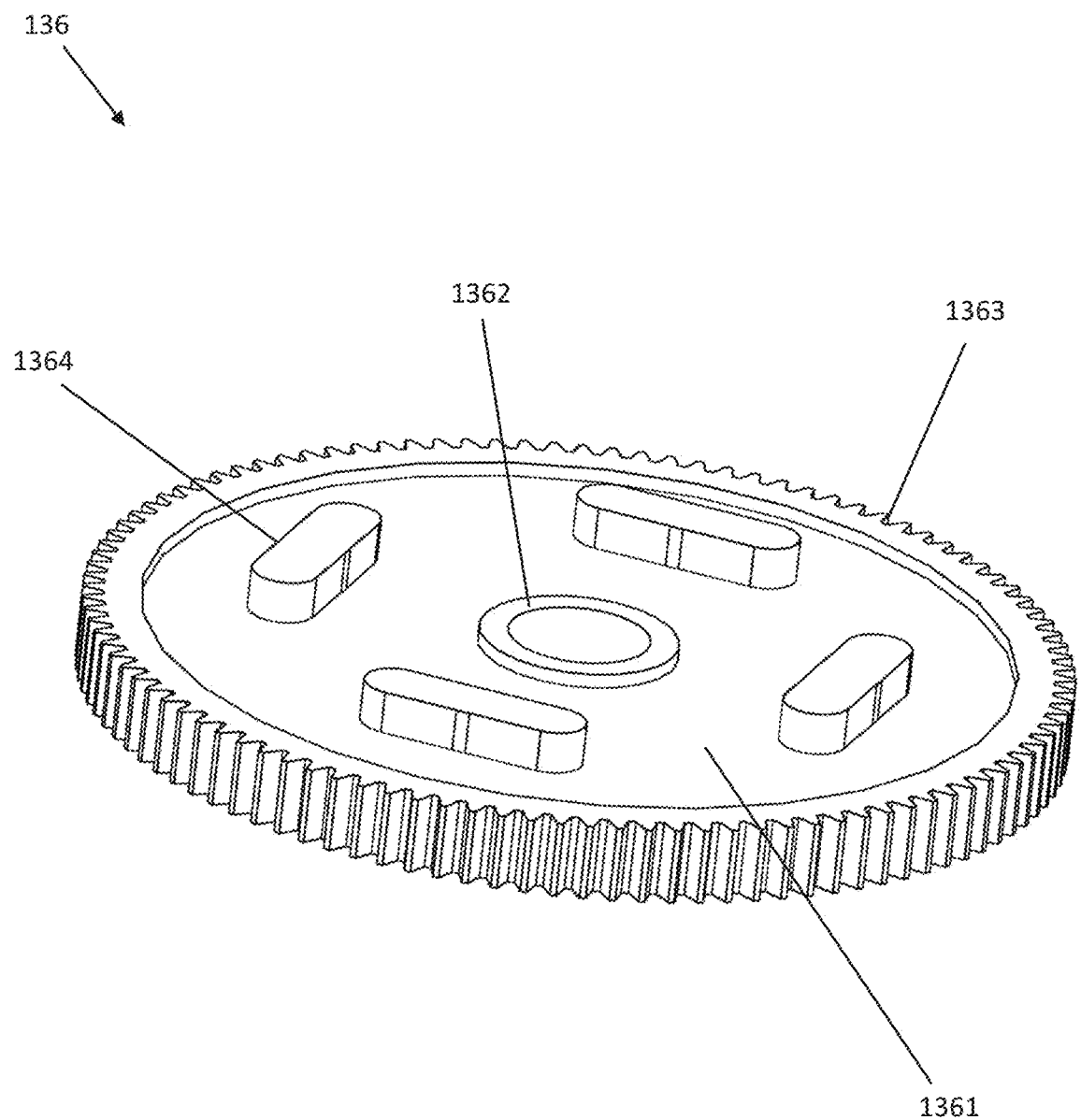
FIG. 16 shows a front perspective view of a base gear included in an agricultural tool according to a preferred embodiment of the present invention.

In a preferred embodiment, a base gear 136 is in contact with and driven by the taping gear 134, as shown in FIG. 12. As shown in FIG. 16, the base gear 136 includes a plate portion 1361, a center hole portion 1362 that includes a center hole that extends through in the plate portion 1361, and a teeth portion 1363 attached to an outer periphery of the plate portion 1361. In a preferred embodiment, the gear shaft 135 shown in FIG. 6 extends through the center hole of the center hole portion 1362. In the preferred embodiment shown in FIG. 16, the teeth portion 1363 includes 105 teeth, for example. Preferably, the teeth portion 1363 extends higher than the plate portion 1361 in the up-down direction, and the center hole portion 1362 extends higher than the plate portion 1361 in the up-down direction. In a preferred embodiment of the present invention, the base gear 136 includes four protrusions 1364 attached to a top surface of the plate portion 1361. The protrusions 1364 shown in FIG. 16 are pill-shaped, but the protrusions 1364 can have a different shape.

In a preferred embodiment of the present invention, as shown in FIG. 12, a timing gear 138 is supported by and connected to the base gear 136, and rotates with the base gear 136. For example, the timing gear 138 includes recesses (not shown) on a bottom surface of the timing gear 138, and the recesses accommodate the protrusions 1364 of the base gear 136 such that the timing gear 138 rotates with the base gear 136.

Figure 17:
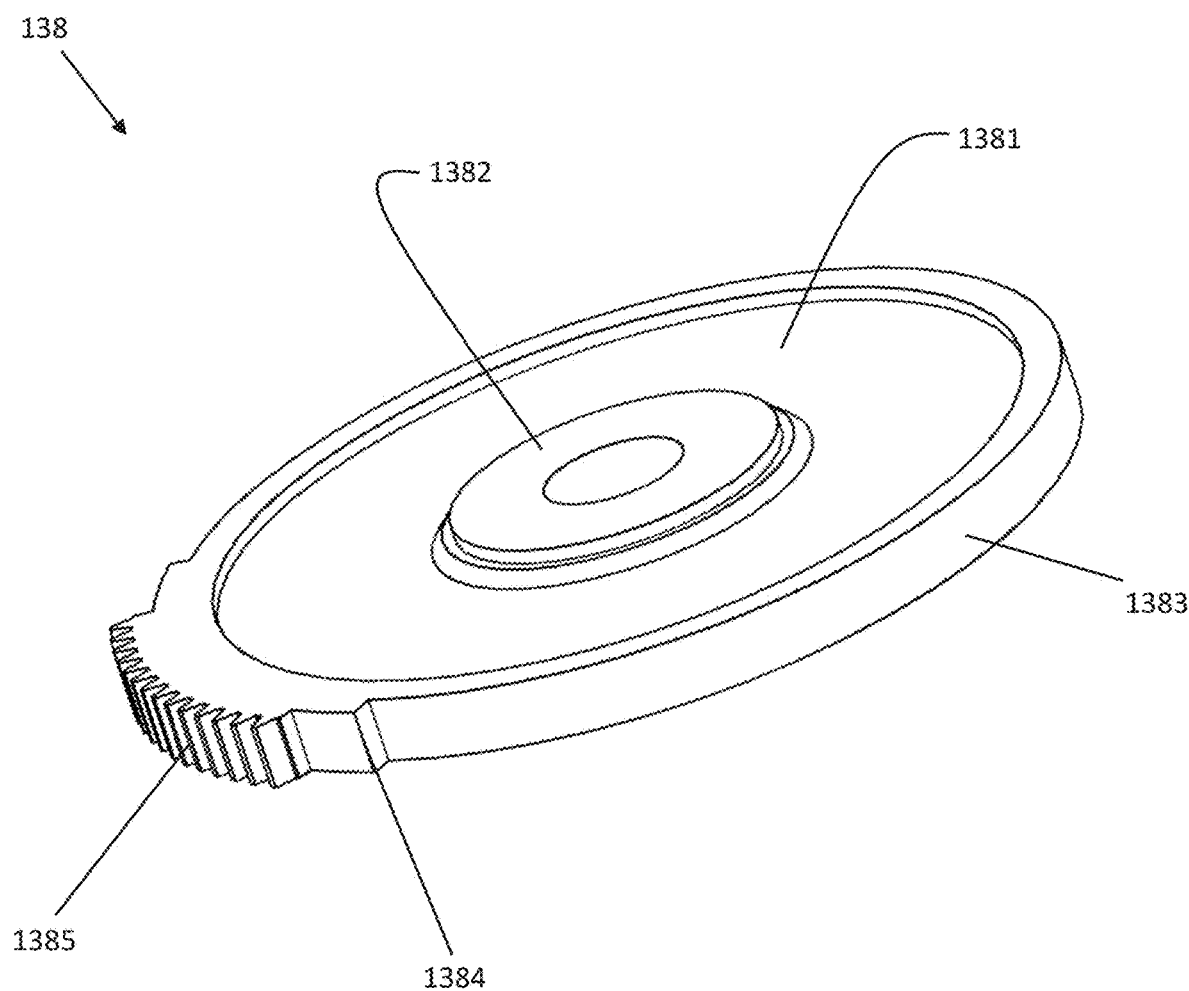
FIG. 17 shows a front perspective view of a timing gear included in an agricultural tool according to a preferred embodiment of the present invention.

In a preferred embodiment, as shown in FIG. 17, the timing gear 138 includes a plate portion 1381, a center hole portion 1382 that includes a center hole that extends through in the plate portion 1381, and an outer edge portion 1383 that is attached to an outer periphery of the plate portion 1381. Preferably, the center hole portion 1382 includes a plurality of steps that extend from the plate portion 1381, and the gear shaft 135 extends through the center hole of the center hole portion 1382. The outer edge portion 1383 can extend higher than the plate portion 1381 in the up-down direction, and the timing gear 138 can include a reinforcement portion 1384 that is attached to a portion of the outer edge portion 1383. The timing gear includes a teeth portion 1385, and the teeth portion 1385 is preferably attached to a portion of the reinforcement portion 1384. Thus, the teeth portion 1385 is only attached to a portion of a periphery of the outer edge portion 1383. In the preferred embodiment shown in FIG. 17, the teeth portion 1385 includes 14 teeth, for example.

Figure 18:
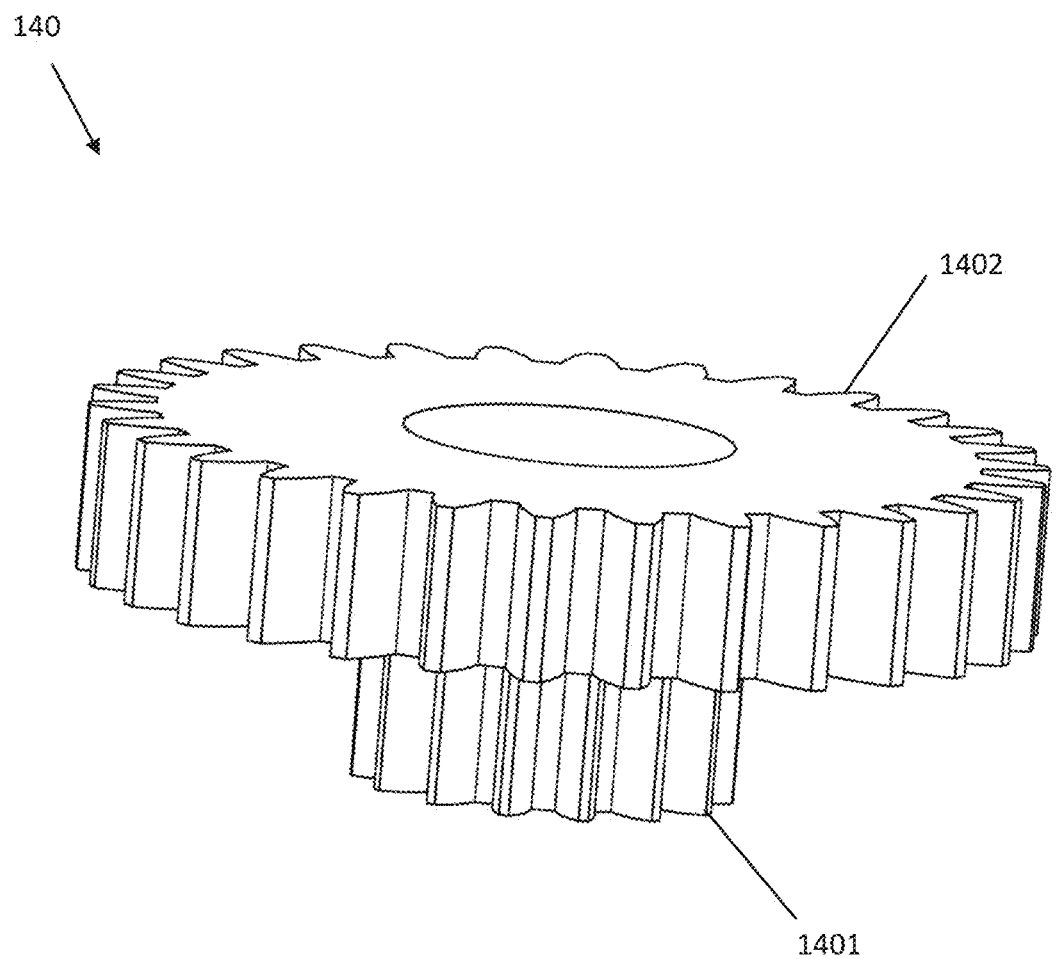
FIG. 18 shows a front perspective view of a linking gear included in an agricultural tool according to a preferred embodiment of the present invention.

In a preferred embodiment of the present invention, the teeth portion 1385 of the timing gear 138 is used to drive and rotate a linking gear 140, as shown in FIG. 12. FIG. 18 shows a linking gear 140 according to a preferred embodiment of the present invention. The linking gear 140 can include a first diameter portion 1401 and a second diameter portion 1402 attached to the first diameter portion 1401. The first diameter portion 1401 can include a first center hole that extends through the first diameter portion 1401, and the first diameter portion 1401 includes teeth that are able to contact and be driven directly by the teeth portion 1385 of the timing gear 138. In the preferred embodiment shown in FIG. 18, the first diameter portion 1401 includes 15 teeth, for example.

In a preferred embodiment, the second diameter portion 1402 is directly attached to the first diameter portion 1401 and rotates with the first diameter portion 1401. For example, the first diameter portion 1401 and the second diameter portion 1402 can be formed from a unitary structure. The second diameter portion 1402 can include a second center hole that is larger than the first center hole of the first diameter portion 1401, and the second center hole can accommodate a linking gear bearing 1403 which is attached to an upper portion of the motor shaft 1061, as shown in FIG. 13. In the preferred embodiment shown in FIG. 18, the second diameter portion 1402 includes 30 teeth, for example.

Figure 19:
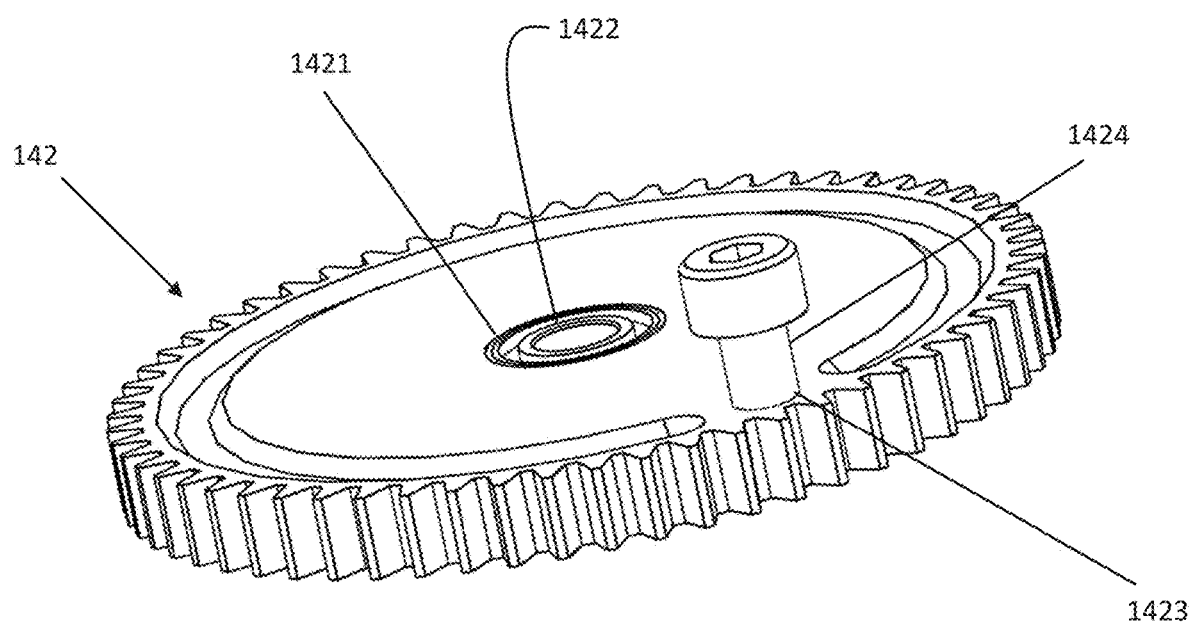
FIG. 19 shows a front perspective view of a sliding arm gear included in an agricultural tool according to a preferred embodiment of the present invention.

In a preferred embodiment, the teeth of the second diameter portion 1402 of the linking gear 140 are in contact with, and used to drive and rotate, a sliding arm gear 142, shown in FIG. 12. Preferably, as shown in FIG. 19, the sliding arm gear 142 includes a center hole 1421 that accommodates a gear shaft bearing 1422 that is attached to an upper portion of the gear shaft 135. Preferably, the sliding arm gear 142 includes a hole 1423 (e.g., a threaded hole) that extends through the sliding arm gear 142. A bolt or shaft 1424 extends through the hole 1423 and is attached to the sliding arm gear 142, such that the bolt or shaft 1424 is fixed to the sliding arm gear 142 and rotates when the sliding arm gear 142 rotates. In a preferred embodiment shown in FIG. 19, the sliding arm gear includes 60 teeth, for example.

In a preferred embodiment of the present invention discussed above, the taping gear 134, the base gear 136, the timing gear 138, the linking gear 140, and the sliding arm gear 142 include teeth. However, one or more of the taping gear 134, the base gear 136, the timing gear 138, the linking gear 140, and the sliding arm gear 142 can be a magnetic gear or another type of gear.

Figure 20:
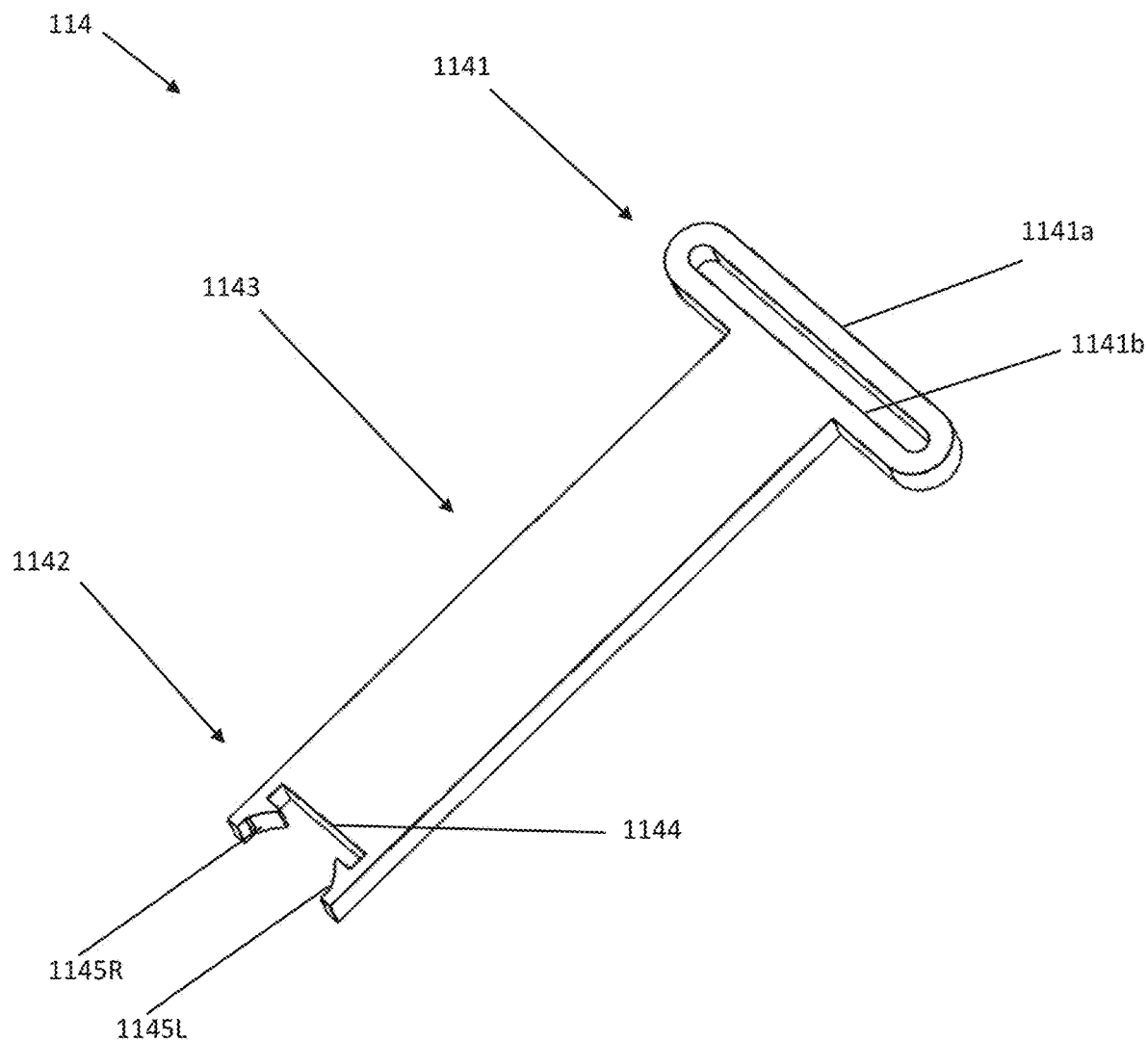
FIG. 20 shows a front perspective view of a sliding arm included in an agricultural tool according to a preferred embodiment of the present invention.

As shown in FIGS. 12 and 20, the sliding arm 114 includes a first end portion 1141 connected to a second end portion 1142 by a main body portion 1143. The first end portion 1141 includes a horizontal base portion 1141a including an elongated hole 1141b that extends in a left-right direction and through which the bolt or shaft 1242 fixed to the sliding arm gear 142 extends, so as to attach the sliding arm 114 to the sliding arm gear 142. The main body portion 1143 of the sliding arm 114 is slidingly supported by the first sliding arm support portion 1042 and the second sliding arm support portion 1044 of the frame 104, shown in FIGS. 4 and 9, for example. In a preferred embodiment of the present invention, the sliding arm 114 is T-shaped.

As shown in FIG. 20, the second end portion 1142 of the sliding arm 114 can include a holder configured to hold a clip 146, discussed in more detail below. Preferably, the holder includes a base recess 1144 configured to hold a base portion 1461 of the clip 146, and clip arm portions 1145L and 1145R configured to hold arm portions of the clip 146. In a preferred embodiment, the clip arm portions 1145L and 1145R are curved to hold arm portions of the clip 146.

In a preferred embodiment of the present invention, a combination of the sliding arm gear 142, the bolt or shaft 1424, and the sliding arm 114 define a Scotch Yoke mechanism. A Scotch Yoke mechanism, also known as slotted link mechanism, is a reciprocating motion mechanism that converts a rotational motion into a linear motion of a slider, or vice versa. In a preferred embodiment of the present invention, the rotational motion of the sliding arm gear 142 and the bolt or shaft 1424 attached thereto is converted into a linear motion of the sliding arm 114 in a front-rear direction of the agricultural tool 100. More specifically, as the sliding arm gear 142 and the bolt or shaft 1424 rotate, the bolt or shaft 1424 slides within the elongated hole 1411b of the sliding arm 114 which causes the sliding arm 114 to move in a forward-rearward direction.

In a preferred embodiment, the sliding arm 114 is moved in a forward-rearward direction between a retracted position (e.g., a rearmost position of the sliding arm 114) and a deployed position (e.g., a forwardmost position of the sliding arm). Preferably, the holder of the sliding arm 114 is located on (directly above) the clip platform portion 443 of the second sliding arm support portion 1044 shown in FIG. 9 when the sliding arm 114 is in the retracted position, and the holder of the sliding arm 114 is located forward of, and extending beyond, the clip platform portion 443 of the second sliding arm support portion 1044 when the sliding arm 114 is in the deployed position.

Figure 21:
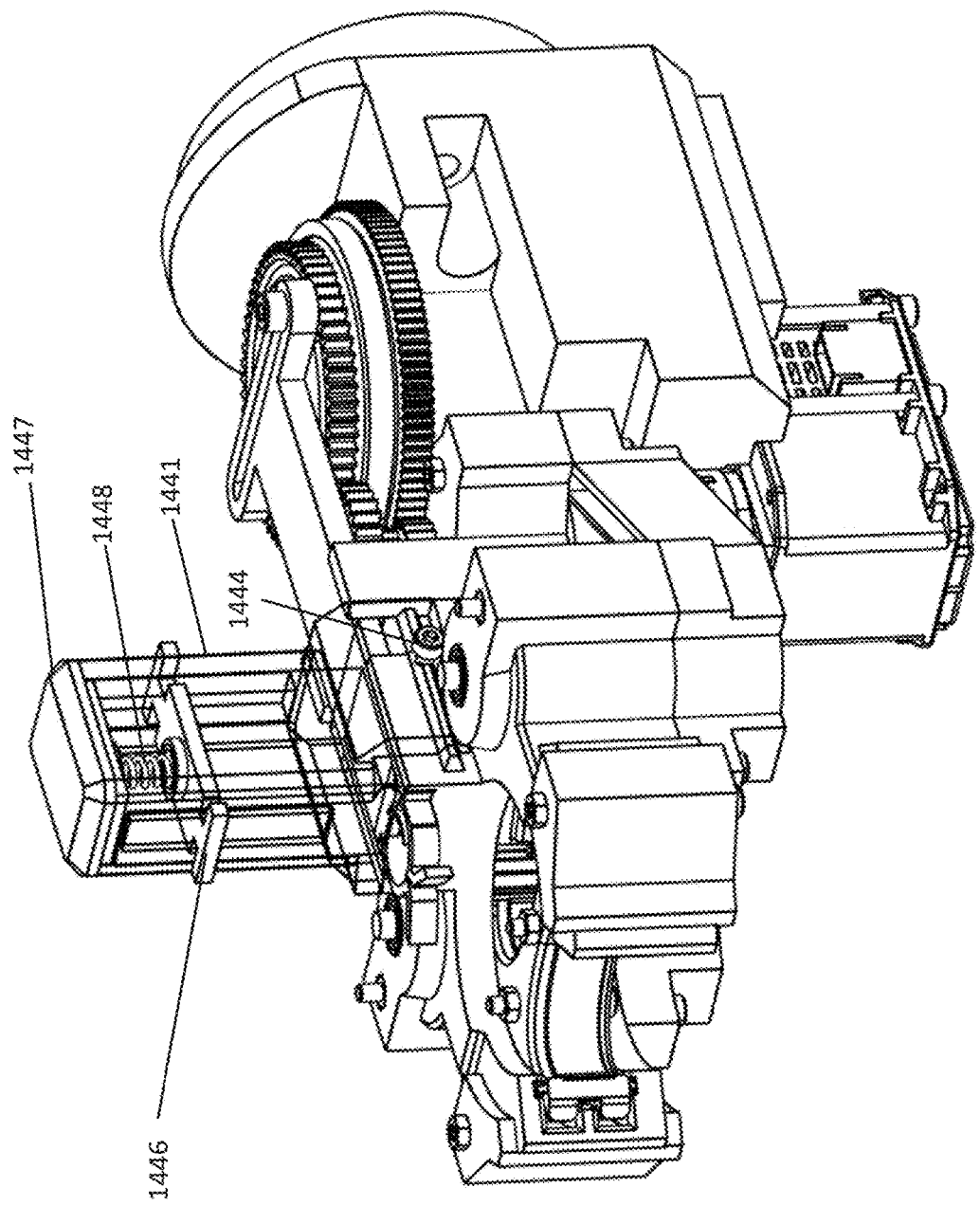
FIG. 21 shows a front perspective view of an agricultural tool according to a preferred embodiment of the present invention in which a main body and an attachment portion of a magazine are transparent to facilitate illustration of the magazine.

In a preferred embodiment of the present invention, the agricultural tool 100 includes a magazine 144, as shown in FIG. 12, for example. The magazine 144 is configured to house/hold one or more clips 146, as discussed in more detail below. Preferably, the magazine 144 includes a main body 1441 configured to house the plurality of clips, and an attachment portion 1442 attached to a bottom of the main body 1441. FIG. 21 shows a preferred embodiment of the present invention in which the main body 1441 and the attachment portion 1442 of the magazine 114 are made transparent to facilitate illustration of the magazine 114.

Figure 22:
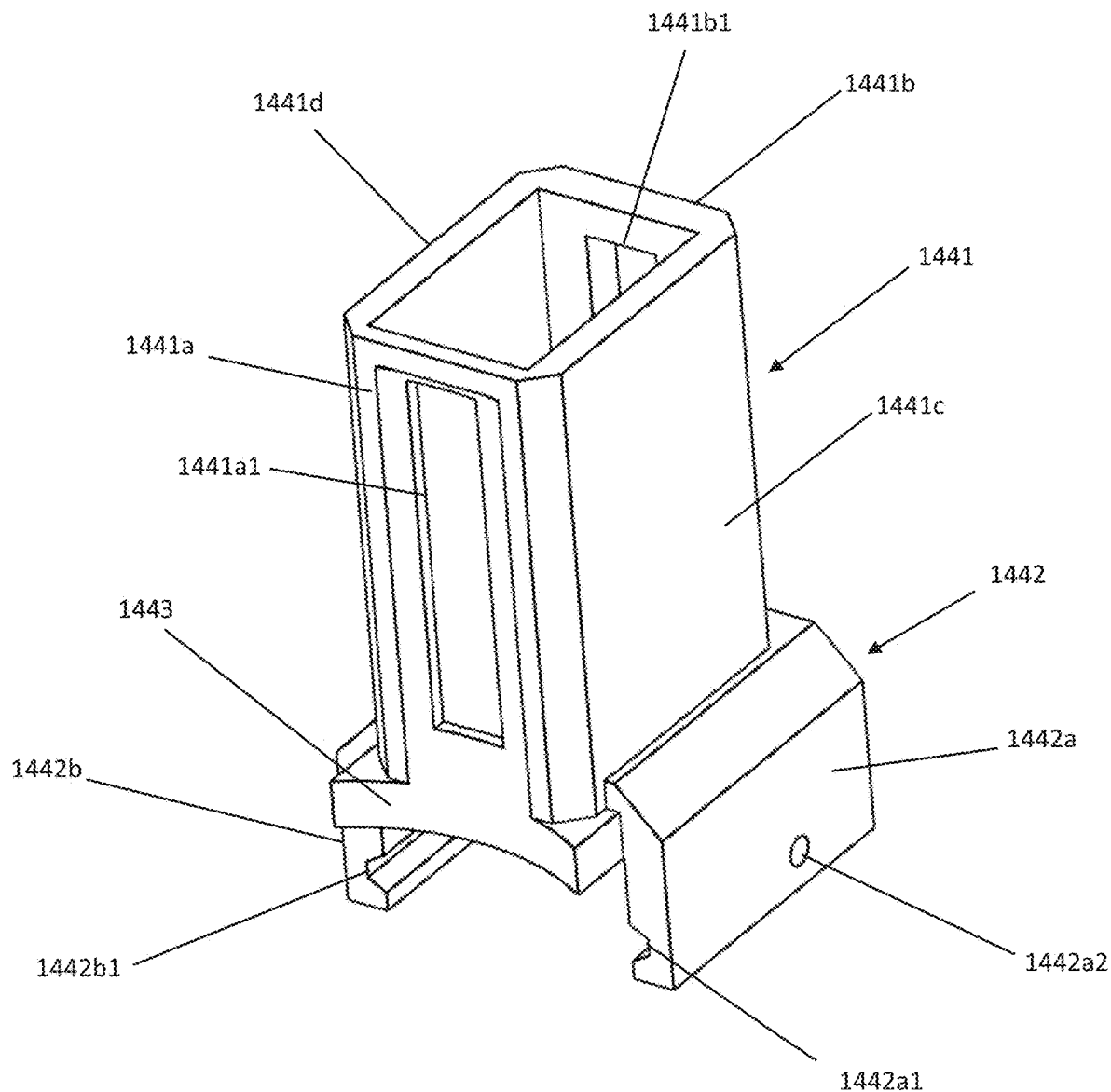
FIG. 22 shows a front perspective view of a main body and an attachment portion of a magazine included in an agricultural tool according to a preferred embodiment of the present invention.

FIG. 22 shows the main body 1441 and the attachment portion 1442 of the magazine 144. Preferably, the main body 1441 includes a front wall 1441a, a rear wall 1441b, a left wall 1441c, a right wall 1441d, and a curved portion 1443 at the bottom of main body 1441 (e.g., at a bottom of the front wall 1441a). The front wall 1441a can include a front vertical window 1141a1 that extends through the front wall 1441a and extends in an up-down direction. The rear wall 1441b can include a rear vertical window 1441b1 that extends through the rear wall 1441b and extends in an up-down direction.

The attachment portion 1442 can include a left wall 1442a and a right wall 1442b. The left wall 1442a can include a left sliding groove 1442a1 to accommodate the left magazine slide track 444 of the frame 104. The left wall 1442a can include a left fixing hole 1442a2 that extends through the left wall 1442a in a left-right direction and is located in a same location as the left sliding groove 1442a1 in an up-down direction so as to intersect the left sliding groove 1442a1. The right wall 1442b can include a right sliding groove 1442b1 to accommodate the right magazine slide track 446 of the frame 104, and the right wall 1442b includes a right fixing hole (not shown) that extends through the right wall 1442 in a left-right direction and is located in a same location as the right sliding groove 1442b1 in an up-down direction so as to intersect the right sliding groove 1442b1.

The left magazine slide track 444 of the frame 104 can slide within the left sliding groove 1442a1, and the right magazine slide track 446 of the frame 104 can slide within the right sliding groove 1442b1, such that the frame 104 can slidingly support the magazine 144. In a preferred embodiment of the present invention, a left magazine fixing bolt 1444 shown in FIG. 21 can extend through the left fixing hole 1442a2 and the hole 445 (see FIG. 9, for example) to fix the magazine 144 to the frame 104. Similarly, a right magazine fixing bolt (not shown) can extend through the right fixing hole (not shown) and the hole 447 to fix the magazine 144 to the frame 104.

Figure 23:
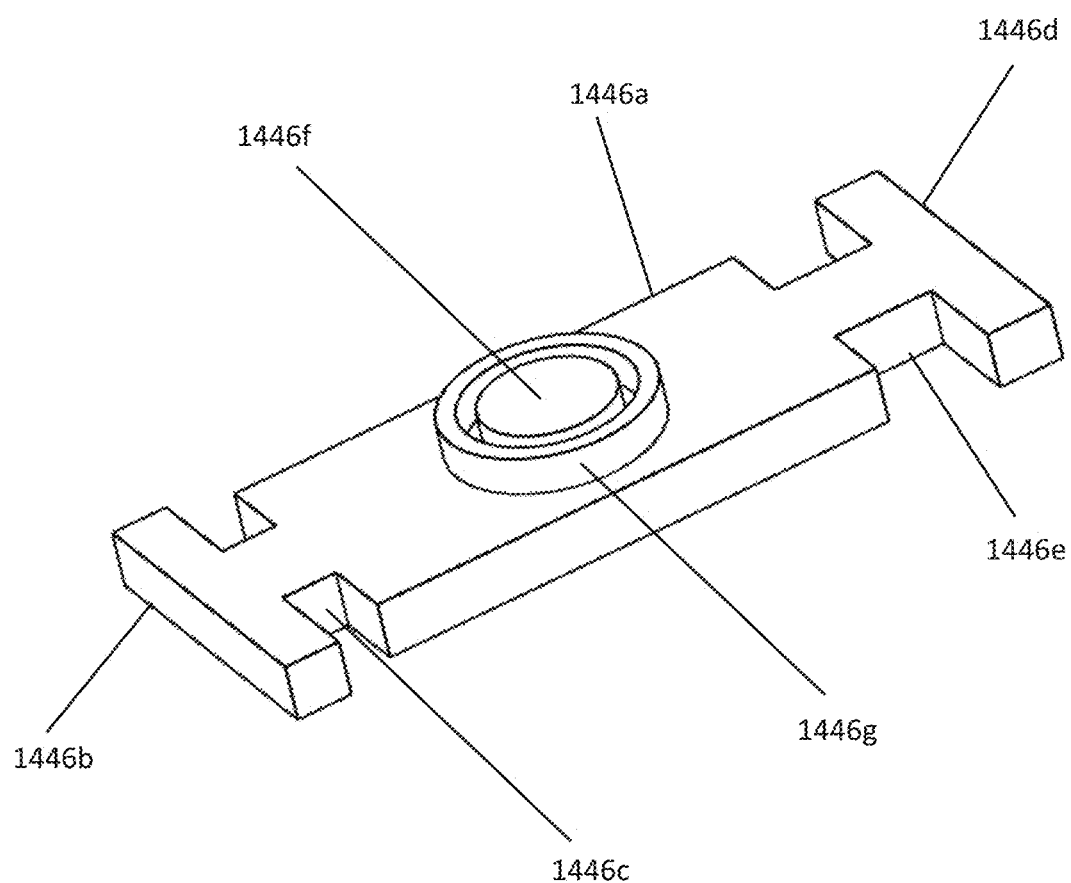
FIG. 23 shows a front perspective view of a push plate included in an agricultural tool according to a preferred embodiment of the present invention.

In a preferred embodiment of the present invention, as shown in FIG. 21, for example, the magazine 144 can include a push plate 1446 that slides within the main body 1441 of the magazine 144 in an up-down direction. As shown in FIGS. 21 and 23, the push plate can include a main plate 1446a connected to a front guide tab 1446b by a front connection portion 1446c and to a rear guide tab 1446d by a rear connection portion 1446e. The front connection portion 1446*c* can extend through the front vertical window 1141*a*1 and the rear connection portion 1446*e* can extend through the rear vertical window 1441*b*1. Preferably, the push plate 1446 includes a spring protrusion portion which includes a disk portion 1446*f* and a ring portion 1446*g*. The disk portion 1446*f* is attached to a top surface of the main plate and the ring portion 1446*g* surrounds the disk portion 1446*f*.

Figure 24:
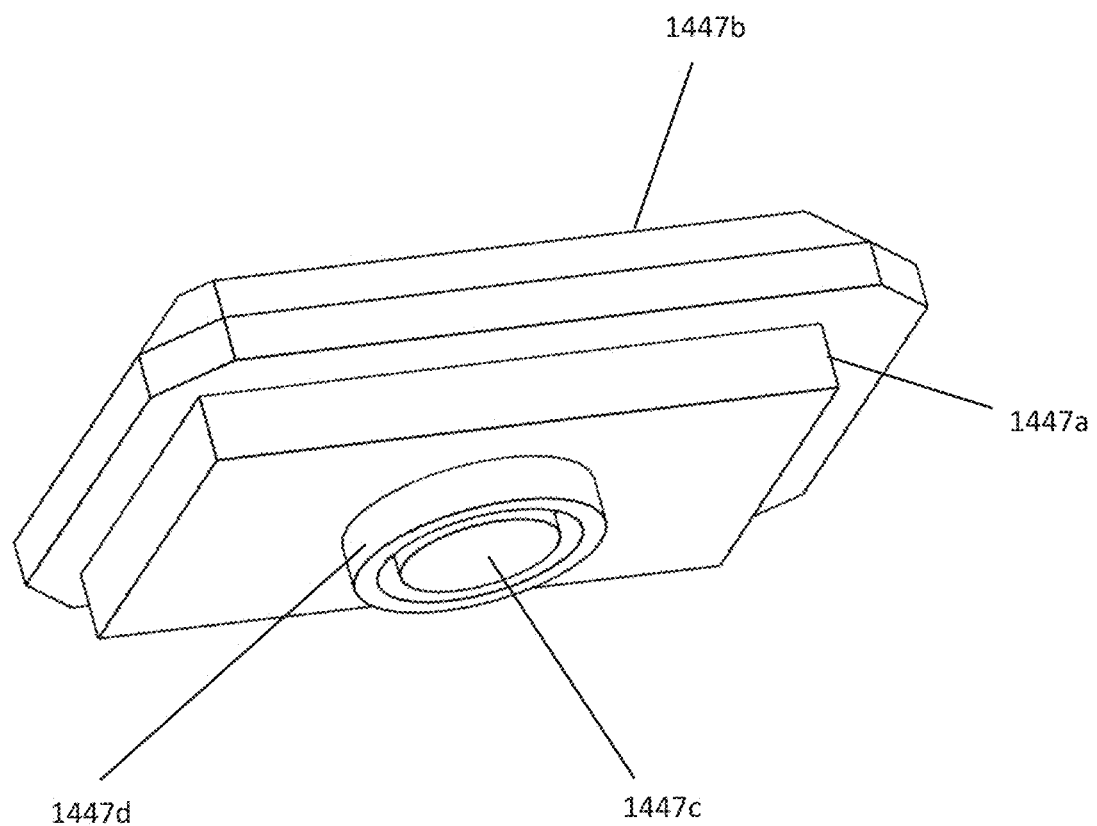
FIG. 24 shows a front perspective view of a magazine cap included in an agricultural tool according to a preferred embodiment of the present invention.

In a preferred embodiment of the present invention, as shown in FIG. 21, for example, the magazine 144 includes a magazine cap 1447. Preferably, the magazine cap 1447 includes a lower portion 1447*a* and an upper portion 1447*b* attached to the lower portion 1447*a*, as shown in FIG. 24. Preferably, the lower portion 1447*a* is rectangularly or substantially rectangularly shaped and is configured to fit within an upper portion of the main body 1441 of the magazine 114. In a preferred embodiment, the magazine cap 1447 includes a spring protrusion portion that is attached to a lower surface of the lower portion 1447*a*. The spring protrusion can include a disk portion 1447*c* and a ring portion 1447*d* that surrounds the disk portion 1447*c*.

In a preferred embodiment of the present invention, the magazine 144 includes a magazine spring 1448, as shown in FIG. 21, for example. Preferably, an upper end of the magazine spring 1448 is held within the spring protrusion portion of the magazine cap 1447 and a lower end of the magazine spring 1448 is held within the spring protrusion portion of the push plate 1446. The magazine spring 1448 pushes the push plate 1446 away from the magazine cap 1447 and towards the clip platform 443 of the frame 104 when the magazine 144 is attached to the frame 104, as shown in FIG. 21, for example. A preferred embodiment of the present invention can also include a biasing or elastic member other than the magazine spring 1448 to bias the push plate 1446 towards the clip platform 443.

In a preferred embodiment of the present invention, as discussed above, the magazine 144 is configured to hold one or more clips 146 within the main body 1441. The push plate 1446, which is pushed away from the magazine cap 1447 by the magazine spring 1448, applies a downward force to the one or more clips 146 housed within the magazine 144. More specifically, the one or more clips 146 are pushed downwards towards the clip platform portion 443 of the second sliding arm support portion 1044 of the frame 104. In a preferred embodiment of the present invention, when the sliding arm 114 is moved to the retracted position (e.g., a rearmost position of the sliding arm 114), a bottommost clip included in the one or more clips 146 being pushed downwards towards the clip platform portion 443 is attached to the holder of the sliding arm 114, which is located on (directly above) the clip platform portion 443, by the downward force applied by the push plate 1446.

Figure 25:
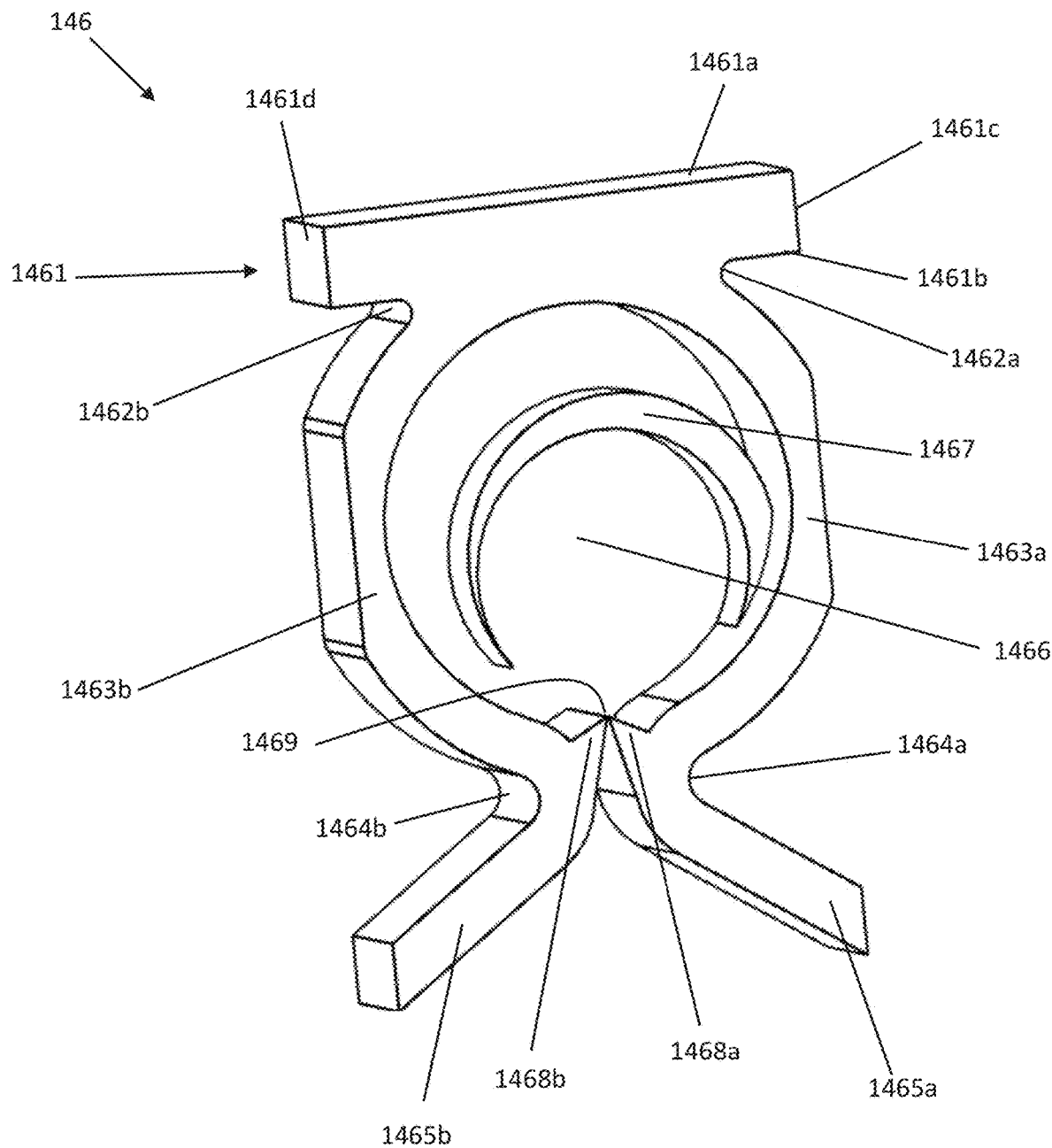
FIG. 25 shows a clip according to a preferred embodiment of the present invention.

FIG. 25 shows a clip 146 according to a preferred embodiment of the present invention. Preferably, the clip 146 includes a base portion 1461 including a rear wall surface 1461*a*, a front wall surface 1461*b*, a left wall surface 1461*c*, and a right wall surface 1461*d*. Preferably, the base portion 1461 is rectangularly or substantially rectangularly shaped.

The clip 146 can include a left arm portion including a first left portion 1463*a* and a second left portion 1465*a* connected to the first left portion 1463*a* by a left tapered portion 1464*a*. Preferably, the first left portion 1463*a* is curved and includes a flat outer surface, and the left arm portion (the first left portion 1463*a*) is connected to the base portion 1461 (the front wall surface 1461*b*) by a left connection portion 1462*a*. In a preferred embodiment, the left connection portion 1462*a* defines a curved recess.

Preferably, the second left portion 1465*a* includes a first end attached to the left tapered portion 1464*a* and a second end which is a free end. The second left portion 1465*a* extends diagonally outward from the first end towards the second end, and the second end of the second left portion 1465*a* includes a flat outer surface.

Preferably, the clip 146 can include a right arm portion including a first right portion 1463*b* and a second right portion 1465*b* connected to the first right portion 1463*b* by a right tapered portion 1464*b*. Preferably, the first right portion 1463*b* is curved and includes a flat outer surface, and the right arm portion (the first right portion 1463*b*) is connected to the base portion 1461 (the front wall surface 1461*b*) by a right connection portion 1462*b*. In a preferred embodiment, the right connection portion 1462*b* defines a curved recess.

Preferably, the second right portion 1465*b* includes a first end attached to the right tapered portion 1464*b* and a second end which is a free end. The second right portion 1465*b* extends diagonally outward from the first end towards the second end, and the second end of the second right portion 1465*b* includes a flat outer surface.

Figure 26:
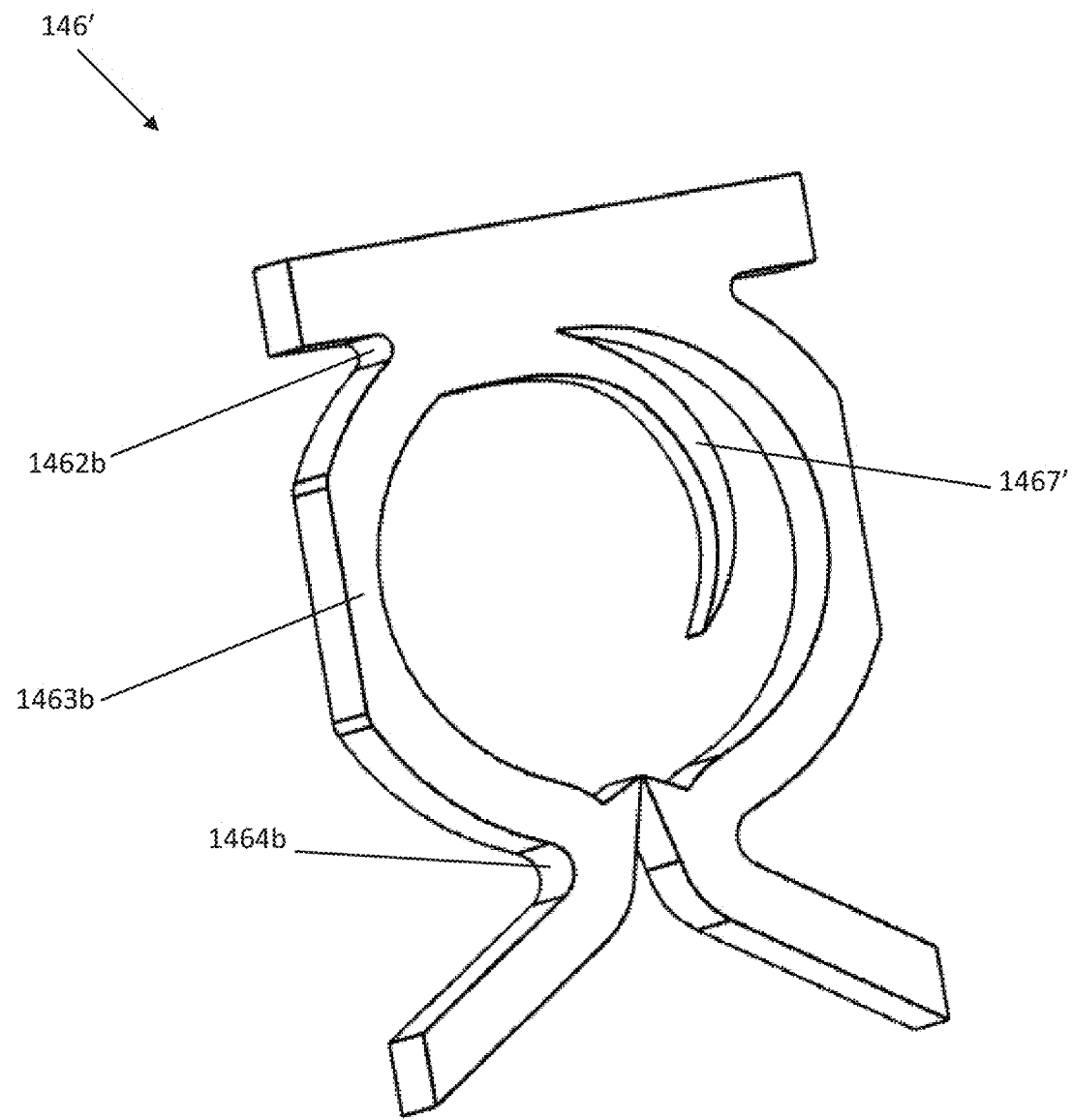
FIG. 26 shows a clip according to another preferred embodiment of the present invention.

In a preferred embodiment, the first left portion 1463*a* and the first right portion 1463*b* define a clip receiving space 1466. A curved protrusion 1467 can be located within the clip receiving space 1466. In the preferred embodiment shown in FIG. 25, the curved protrusion 1467 includes a first end attached to the first left portion 1463*a* at a position located closer to the left tapered portion 1464*a* than to the left connection portion 1462*a*, and a second end which is a free end that protrudes/cantilevers into the clip receiving space 1466. However, the first end of the curved protrusion 1467 does not need to be attached to the first left portion 1463*a*, and the first end of the curved protrusion 1467 can instead be attached to the first right portion 1463*b* or another portion of the clip 146. For example, FIG. 26 shows a clip 146' according to a preferred embodiment of the present invention in which the first end of the curved protrusion 1467' is attached to the first right portion 1463*b* at a position located closer to the right connection portion 1462*b* than the right tapered portion 1464*b*.

In a preferred embodiment of the present invention, the curved protrusion 1467 is configured to contact and hold an agricultural item of interest A when the clip 146 is attached to the agricultural item of interest A. As discussed in more detail below, an agricultural item of interest A can be a grape vine cane, a branch, a stem, a vine or another object. In a preferred embodiment, the second end of the curved protrusion 1467 protrudes/cantilevers into the clip receiving space 1466 so that the curved protrusion 1467 is configured to be flexible and able to bend if the agricultural item of interest A, such as a grape vine cane, grows when the clip 146 is attached to the agricultural item of interest A. For example, the curved protrusion 1467 is able to bend when a diameter of an agricultural item of interest A, such as a grape vine cane, increases so that the curved protrusion 1467 can more securely hold the agricultural item of interest A as the agricultural item of interest A grows.

In a preferred embodiment of the present invention, as shown in FIG. 25, for example, the left wall surface 1461*c* of the base portion 1461, the flat outer surface of the first left portion 1463*a*, and the flat outer surface of the second end of the second left portion 1465*a* are coplanar, and abut an inside surface of the left wall 1441*c* of the main body 1441 of the magazine 144 when the clip 146 is housed within the magazine 144. Similarly, the right wall surface 1461*d* of the base portion 1461, the flat outer surface of the first right portion 1463*b*, and the flat outer surface of the second end of the second right portion 1465*b* are coplanar, and abut an inside surface of the right wall 1441*d* of the main body 1441 of the magazine 144 when the clip 146 is housed within the magazine 144.

In a preferred embodiment of the present invention, as shown in FIG. 25, for example, the first left portion 1463*a* can include a middle portion located between the connection portion 1462*a* and the tapered portion 1464*a* that is thinner than a rear portion of the first left portion 1463*a* which is located closer to the connection portion 1462*a* than to the tapered portion 1464*a*. The middle portion of the first left portion 1463*a* is also thinner than a forward portion of the first left portion 1463*a* which is located closer to the tapered portion 1464*a* than to the connection portion 1462*a*.

Similarly, in the preferred embodiment shown in FIG. 25, the first right portion 1463*b* can include a middle portion, which is located between the right connection portion 1462*b* and the right tapered portion 1464*b*, and that is thinner than a rear portion of the first right portion 1463*b* which is located closer to the right connection portion 1462*b* than to the right tapered portion 1464*b*. The middle portion of the first right portion 1463*b* is also thinner than a forward portion of the first right portion 1463*b* which is located closer to the right tapered portion 1464*b* than to the right connection portion 1462*b*.

In a preferred embodiment of the present invention, as shown in FIG. 25, for example, the left arm portion of the clip 146 includes a left protrusion 1468*a* attached to the first left portion 1463*a*. However, the left protrusion 1468*a* may be attached to one or more of the first left portion 1463*a*, the left tapered portion 1464*a*, and the second left portion 1465*a*. In FIG. 25, the left protrusion 1468*a* includes a base attached to the first left portion 1463*a* and a main body that extends inwardly (towards the clip receiving space 1466) from the base to a tip of the left protrusion 1468*a*.

In a preferred embodiment, the right arm portion of the clip 146 includes a right protrusion 1468*b* attached to the first right portion 1463*b*. However, the right protrusion 1468*b* may be attached to one or more of the first right portion 1463*b*, the right tapered portion 1464*b*, and the second right portion 1465*b*. In FIG. 25, the right protrusion 1468*b* includes a base attached to the first right portion 1463*b* and a main body that extends inwardly (toward the clip receiving space 1466) from the base to a tip of the right protrusion 1468*b*.

In a preferred embodiment of the present invention, a space 1469 is located between the tip of the left protrusion 1468*a* and the tip of the right protrusion 1468*b*. In a preferred embodiment, the space 1469 defines an opening of the clip receiving space 1466.

In a preferred embodiment of the present invention, the holder included in the second end portion 1142 of the sliding arm 114 is configured to hold the clip 146. More specifically, the base recess 1144 of the sliding arm 114 can be configured to hold the base portion 1461 of the clip 146, the clip arm portion 1145L of the sliding arm 114 can be configured to hold the first left portion 1463*a* of the clip 146, and the clip arm portion 1145R of the sliding arm 114 can be configured to hold the first right portion 1463*b* of the clip 146.

As discussed above, in a preferred embodiment of the present invention, the push plate 1446, which is pushed away from the magazine cap 1447 by the magazine spring 1448, applies a downward force to the one or more clips 146 housed within the magazine 144 to push the one or more clips 146 downwards towards the clip platform portion 443 of the second sliding arm support portion 1044 of the frame 104. In a preferred embodiment of the present invention, the push plate 1446 pushes the one or more clips 146 downwards towards the clip platform portion 443 of the second sliding arm support portion 1044 such that a bottommost clip of the one or more clips 146 housed within the magazine is positioned such that the base recess 1144 of the sliding arm 114 holds the base portion 1461 of the clip 146, the clip arm portion 1145L of the sliding arm 114 holds the first left portion 1463*a* of the clip 146, and the clip arm portion 1145R of the sliding arm 114 holds the first right portion 1463*b* of the clip 146 when the sliding arm 114 is in a retracted position.

In a preferred embodiment of the present invention, the agricultural tool 100 can be used to perform a plurality of tasks, including, but not limited to, tying/twisting an agricultural item of interest A and a support structure S together, and fastening or attaching the agricultural item of interest A to the support structure S using a clip, such as the clip 146 described above.

Figure 27:
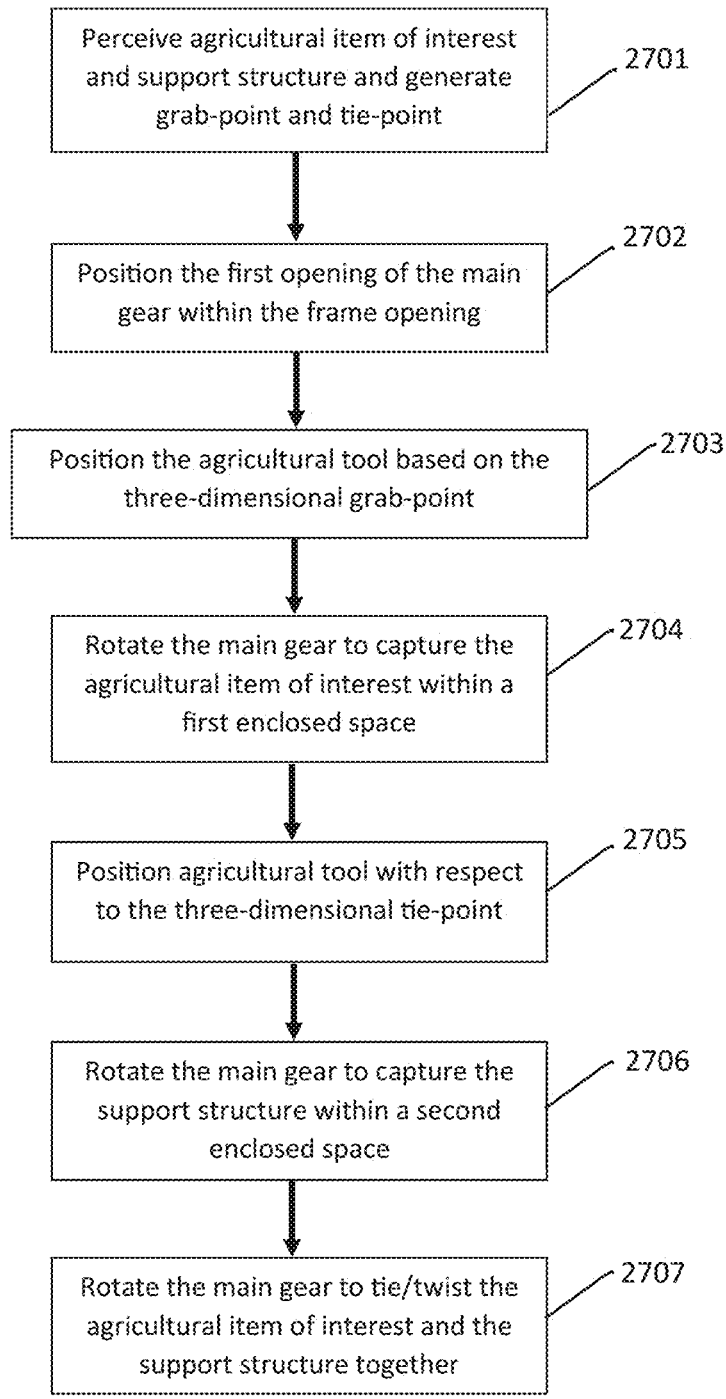
FIG. 27 is a flowchart showing a tying/twisting process performed according to a preferred embodiment of the present invention.

The task of tying/twisting an agricultural item of interest A and a support structure S together (e.g., attaching an agricultural item of interest A and a support structure S together) is discussed below with reference to steps 2701 through 2707 in the flow chart shown in FIG. 27.

In step 2701, the agricultural item of interest A and the support structure S are perceived by the agricultural system 1, a grab-point is generated for the agricultural item of interest A, and a tie-point is generated for the support structure S, as discussed in more detail below. The steps included in step 2701 are discussed in detail below with respect to the steps included in the flow chart shown in FIG. 28.

Figure 28:
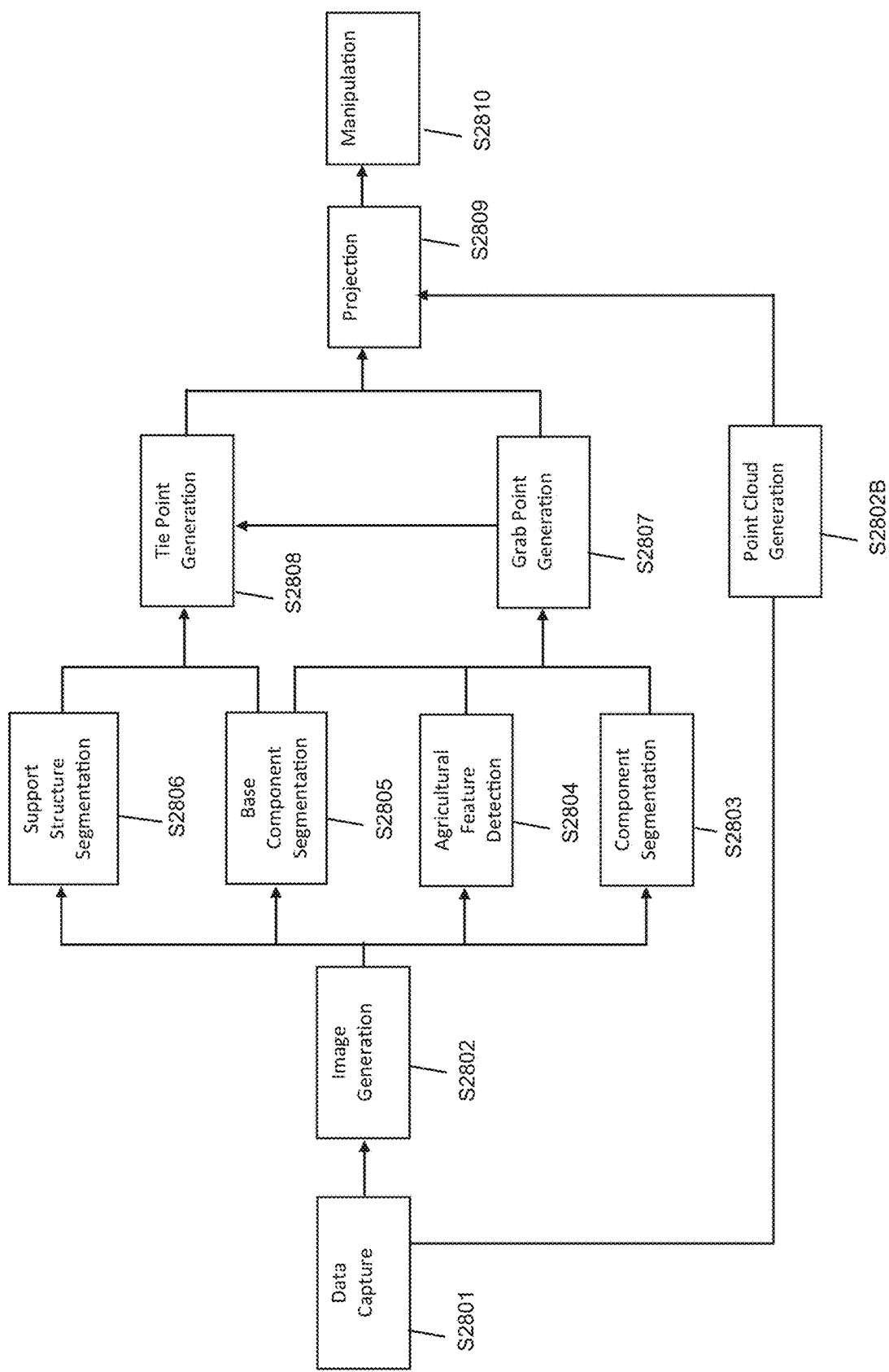
FIG. 28 is a flowchart showing a process according to a preferred embodiment of the present invention.

FIG. 28 is a flowchart showing an agricultural process according to a preferred embodiment of the present invention. The agricultural process shown in FIG. 28 includes a plurality of steps including a data capture step S2801, an image generation step S2802, a point cloud generation step S2802B, a component segmentation step S2803, an agricultural feature detection step S2804, a base component segmentation step S2805, a support structure segmentation step S2806, a grab-point generation step S2807, a tie-point generation step S2808, a projection step S2809, and a manipulation step S2810, which will be discussed in more detail below.

In a preferred embodiment of the present invention, one or more of the component segmentation step S2803, the agricultural feature detection step S2804, the base component segmentation step S2805, and the support structure segmentation step S2806 can be performed simultaneously. Alternatively, one or more of the component segmentation step S2803, the agricultural feature detection step S2804, the base component segmentation step S2805, and the support structure segmentation step S2806 can be performed individually or in series.

In a preferred embodiment of the present invention, the data capture step S2801 includes the agricultural system 1 moving to a waypoint located in front of an agricultural item of interest A (e.g., a pruned grape vine). The waypoint may be set or programmed in advanced into an on-board memory of the agricultural system 1, retrieved from a remote storage, determined according to a distance or time from a previous waypoint, or the like. Upon reaching the waypoint located in front of the agricultural item of interest, the agricultural system 1 is stopped, and the camera 20 is used to capture data regarding the agricultural item of interest.

In a preferred embodiment of the present invention, the data capture step S2801 includes using the camera 20 to capture data (e.g., image data) of the agricultural item of interest and the support structure from one or more viewpoints (e.g., one or more locations of the camera 20). For example, at each of the one or more viewpoints, the camera 20 is controlled to capture a first image (e.g., a left image) using the first lens 20a, and a second image (e.g., a right image) using the second lens 20b. The one or more viewpoints (locations of the camera 20) can be reached by controlling the horizontal frame motor 28 to move the camera 20 in the horizontal direction (along the x-axis in FIG. 1) to a plurality of locations in front of the agricultural item of interest and the support structure. The number of viewpoints can be determined based on a field of view of the camera 20 and how many viewpoints are needed to capture data of the agricultural item of interest and the support structure. In a preferred embodiment, the data captured by the camera 20 are stored in a local storage of the agricultural system 1.

Figure 29:
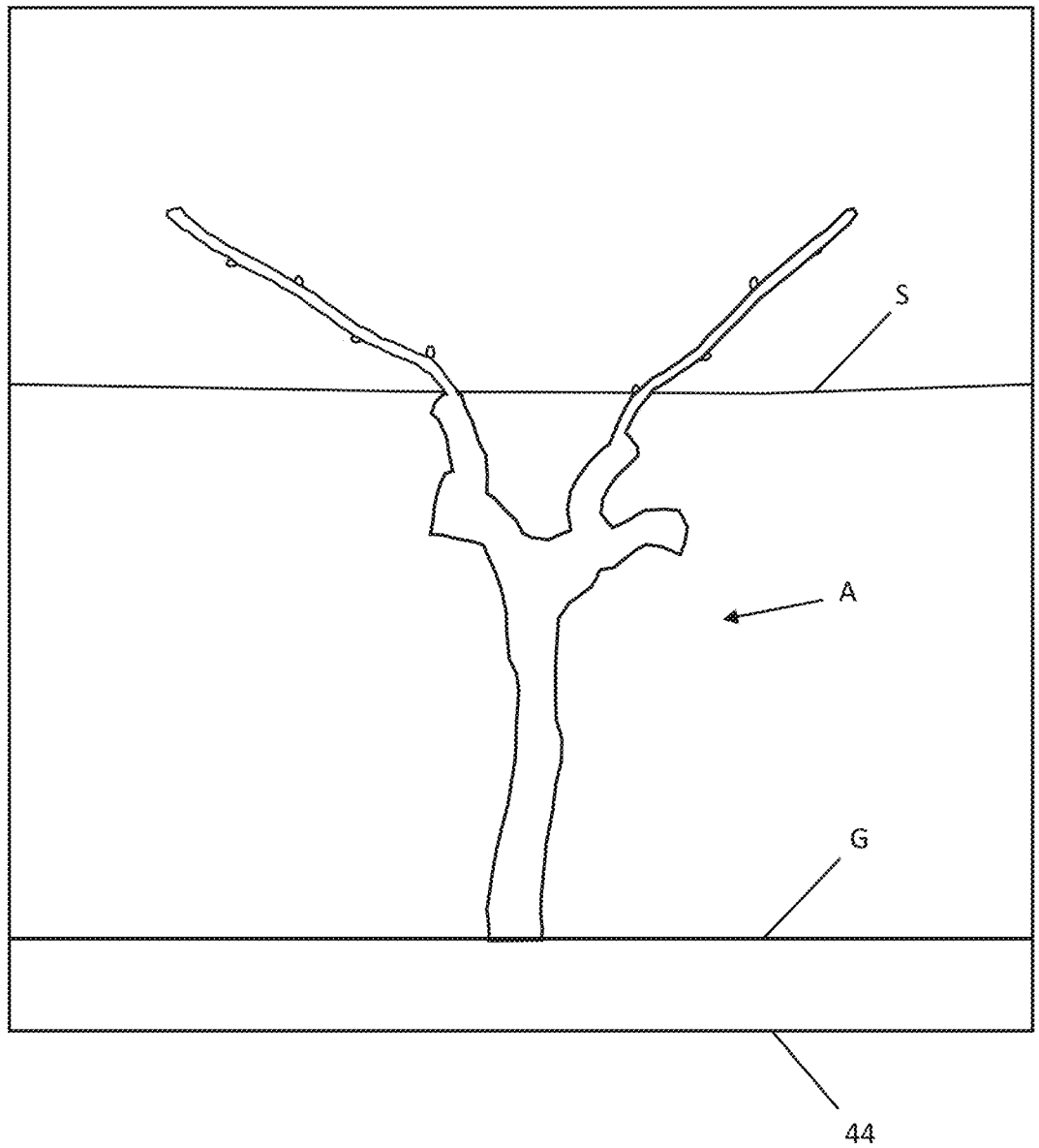
FIG. 29 shows an example of an image generated during an image generation step according to a preferred embodiment of the present invention.

In a preferred embodiment of the present invention, the image generation step S2802 includes generating an image 44 (e.g., an RGB image) including the agricultural item of interest A and the support structure S based on the data captured during the data capture step S2801. FIG. 29 shows an example of an image 44 generated during the image generation step S2802. For example, FIG. 29 shows an image 44 including a pruned grape vine (an example of an agricultural item of interest A) attached to the ground G and a wire trellis (an example of a support structure S).

In a preferred embodiment of the present invention, the component segmentation step S2803 includes identifying different segments (e.g., individual components) of the agricultural item of interest A. For example, in a case in which the agricultural item of interest A is a grape vine, the component segmentation step S2803 can include identifying different segments of the grape vine including each individual cane.

Figure 30:
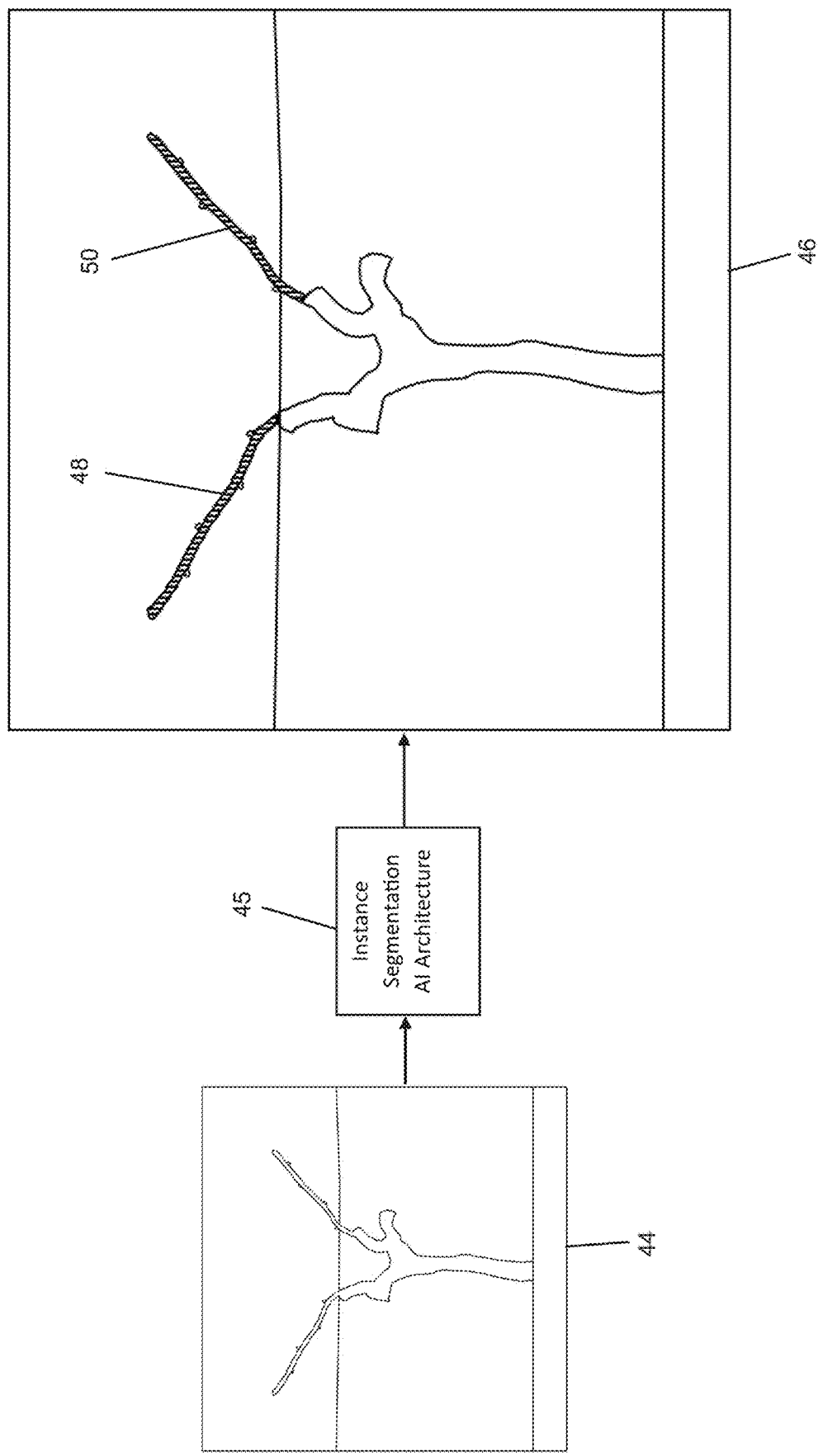
FIG. 30 shows an example of a component segmentation step according to a preferred embodiment of the present invention.

In a preferred embodiment, the component segmentation step S2803 is performed using an instance segmentation AI architecture 45. The instance segmentation AI architecture 45 can include a Fully Convolutional Network (FCN), and can be empowered by an instance mask representation scheme, which dynamically segments each instance in an image. FIG. 30 shows an example of the component segmentation step S2803 in which an instance segmentation AI architecture 45 is used to identify different segments of an agricultural item of interest A (e.g., a grape vine). The input to the instance segmentation AI architecture 45 includes an image of the agricultural item of interest. For example, as shown in FIG. 30, an input to the instance segmentation AI architecture 45 includes an image 44 generated during the image generation step S2802. The instance segmentation AI architecture 45 receives the input of the image 44 and outputs a segmented image 46. The segmented image 46 includes one or more masks that identify the different segments/individual components of the agricultural item of interest A included in the image input to the instance segmentation AI architecture 45. For example, FIG. 30 shows that the instance segmentation AI architecture 45 outputs a segmented image 46 that includes masks that identify the different segments of grape vine such as each individual cane. FIG. 30 shows that the segmented image 46 includes a plurality of masks including a first cane mask 48 that masks a first individual cane (e.g., a left cane) from the image 44 and a second cane mask 50 that masks a second individual cane (e.g., a right cane) from the image 44.

Although not shown in FIG. 30, the segmented image 46 output by the instance segmentation AI architecture 45 can also include masks that identify different segments of grape vine such as the trunk, in addition to each individual cane.

In a preferred embodiment of the present invention, the instance segmentation AI architecture 45 can include mask generation which is decoupled into mask kernel prediction and mask feature learning, which generate convolution kernels and feature maps to be convolved with, respectively. The instance segmentation AI architecture 45 can significantly reduce or prevent inference overhead with a matrix non-maximum suppression (NMS) technique, which takes an image as input (e.g., image 44), and directly outputs instance masks (e.g., the first cane mask 48 and the second cane mask 50) and corresponding class probabilities, in a fully convolutional, box-free, and grouping-free paradigm.

In a preferred embodiment, the instance segmentation AI architecture 45 uses adaptive learning and dynamic convolutional kernels for the mask prediction, and a Deformable Convolution Network (DCN) is used. For example, the SoloV2 instance segmentation framework can be used to perform the component segmentation step S2803. However, the instance segmentation AI architecture 45 can include an instance segmentation framework other than the SoloV2 framework to perform the component segmentation step S2803. For example, the instance segmentation AI architecture 45 can include a Mask-RCNN framework which includes a deep neural network that can be used to perform the component segmentation step S2803. The instance segmentation AI architecture 45 can also include an instance segmentation framework such as SOLO, TrnsorMask, YOLACT, PolarMask, and BlendMask to perform the component segmentation step S2803.

In a preferred embodiment of the present invention, the instance segmentation AI architecture 45 is trained using a segmentation dataset tailored to an instant segmentation task with respect to a particular agricultural item of interest. For example, when the agricultural item of interest is a grape vine, the segmentation dataset is tailored to an instant segmentation task with respect to a grape vine. The segmentation dataset includes a plurality of images that are selected based on factors including whether the images were captured with proper operating conditions and whether the images include an appropriate level of variety. Once the plurality of images to be included in the segmentation dataset are selected, the plurality of images are cleansed and annotated. For example, the plurality of images of the segmentation dataset can be manually annotated using a computer implemented labeling tool, as discussed in more detail below.

Figure 31:
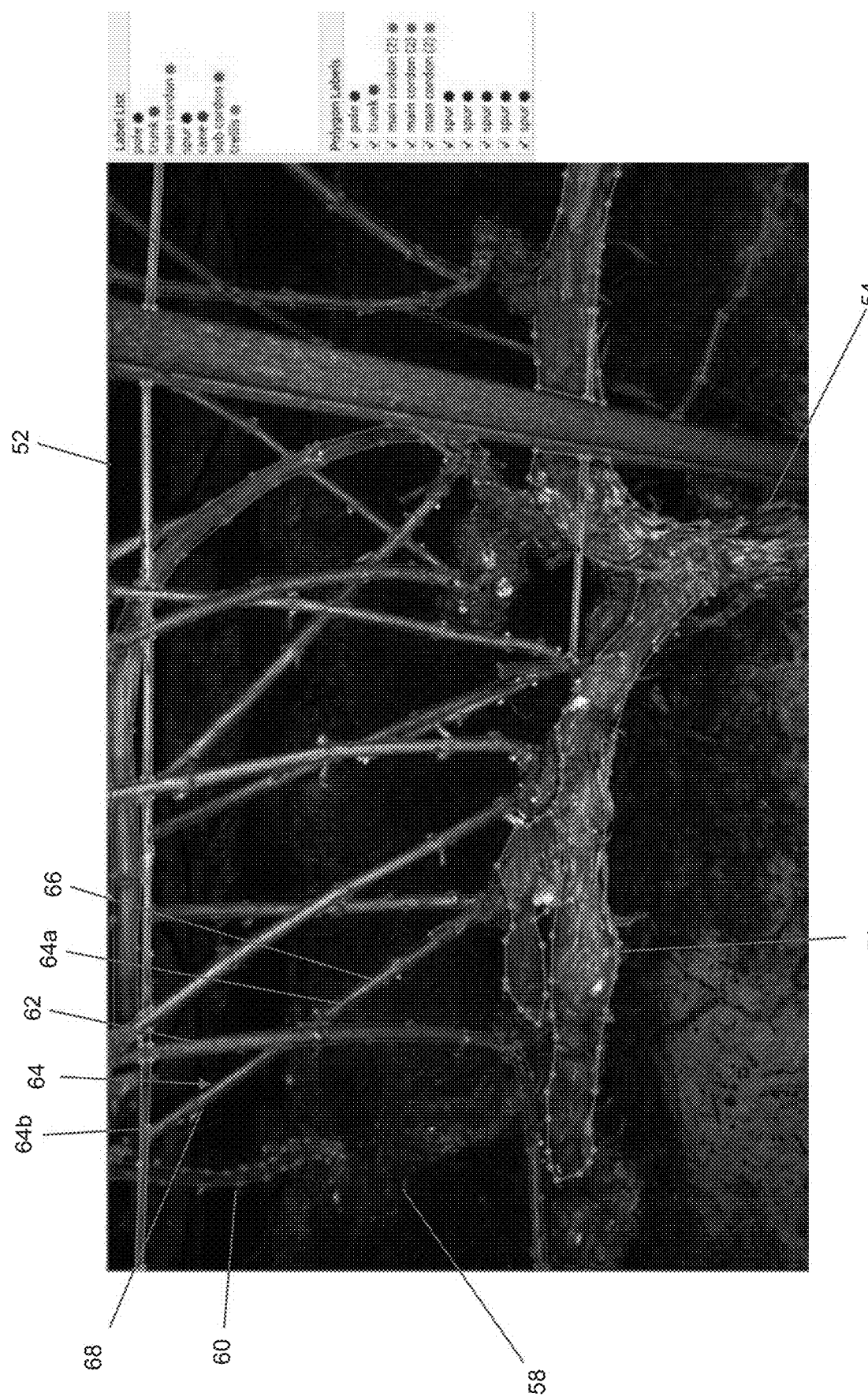
FIG. 31 shows an example of an image included in a segmentation dataset according to a preferred embodiment of the present invention.

FIG. 31 shows an example of an image 52 of the segmentation dataset which has been annotated using a computer implemented labeling tool. The computer implemented labeling tool includes a user interface that allows polygon masks to be formed around segments/individual components of the agricultural item of interest A. For example, when the agricultural item of interest A is a grape vine, the user interface of the labeling tool allows polygon masks to be formed around different segments of the grape vine including the trunk, each individual cordon, each individual spur, and each individual cane. Each polygon mask which has been formed around a segment of the agricultural item of interest is assigned a label that indicates an instance of the segment of the agricultural item of interest around which the polygon mask was formed. For example, FIG. 31 shows a trunk polygon mask 54 formed around the trunk, a cordon polygon mask 56 formed around an individual cordon, a spur polygon mask 58 formed around an individual spur, and a cane polygon mask 60 formed around an individual cane.

In a preferred embodiment of the present invention, the labeling tool allows for a particular type of annotation called group-identification based labelling that can be used to annotate discrete parts of a same segment/individual component using a same label. In other words, group-identification based labelling can be used to annotate discrete parts of a same instance using a same label. FIG. 31 shows an example in which the agricultural item of interest A is a grape vine, and the group-identification based labelling can be used to annotate discrete parts of a same cane using a same label. For example, in the image 52 show in FIG. 31, a first cane 62 overlaps/intersects a second cane 64 in the image 52, such that the image 52 includes a first discrete part 64*a* and a second discrete part 64*b* which are spaced apart from each other in the image 52 but are portions of the same second cane 64. The group-identification based labelling allows for a first polygon mask 66 to be formed around the first discrete part 64*a*, a second polygon mask 68 to be formed around the second discrete part 64*b*, and for the first polygon mask 66 and the second polygon mask 68 to be assigned a same label in order to indicate that the first discrete part 64*a* and the second discrete part 64*b* are portions of the same second cane 64, and thus assigned a common label.

In a preferred embodiment of the present invention, about 80% of the segmentation dataset is used as a training set to train and teach the network of the instance segmentation AI architecture 45, and about 20% of the segmentation dataset is used as a validation set/test set for the network included in the instance segmentation AI architecture 45, for example. However, these percentages can be adjusted such that more or less of the segmentation dataset is used as a training set and a validation set/test.

Figure 32:
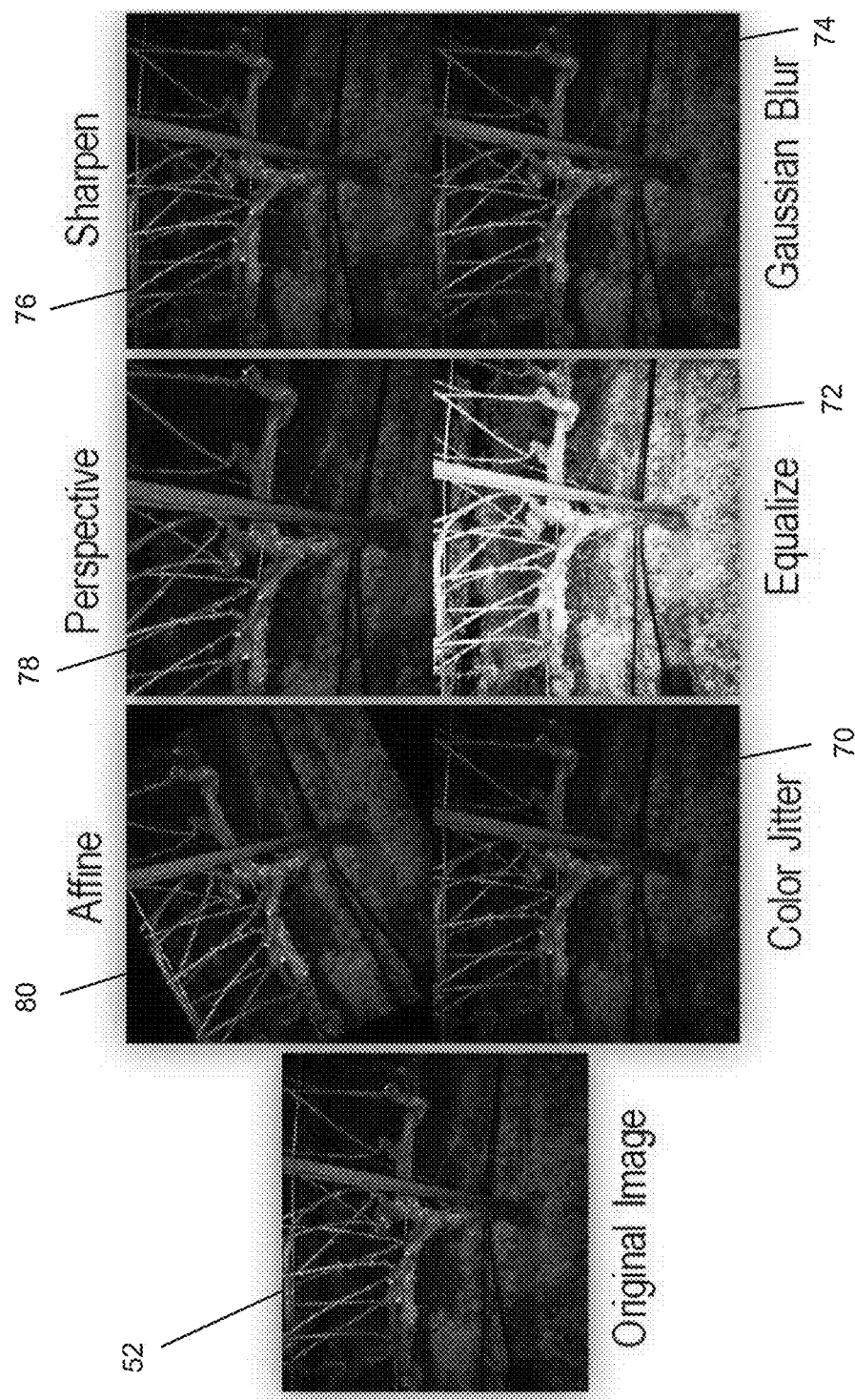
FIG. 32 shows an augmentation process according to a preferred embodiment of the present invention.

In a preferred embodiment of the present invention, an augmentation process can be used to create additional images for the segmentation dataset from existing images included in the segmentation dataset. As shown in FIG. 32, the augmentation process can include editing and changing the image 52 to create new images that can be included in the segmentation dataset to create a good distribution of images from which the network of the instance segmentation AI architecture 45 learns and trains. The augmentation process can include a plurality of different relative augmentations applied to the image 52 which allows for the network of the instance segmentation AI architecture 45 to learn and generalize over a wide range of illuminations conditions, textures, and spatial augmentations.

FIG. 32 shows examples of augmentations that can be performed on an image 52 in the augmentation process. For example, the augmentation process can include a non-perspective augmentation such as a color jitter augmentation 70, an equalize augmentation 72, a gaussian blur augmentation 74, and a sharpen augmentation 76, and/or a spatial augmentation such as a perspective augmentation 78 and an affine augmentation 80. The non-perspective augmentations can be included in a custom data-loader which works on-the-fly and reduces memory constraints. The spatial augmentations can be manually added and saved before the network of the instance segmentation AI architecture 45 is trained using an updated segmentation dataset.

Figure 33:
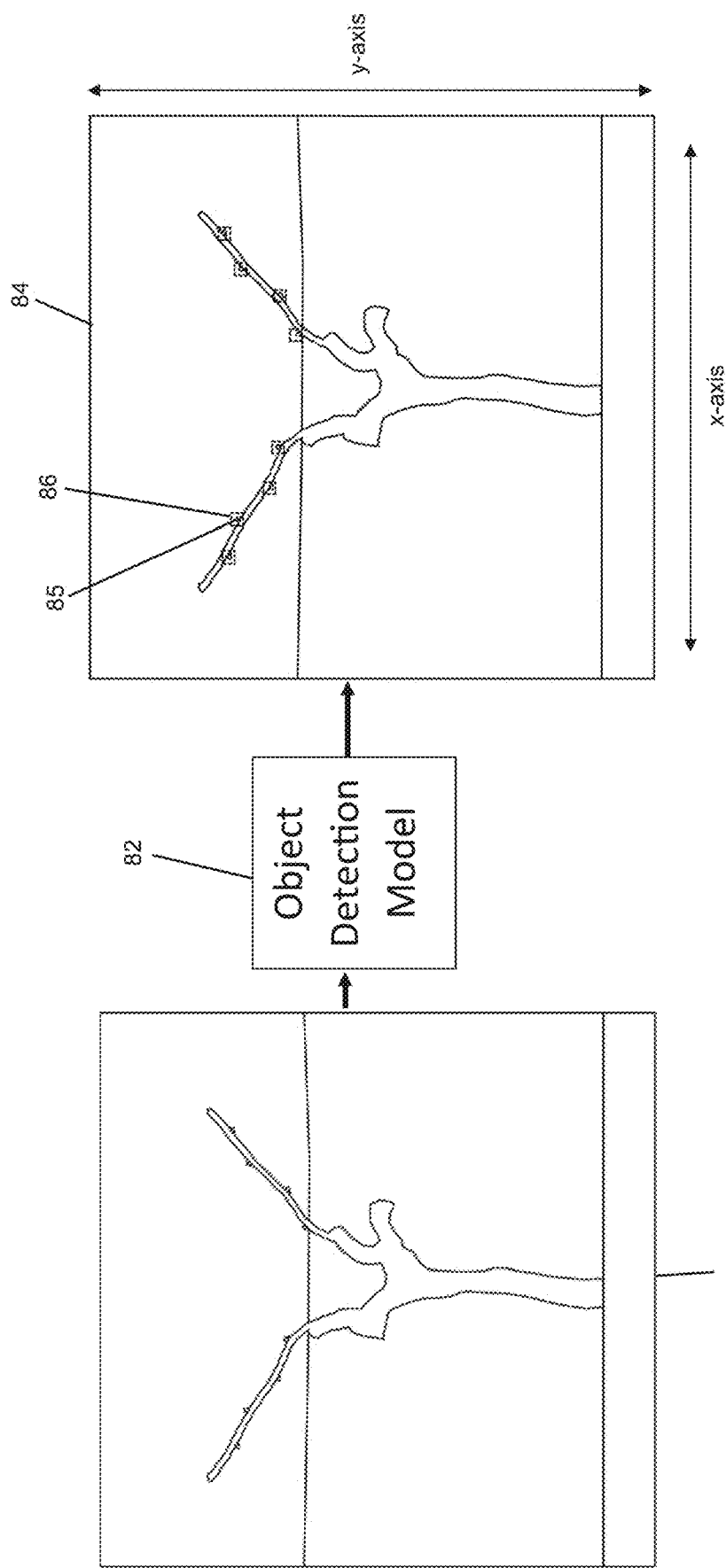
FIG. 33 shows an example of an agricultural feature detection step according to a preferred embodiment of the present invention.

In preferred embodiment of the present invention, the agricultural feature detection step S2804 includes detecting a particular agricultural feature of the agricultural item of interest A. For example, in a case in which the agricultural item of interest is a grape vine, the agricultural feature detection step S2804 can include detecting one or more buds of the grape vine. The agricultural feature detection step S2804 can be performed using an object detection model 82, for example, an AI Deep Learning object detection model. FIG. 33 shows an example of the agricultural feature detection step S2804 in which an object detection model 82 is used to detect/identify a particular agricultural feature of an agricultural item of interest A (e.g., a grape vine). The input to the object detection model 82 includes an image of the agricultural item of interest. For example, as shown in FIG. 33, an input to the object detection model 82 can include an image 44 generated during the image generation step S2802. The object detection model 82 receives the input of the image 44 and outputs a feature image 84 that includes bounding boxes 86 that surround a particular agricultural feature shown in the image 44. For example, FIG. 33 shows that the object detection model 82 outputs a feature image 84 that includes bounding boxes 86 that surround the buds of the agricultural item of interest included in the image 44.

In a preferred embodiment of the present invention, an agricultural feature location 85 of the agricultural feature (e.g., the bud) can be defined by an x-coordinate and a y-coordinate of a center point of the bounding box 86 that surrounds the agricultural feature. For example, the agricultural feature location 85 can be defined by the x-coordinate and the y-coordinate of the pixel within the feature image 84 that includes the center point of the bounding box 86 that surrounds the agricultural feature. Alternatively, the x-coordinate and the y-coordinate of another point within or on the bounding box 86 (e.g., the bottom left corner, the bottom right corner, the top left corner, or the top right corner of the bounding box 86) can be used to define the agricultural feature location 85. Thus, an agricultural feature location 85 can be determined for each of the agricultural features (e.g., buds) detected during the agricultural feature detection step S2804.

In a preferred embodiment of the present invention, the object detection model 82 can include a model backbone, a model neck, and a model head. The model backbone is primarily used to extract important features from a given input image (e.g., image 44). In a preferred embodiment, Cross Stage Partial (CSP) Networks can be used as the model backbone to extract informative features from the input image. The model neck is primarily used to generate feature pyramids, which assist the object detection model 82 to be well generalized on object scaling of the agricultural feature (e.g., a bud of the grape vine). The performance of the object detection model 82 is improved by identifying the same object (e.g., a grape vine bud) with different scales and sizes. The model head is primarily used to perform the final detection of the agricultural feature. The model head applies anchor boxes on the agricultural features included in the image features and generates final output vectors with class probabilities, object scores, and the bounding boxes 86 of the feature image 84. In a preferred embodiment, the agricultural feature detection step S2804 is performed using an object detection model 82 such as YoloV5. However, other models such as Yolov4 can be used to perform the agricultural feature detection step S2804. The trained object detection model 82 can be converted to a TensorRT optimized engine for faster inference.

The object detection model 82 can be trained using a detection dataset tailored to an object detection task with respect to an agricultural feature of interest. For example, when the agricultural feature is a bud of a grape vine, the detection dataset is tailored to an object detection task with respect to a bud of a grape vine. The detection dataset includes a plurality of the images that are selected based on factors including whether the images were captured with proper operating conditions and whether the images include an appropriate level of variety. Once the plurality of images to be included in the detection dataset are selected, the images are cleansed and annotated. For example, the images of the detection dataset tailored to an object detection task with respect to a bud of a grape vine can be manually annotated using a computer implemented labeling tool.

Figure 34:
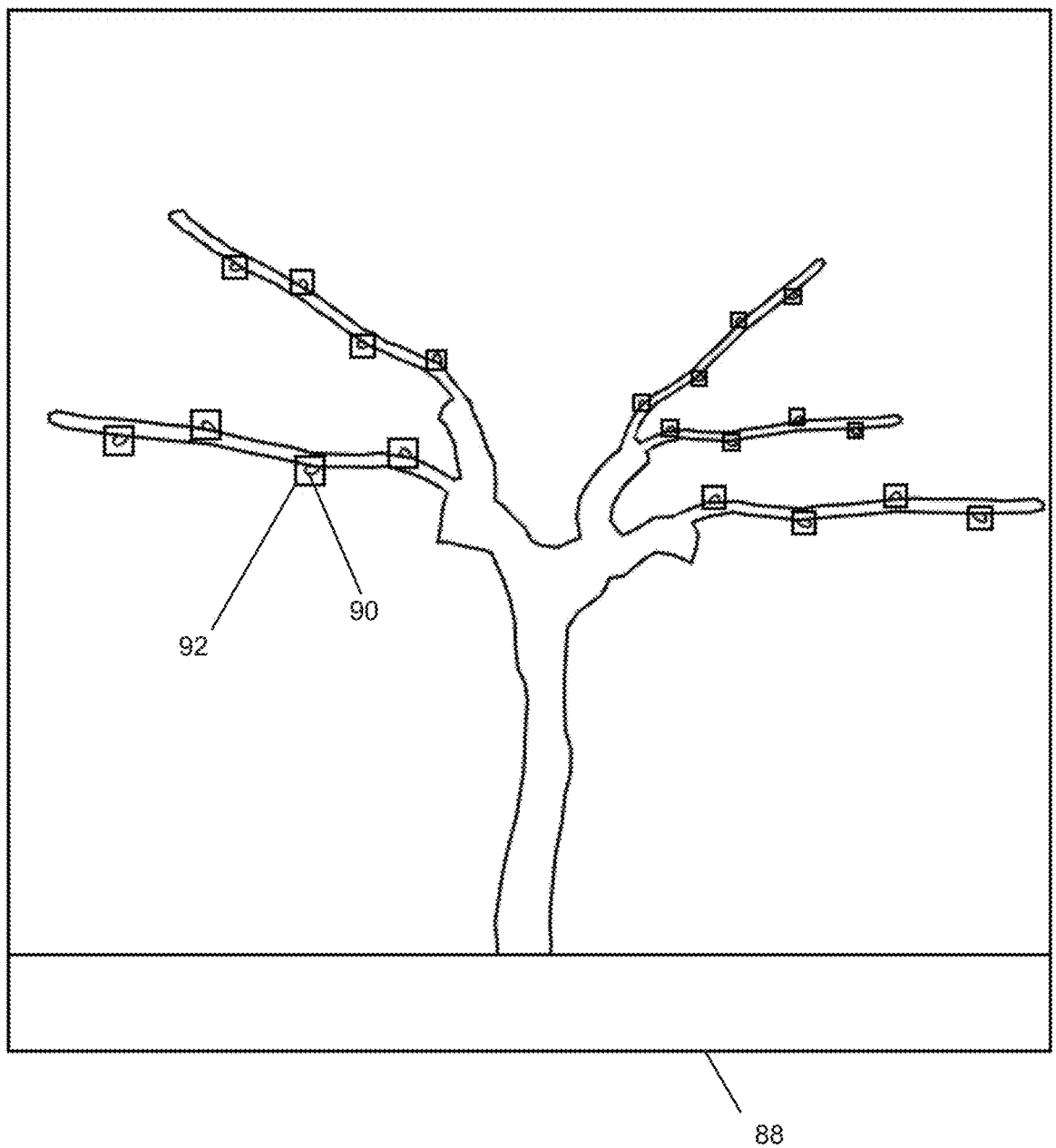
FIG. 34 shows an example of an image included in a detection dataset according to a preferred embodiment of the present invention.

FIG. 34 shows an example of an image 88 included in the detection dataset which has been annotated using a computer implemented labeling tool. The computer implemented labeling tool includes a user interface that allows polygon masks to be formed around a particular agricultural feature 90 of the agricultural item of interest. For example, when the agricultural feature 90 is a bud of a grape vine, the user interface of the labeling tool allows a polygon mask 92 to be formed around each bud of the grape vine. In a preferred embodiment, polygon masks 92 of different sizes can be formed around the agricultural features 90 in the image 88. For example, the size of the polygon mask 92 can be determined based on the size of the particular agricultural feature 90 around which the polygon mask 92 is formed. For instance, when a distance between a particular agricultural feature 90 and the camera used to capture the image 88 is larger such that the size of the particular agricultural feature 90 within the image 88 is smaller, then the size of the polygon mask 92 formed around the particular agricultural feature 90 is made smaller. More specifically, in a preferred embodiment, the size of each of the polygon masks 92 formed around the agricultural features 90 within the image 88 can be determined/adjusted based on a predetermined ratio of a pixel area of the agricultural feature 90 to a total pixel area of the polygon mask 92. For example, the size of the polygon mask 92 formed around the agricultural feature 90 within the image 88 can be determined/adjusted such that a ratio between a pixel area of the agricultural feature 90 to a total pixel area of the polygon mask 92 is a predetermined ratio of about 50% (i.e., the area of the agricultural feature 90 is about 50% of the total area of the polygon mask 92), for example. Alternatively, each of the polygon masks 92 can be made a same size regardless of the size of the particular agricultural feature 90 around which the polygon mask 92 is formed.

In a preferred embodiment of the present invention, about 80% of the detection dataset is used as a training set to train and teach the network of the object detection model 82, and about 20% of the detection data set is used as a validation set/test set for the network of the object detection model 82, for example. However, these percentages can be adjusted such that more or less of the dataset is used as a training set and a validation set.

In a preferred embodiment of the present invention, an augmentation process can be used to create additional images for the detection dataset from existing images included in the detection dataset in a manner similar to that discussed above with respect to FIG. 32. For example, the augmentation process can include editing and changing an image 88 to create new images to be included in the detection dataset in order to create a good distribution of images in the detection dataset for the network of the object detection model 82 to train/learn. The augmentation process can include a plurality of different relative augmentations applied to the image 88 which allows for the network of the object detection model 82 to learn and generalize over a wide range of illuminations conditions, textures, and spatial augmentations. For example, the augmentation process can include a non-perspective augmentation such as a color jitter augmentation 70, an equalize augmentation 72, a gaussian blur augmentation 74, and a sharpen augmentation 76, and/or a spatial augmentation such as a perspective augmentation 78 and an affine augmentation 80 discussed above with respect to FIG. 32. In a preferred embodiment, the non-perspective augmentations can be included in a custom data-loader which works on-the-fly and reduces memory constraints. The spatial augmentations can be manually added and saved before the network of the object detection model 82 is trained using the updated dataset.

In a preferred embodiment of the present invention, the base component segmentation step S2805 includes identifying a base component of an agricultural item of interest. For example, in a case in which the agricultural item of interest is a grape vine, the base component segmentation step S2805 can include identifying the trunk of the grape vine.

In a preferred embodiment, the base component segmentation step S2805 is performed using a semantic segmentation AI architecture 150. The semantic segmentation AI architecture 150 can include a Fully Convolutional Network (FCN). More specifically, the semantic segmentation AI architecture 150 can include a U-shaped encoder-decoder network architecture, which includes four encoder blocks and four decoder blocks that are connected via a bridge. For example, the U-NET semantic segmentation architecture can be used to perform the base component segmentation step S2805. However, the semantic segmentation AI architecture 150 can include a semantic segmentation framework other than the U-NET semantic segmentation architecture to perform the base component segmentation step S2805. For example, the semantic segmentation AI architecture 150 can include a Convolutional Neural Network (CNN), a Fully Convolutional Network (FCN), a SegNet, a HRNet, a Feature Pyramid Network (FPN), a Region-Convolutional Neural Network (R-CNN), and a Recurrent Neural Network (RNN) that can be used to perform the base component segmentation step S2805.

Figure 35:
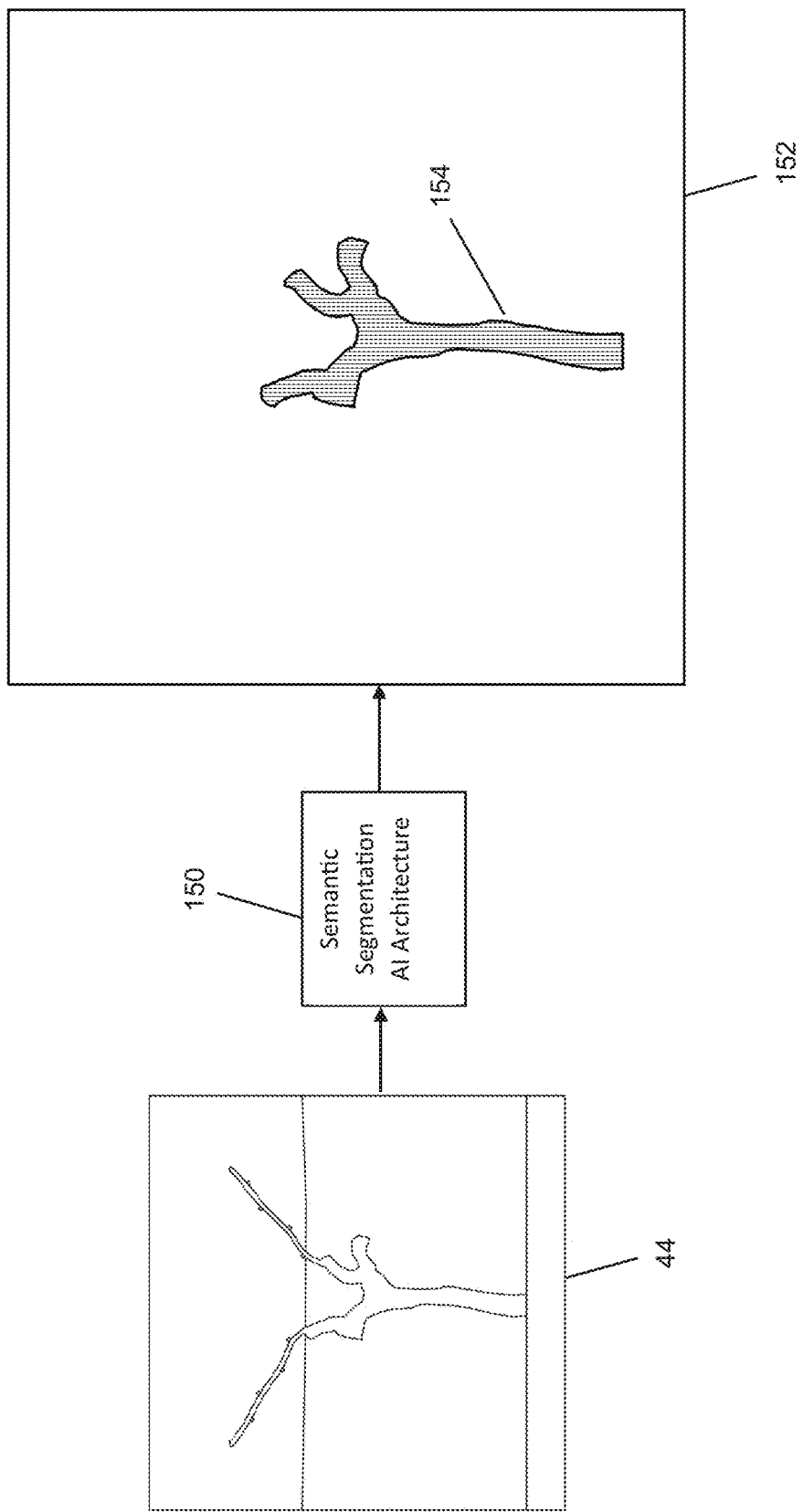
FIG. 35 shows an example of a base component segmentation step according to a preferred embodiment of the present invention.

FIG. 35 shows an example of the base component segmentation step S2805 in which a semantic segmentation AI architecture 150 is used to identify a base component of an agricultural item of interest A (e.g., a grape vine). The input to the semantic segmentation AI architecture 150 includes an image including the agricultural item of interest A. For example, as shown in FIG. 35, an input to the semantic segmentation AI architecture 150 includes an image 44 generated during the image generation step S2802. The semantic segmentation AI architecture 150 receives the input of the image 44 and outputs a segmented image 152. The segmented image 152 includes one or more masks that identify portions of the base component of the agricultural item of interest A included in the image 44 input to the semantic segmentation AI architecture 150. For example, the segmented image 152 includes one or more masks that identify the pixels included in the image 44 that correspond to portions of the base component of the agricultural item of interest A. For instance, FIG. 35 shows that the semantic segmentation AI architecture 150 outputs a segmented image 152 that includes a base component mask 154 that identifies the trunk of grape vine.

In a preferred embodiment of the present invention, the semantic segmentation AI architecture 150 is trained using a base component segmentation dataset tailored to a semantic segmentation task with respect to the base component of the agricultural item of interest. For example, when the agricultural item of interest is a grape vine, the base component segmentation dataset is tailored to a semantic segmentation task with respect to the trunk of the grape vine. The base component segmentation dataset includes a plurality of images that are selected based on factors including whether the images were captured with proper operating conditions and whether the images include an appropriate level of variety. Once the plurality of images to be included in the base component segmentation dataset are selected, the plurality of images are cleansed and annotated. For example, the plurality of images of the base component segmentation dataset can be manually annotated using a computer implemented labeling tool, as discussed in more detail below.

Figure 36:
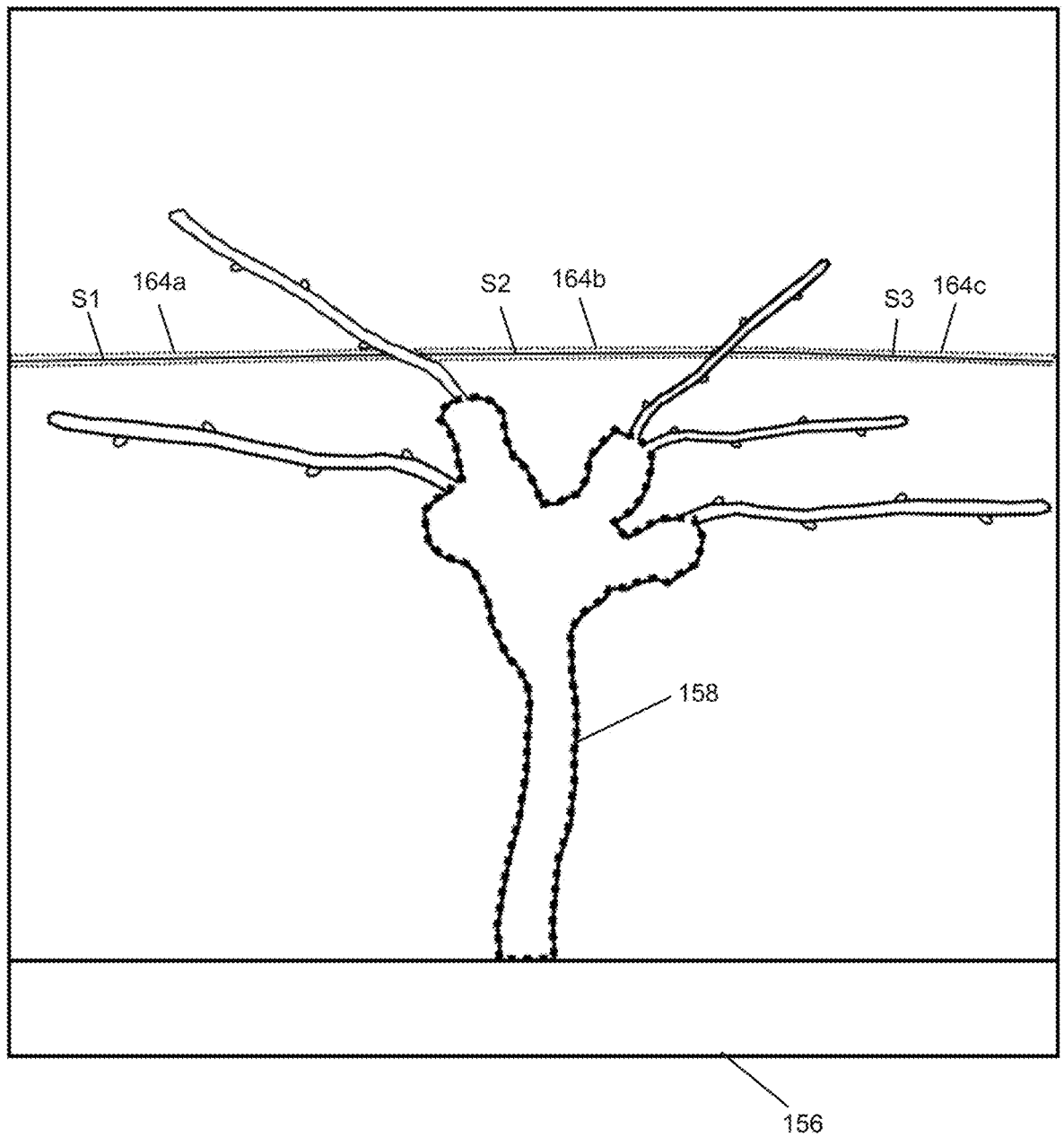
FIG. 36 shows an example of an image included in a segmentation dataset according to a preferred embodiment of the present invention.

FIG. 36 shows an example of an image 156 included in the base component segmentation dataset which has been annotated using a computer implemented labeling tool. The computer implemented labeling tool includes a user interface that allows polygon masks to be formed around portions of the base component of the agricultural item of interest A. For example, when the agricultural item of interest A is a grape vine, the user interface of the labeling tool allows polygon masks to be formed around portions of the trunk. For example, FIG. 36 shows a trunk polygon mask 158 formed around the trunk.

In a preferred embodiment of the present invention, the labeling tool allows for a particular type of annotation called group-identification based labelling that can be used to annotate discrete parts of a same segment/individual component using a same label. In other words, group-identification based labelling can be used to annotate discrete parts of the component using a same label. For example, the group-identification based labelling can be used to annotate discrete parts of the trunk using a same label. For example, if in the image 156 show in FIG. 36, an object overlapped/intersected the truck such that the image 156 included a first discrete part and a second discrete part of the trunk spaced apart from each other in the image 156, the group-identification based labelling allows for a first polygon mask to be formed around the first discrete part of the trunk, a second polygon mask to be formed around the second discrete part of the trunk, and for the first polygon mask and the second polygon mask to be assigned a same label in order to indicate that the first discrete part and the second discrete part are each portions of the trunk, and thus assigned a common label.

In a preferred embodiment of the present invention, about 80% of the base component segmentation dataset is used as a training set to train and teach the network of the semantic segmentation AI architecture 150, and about 20% of the base component segmentation dataset is used as a validation set/test set for the network included in the semantic segmentation AI architecture 150, for example. However, these percentages can be adjusted such that more or less of the segmentation dataset is used as a training set and a validation set/test.

In a preferred embodiment of the present invention, an augmentation process can be used to create additional images for the base component segmentation dataset from existing images included in the base component segmentation dataset in a manner similar to that discussed above with respect to FIG. 32. For example, the augmentation process can include editing and changing an image 156 to create new images to be included in the base component segmentation dataset in order to create a good distribution of images in the base component segmentation dataset for the network of the semantic segmentation AI architecture 150 to train/learn. The augmentation process can include a plurality of different relative augmentations applied to the image 156 which allows for the network of the semantic segmentation AI architecture 150 to learn and generalize over a wide range of illuminations conditions, textures, and spatial augmentations. For example, the augmentation process can include a non-perspective augmentation such as a color jitter augmentation 70, an equalize augmentation 72, a gaussian blur augmentation 74, and a sharpen augmentation 76, and/or a spatial augmentation such as a perspective augmentation 78 and an affine augmentation 80 discussed above with respect to FIG. 32. In a preferred embodiment, the non-perspective augmentations can be included in a custom data-loader which works on-the-fly and reduces memory constraints. The spatial augmentations can be manually added and saved before the network of the semantic segmentation AI architecture 150 is trained using the updated dataset.

In a preferred embodiment, the support structure segmentation step S2806 is performed using a semantic segmentation AI architecture 150. In a preferred embodiment, the support structure segmentation step S2806 is performed using the same semantic segmentation AI architecture 150 used to perform the base component segmentation step S2805, although the support structure segmentation step S2806 can be performed using a semantic segmentation AI architecture other than the semantic segmentation AI architecture 150 used to perform the base component segmentation step S2805. For example, the U-NET semantic segmentation architecture can be used to perform the support structure segmentation step S2806, or a semantic segmentation framework other than the U-NET semantic segmentation architecture can be used to perform the support structure segmentation step S2806.

Figure 37:
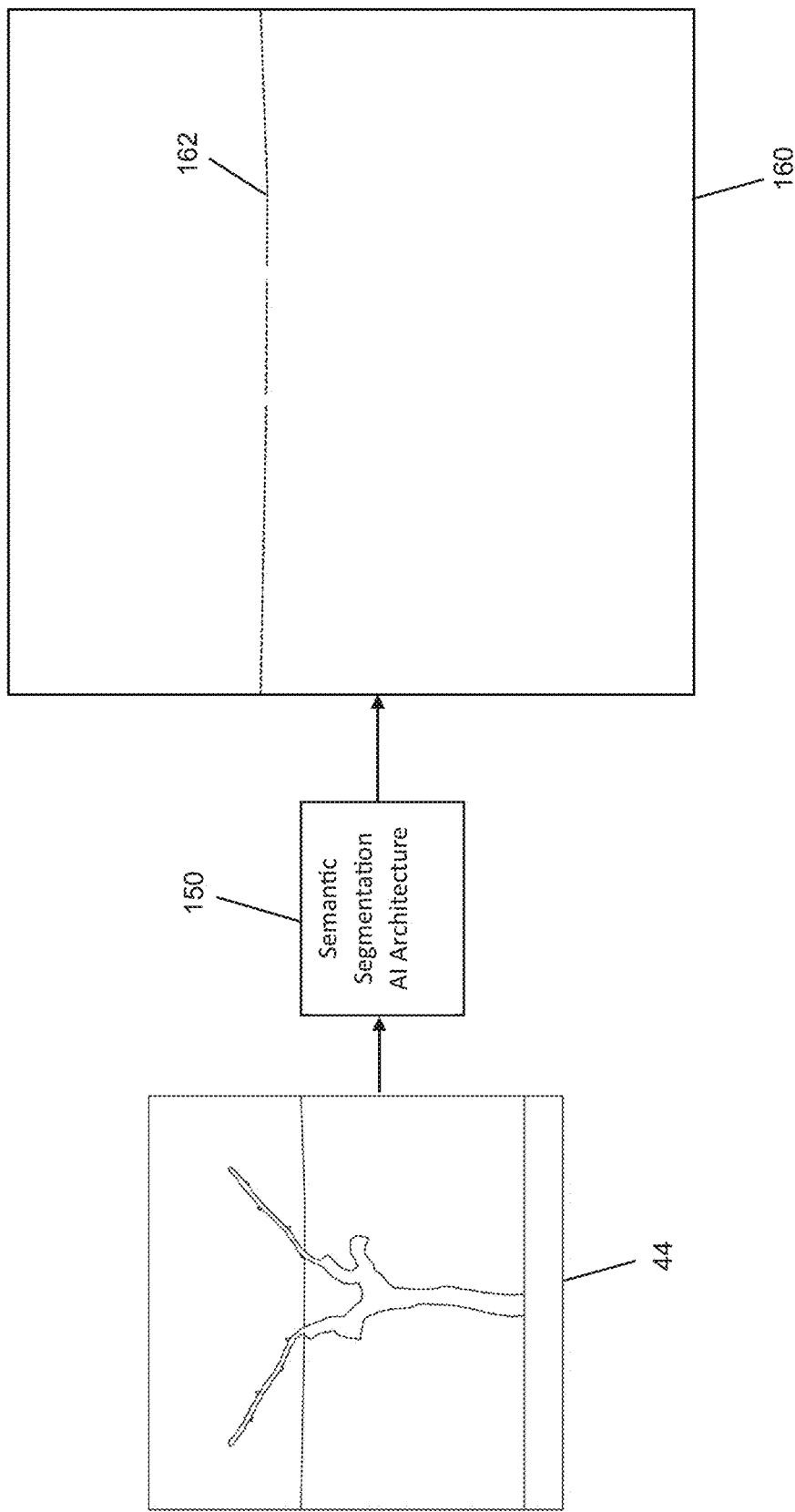
FIG. 37 shows an example of a support structure segmentation step according to a preferred embodiment of the present invention.

FIG. 37 shows an example of the support structure segmentation step S2806 in which a semantic segmentation AI architecture 150 is used to identify a support structure S (e.g., a trellis wire). The input to the semantic segmentation AI architecture 150 includes an image including the support structure S. For example, as shown in FIG. 37, an input to the semantic segmentation AI architecture 150 includes an image 44 generated during the image generation step S2802. The semantic segmentation AI architecture 150 receives the input of the image 44 and outputs a segmented image 160. The segmented image 160 includes one or more masks that identify portions of the support structure S included in the image 44 input to the semantic segmentation AI architecture 150. For example, the segmented image 160 includes one or more masks that identify the pixels included in the image 44 that correspond to portions of the support structure. For instance, FIG. 37 shows that the semantic segmentation AI architecture 150 outputs a segmented image 160 that includes a support structure (e.g., trellis wire) mask 162 that identifies the support structure S.

In a preferred embodiment of the present invention, the semantic segmentation AI architecture 150 is trained using a support structure segmentation dataset tailored to a semantic segmentation task with respect to the support structure. For example, when the support structure S is a trellis wire, the support structure segmentation dataset is tailored to a semantic segmentation task with respect to a trellis wire. The support structure segmentation dataset includes a plurality of images that are selected based on factors including whether the images were captured with proper operating conditions and whether the images include an appropriate level of variety. Once the plurality of images to be included in the support structure segmentation dataset are selected, the plurality of images are cleansed and annotated. For example, the plurality of images of the support structure segmentation dataset can be manually annotated using a computer implemented labeling tool, as discussed in more detail below.

FIG. 36 shows an example of an image 156 of the support structure segmentation dataset which has been annotated using a computer implemented labeling tool. In a preferred embodiment, an image 156 can be included in the support structure segmentation dataset and the base component segmentation dataset. Alternatively, the support structure segmentation dataset and the base component segmentation dataset can include different images. The computer implemented labeling tool includes a user interface that allows polygon masks to be formed around portions of the support structure included in the image 156. For example, when the support structure is a trellis wire, the user interface of the labeling tool allows polygon masks to be formed around portions of the support structure. For example, FIG. 36 shows a support structure polygon mask 164a-c formed around the support structure.

In a preferred embodiment of the present invention, the labeling tool allows for a particular type of annotation called group-identification based labelling that can be used to annotate discrete parts of the support structure using a same label. In other words, group-identification based labelling can be used to annotate discrete parts of a same instance of the support structure using a same label. FIG. 36 shows an example in which the support structure S is a trellis wire, and the group-identification based labelling can be used to annotate discrete parts of a same trellis wire using a same label. For example, in the image 156 show in FIG. 36, two canes overlap/intersect the support structure (trellis wire) in the image 156, such that the image 156 includes a first discrete part S1, a second discrete part S2, and a third discrete part S3 of the trellis wire which are spaced apart from each other in the image 156 but are portions of the same trellis wire. The group-identification based labelling allows for a first polygon mask 164a to be formed around the first discrete part S1, a second polygon mask 164b to be formed around the second discrete part S2, and a third polygon mask 164c to be formed around the third discrete part S3, and for the first polygon mask 164a, the second polygon mask 164b, and the third polygon make 164c to be assigned a same label in order to indicate that the first discrete part S1, a second discrete part S2, and a third discrete part are portions of the same trellis wire, and thus assigned a common label.

In a preferred embodiment of the present invention, about 80% of the support structure segmentation dataset is used as a training set to train and teach the network of the semantic segmentation AI architecture 150, and about 20% of the base component segmentation dataset is used as a validation set/test set for the network included in the semantic segmentation AI architecture 150, for example. However, these percentages can be adjusted such that more or less of the segmentation dataset is used as a training set and a validation set/test.

In a preferred embodiment of the present invention, an augmentation process can be used to create additional images for the support structure segmentation dataset from existing images included in the support structure segmentation dataset in a manner similar to that discussed above with respect to FIG. 32. For example, the augmentation process can include editing and changing an image 156 to create new images to be included in the support structure segmentation dataset in order to create a good distribution of images in the support structure segmentation dataset for the network of the semantic segmentation AI architecture 150 to train/learn. The augmentation process can include a plurality of different relative augmentations applied to the image 156 which allows for the network of the semantic segmentation AI architecture 150 to learn and generalize over a wide range of illuminations conditions, textures, and spatial augmentations. For example, the augmentation process can include a non-perspective augmentation such as a color jitter augmentation 70, an equalize augmentation 72, a gaussian blur augmentation 74, and a sharpen augmentation 76, and/or a spatial augmentation such as a perspective augmentation 78 and an affine augmentation 80 discussed above with respect to FIG. 32. In a preferred embodiment, the non-perspective augmentations can be included in a custom data-loader which works on-the-fly and reduces memory constraints. The spatial augmentations can be manually added and saved before the network of the semantic segmentation AI architecture 150 is trained using the updated dataset.

In a preferred embodiment of the present invention, the grab-point generation step S2807 includes using a grab-point generation module 166 to generate a two-dimensional grab-point for the agricultural item of interest A. When the agricultural item of interest is a grape vine, the grab-point generation module 166 generates a two-dimensional grab-point for a cane of the grape vine, for example. Preferably, the grab-point generation module 166 generates a two-dimensional grab-point for each of the canes included in the grape vine. For illustrative purposes, FIG. 38A shows an example of a two-dimensional grab-point 168a (a two-dimensional grab-point for a left cane) and a two-dimensional grab-point 168b (a two-dimensional grab-point for a right cane) on a grab-point image 170. The location of each of the two-dimensional grab-points 168a and 168b can be represented by an x-coordinate and a y-coordinate. For example, the location of the two-dimensional grab-points can be defined by the x-coordinate and y-coordinate of the pixel of the grab-point image 170 that includes the two-dimensional grab-point.

As shown in FIG. 38A, the grab-point generation module 166 can receive inputs including the component masks (e.g., the first cane mask 48 and the second cane mask 50) of the segmented image 46 generated by the Instance Segmentation AI Architecture 44 during the component segmentation step S2803, the agricultural feature locations 85 of the agricultural features (e.g., buds) detected by the object detection model 82 during the agricultural feature detection step S2804, and the base component mask 154 of the segmented image 152 generated by the semantic segmentation AI architecture 150 during the base component segmentation step S2805. For example, FIG. 38A shows that the inputs to the grab-point generation module 166 can include the component masks (e.g., the first cane mask 48 and the second cane mask 50) of the segmented image 46, the agricultural feature locations 85 of the agricultural features (e.g., buds), and the base component mask 154 of the segmented image 152, which were each generated using the image 44 generated from the data captured during the data capture step S2801.

Figure 38B:
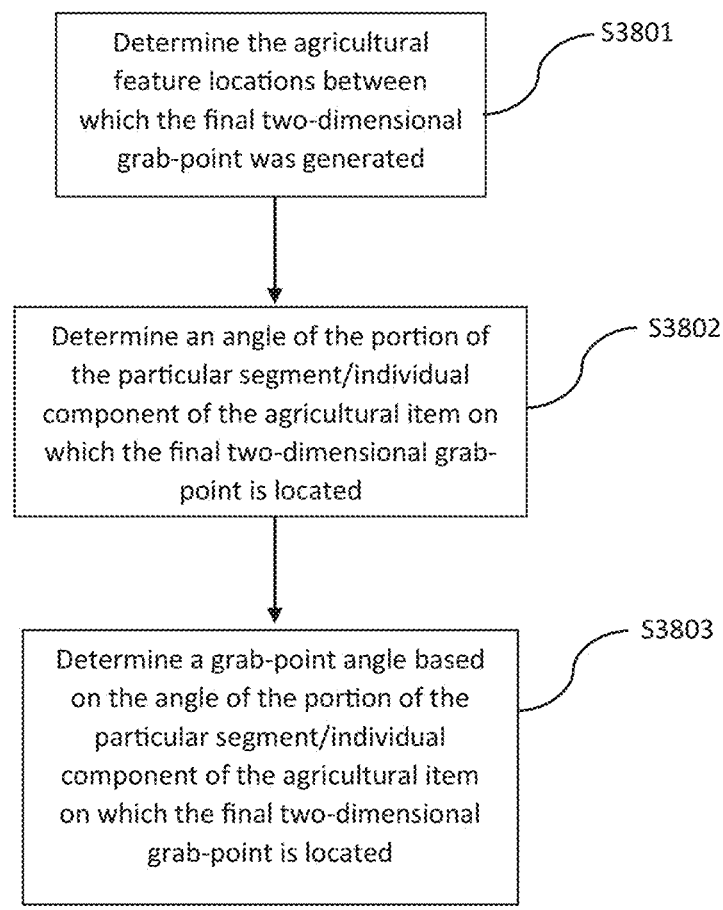
FIG. 38B is a flow chart showing a process of determining a grab-point angle according to a preferred embodiment of the present invention.
Figure 39:
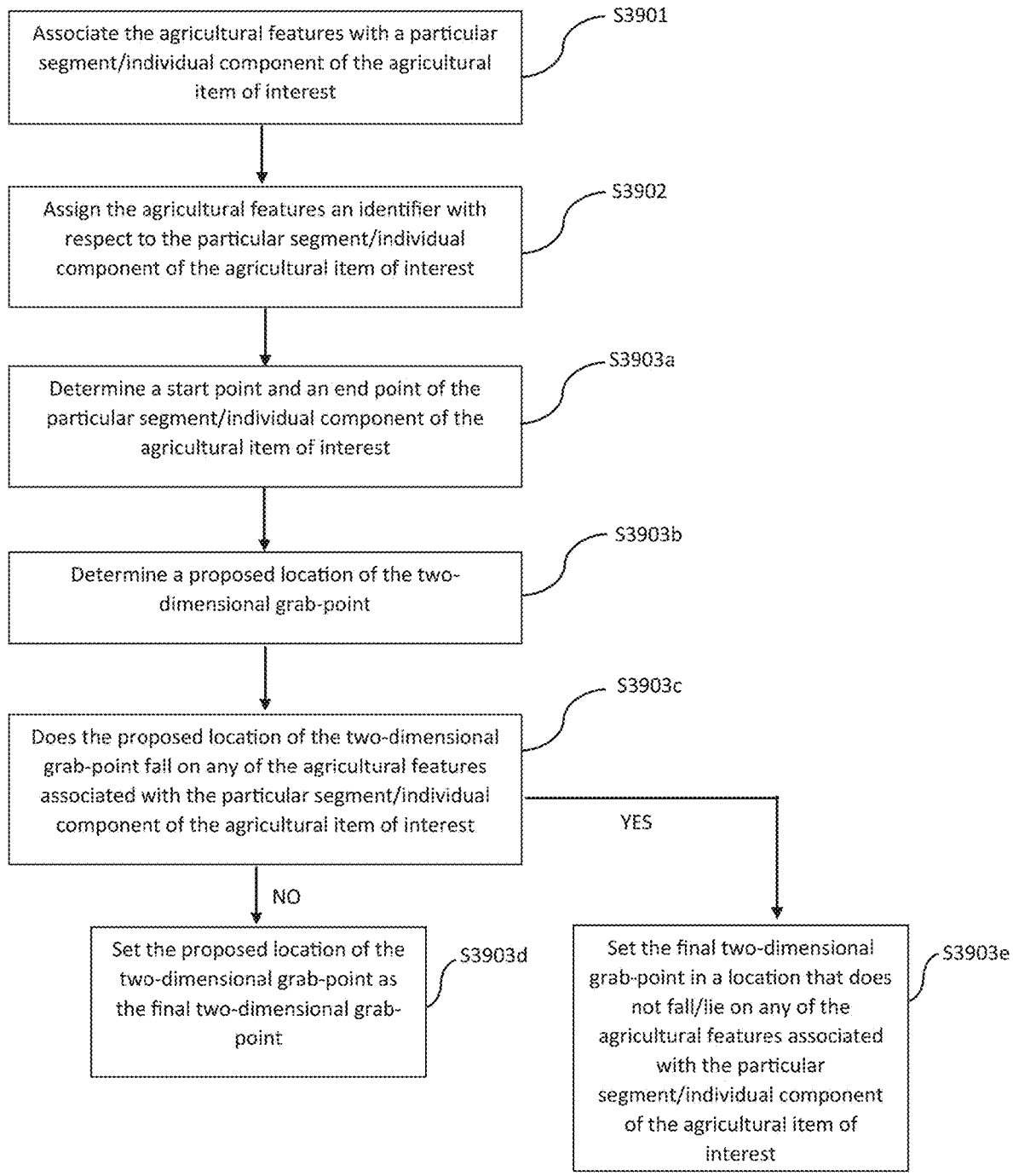
FIG. 39 is a flow chart that shows an example of a grab-point generation step according to a preferred embodiment of the present invention.

In a preferred embodiment of the present invention, the grab-point generation module 166 performs an agricultural feature association step S3901, an agricultural feature identification step S3902, and a grab-point determination step S3903 to generate a two-dimensional grab-point. FIG. 39 shows a flow chart of the grab-point generation step S2807 including the agricultural feature association step S3901, the agricultural feature identification step S3902, and the grab-point determination step S3903. In the example discussed below, the grab-point generation module 166 generates a two-dimensional grab-point 168b, which is a two-dimensional grab-point on/for a right cane of the agricultural item of interest shown in FIG. 38A. The grab-point generation module 166 can similarly generates a two-dimensional grab-point 168*a*, which is a two-dimensional grab-point on/for a left cane of the agricultural item of interest shown in FIG. 38A.

In the agricultural feature association step S3901, the agricultural features detected during the agricultural feature detection step S2804 are associated with a particular segment/individual component of the agricultural item of interest identified during the component segmentation step S2803. For example, when the agricultural features are buds of a grape vine, each bud detected during the agricultural feature detection step S2804 is associated with a particular cane of the grape vine identified during the component segmentation step S2803. In the example shown in FIG. 38A, if an agricultural feature location 85 (bud location 85) falls/lies within a particular cane mask (e.g., the second cane mask 50) when the bud location 85 is compared to the cane masks (e.g., the first cane mask 48 and the second cane mask 50) of the segmented image 46, then the bud associated with the bud location 85 is considered to be located on/attached to the cane associated with the particular cane mask. For example, it can be determined that an agricultural feature location 85 (bud location 85) falls/lies within the second cane mask 50 if an agricultural feature location 85 pixel of the feature image 84 corresponds to a second cane mask 50 pixel of the segmented image 46. In this way, a bud detected during the agricultural feature detection step S2804 can be associated with a particular cane/cane mask (e.g., the first cane mask 48 or the second cane mask 50) identified during the component segmentation step S2803.

It is possible that an agricultural feature location 85 (bud location 85) does not fall/lie within a particular cane mask when the bud location 85 is compared to the cane masks of the segmented image 46. For example, because a bud is attached to an outside surface of a cane, the agricultural feature location 85 (bud location 85) may be adjacent to the cane mask and not fall/lie within the cane mask. In order to address this point, the agricultural feature location 85 can be assigned a search radius. If the agricultural feature location 85 is determined to be located within the area of a cane mask (e.g., the first cane mask 48 or the second cane mask 50), then the agricultural feature location 85 is maintained. On the other hand, if the agricultural feature location 85 is determined not to be located within the area of a cane mask, then the search radius is used to determine if the agricultural feature location 85 is located within a predetermined distance of a cane mask. If a cane mask is determined to be located within a predetermined distance of the agricultural feature location 85 using the search radius, then the location of the agricultural feature location 85 is moved to a point within the area of the cane mask, for example, a closest point within the area of the cane mask. On the other hand, if the cane mask is determined to not be located within a predetermined distance from the agricultural feature location 85 using the search radius, then the agricultural feature location 85 is determined not to be located on or associated with a cane mask.

The agricultural feature identification step S3902 includes assigning each agricultural feature an identifier with respect to the particular segment/individual component of the agricultural item of interest to which the agricultural feature was associated with in the agricultural feature association step S3901. For example, when the agricultural feature is a bud of the grape vine, each bud is assigned an identifier with respect to the particular cane/cane mask to which the bud was associated with in the agricultural feature association step S3901.

The agricultural feature identification step S3902 can include identifying a starting point of a cane/cane mask (e.g., the second cane mask 50). For example, a starting point of the second cane mask 50 can be identified based on which of the two ends of the second cane mask 50 is located closer to a center line CL of the base component mask 154. For example, FIG. 38A shows an example in which a first end of the two ends of the second cane mask 50 is identified as the starting point 49 of the second cane mask 50 when it is the end of the second cane mask 50 located closer to the center line CL. Alternatively, the starting point 49 of the cane mask (e.g., the second cane mask 50) can be identified in another manner, for example, based on a connection point between a trunk mask and the second cane mask 50 in the segmented image 46, which can be identified by a pixel that falls within both the trunk mask and the second cane mask 50, which indicates an overlap between the trunk mask and the second cane mask 50.

Once the starting point 49 of the cane mask has been identified, each bud detected during the agricultural feature detection step S2804 can be assigned an identifier with respect to the particular cane/cane mask to which the bud was associated with in the agricultural feature association step S3901 based on a distance from the starting point 49 of the cane mask to the respective bud. In the example shown in FIG. 38A, the agricultural feature location 85-1 is closest to the starting point 49 of the cane mask (second cane mask 50), the agricultural feature location 85-2 is the second closest to the starting point 49 of the cane mask, the agricultural feature location 85-3 is the third closest to the starting point 49 of the cane mask, and the agricultural feature location 85-4 is the fourth closest to the starting point 49 of the cane mask. The agricultural feature locations 85-1, 85-2, 85-3, and 85-4 are illustrated on the grab-point image 170 in FIG. 38A.

Based on the respective distances of the agricultural feature locations 85-1, 85-2, 85-3, and 85-4 from the starting point 49 of the cane mask, each agricultural feature can be assigned an identifier with respect to the particular segment/individual component of the agricultural item of interest with which the agricultural feature is associated. For example, the bud with agricultural feature location 85-1 can be assigned as the first bud of the cane associated with the second cane mask 50, the bud with agricultural feature location 85-2 can be assigned as the second bud of the cane associated with the second cane mask 50, the bud with agricultural feature location 85-3 can be assigned as the third bud of the cane associated with the second cane mask 50, and the bud with agricultural feature location 85-4 can be assigned as the fourth bud of the cane associated with the second cane mask 50.

The grab-point determination step S3903 includes executing a grab-point determination process to determine a location of the two-dimensional grab-point. The grab-point determination includes a step S3903*a* of determining a start point and an end point of the particular segment/individual component of the agricultural item of interest identified during the component segmentation step S2803. For example, when the particular segment/individual component of the agricultural item of interest is a particular cane/cane mask of a grape vine, step S3903*a* includes determining a start point and an end point of the particular cane/cane mask. For example, in the example shown in FIG. 38A, a start point 49 and an end point 51 of the second cane mask 50 can be determined. In step S3903a, the start point 49 of the second cane mask 50 can be identified based on which of the two ends of the second cane mask 50 is located closer to a center line CL of the base component mask 154. For example, FIG. 38A shows an example in which a first end of the two ends of the second cane mask 50 is identified as the start point 49 of the second cane mask 50 when it is the end of the second cane mask 50 located closer to the center line CL of the base component mask 154. In step S3903a, the end point 51 of the second cane mask 50 can be identified based on which of the two ends of the second cane mask 50 is located farther from a center line CL of the base component mask 154. For example, FIG. 38A shows an example in which a second end of the two ends of the second cane mask 50 is identified as the end point 51 of the second cane mask 50 when it is the end of the second cane mask 50 farther from the center line CL of the base component mask 154.

Alternatively, in step S3903a, the start point 49 of the cane mask (e.g., the second cane mask 50) can be identified in another manner, for example, based on a connection point between a trunk mask and the second cane mask 50 in the segmented image 46, which can be identified by a pixel that falls within both the trunk mask and the second cane mask 50 and indicates an overlap between the trunk mask and the second cane mask 50. In this case, the other end of the second cane mask 50 is identified as the end point 51. In this case, the grab-point generation module 166 may not receive or use the base component mask 154 of the segmented image 152 to generate the two-dimensional grab-point for the agricultural item of interest A.

Once the start point and the end point of the particular segment/individual component of the agricultural item of interest are determined in step S3903a, in a step S3903b, a point between the start point and the end point of the particular segment/individual component of the agricultural item of interest is determined as a proposed location 172 of the two-dimensional grab-point. For example, when the particular segment/individual component of the agricultural item of interest is a particular cane/cane mask of the grape vine, a point between the start point and the end point of the particular cane/cane mask is determined as a proposed location 172 of the two-dimensional grab-point. For example, in step 3903b, a point located at about 50% of the distance between the start point and the end point of the particular cane/cane mask can be determined as the proposed location 172 of the two-dimensional grab-point. In FIG. 38A, a point located at about 50% of the distance between the start point 49 and the end point 58 of the second cane mask 50 is determined as a proposed location 172 of the two-dimensional grab-point 168b on the second cane mask 50. Alternatively, a point located at about 25%, about 75%, or some other portion of the distance between the start point and the end point of the particular cane/cane mask can be determined as a proposed location of the two-dimensional grab-point. In this way, a proposed location 172 of the two-dimensional grab-point is determined in step 3903b.

In step 3903c, it is determined whether or not the proposed location 172 of the two-dimensional grab-point falls/lies on any of the agricultural features associated with the particular segment/individual component of the agricultural item of interest during the agricultural feature association step S3901. For example, when the agricultural features are buds of a grape vine, in step 3903c, it is determined whether or not the proposed location 172 of the two-dimensional grab-point falls/lies on any of the buds associated with the particular cane/cane mask during the agricultural feature association step S3901. In the example shown in FIG. 38A, in step 3903c, it is determined whether or not the proposed location 172 of the two-dimensional grab-point falls/lies on any of the first bud with agricultural feature location 85-1, the second bud with agricultural feature location 85-2, the third bud with agricultural feature location 85-3, and the fourth bud with agricultural feature location 85-4 associated with the second cane mask 50 when the proposed location 172 of the two-dimensional grab-point is compared to the agricultural feature location 85-1, the agricultural feature location 85-2, the agricultural feature location 85-3, and the agricultural feature location 85-4. For example, it can be determined that the proposed location 172 of the two-dimensional grab-point falls/lies on one of the first bud with agricultural feature location 85-1, the second bud with agricultural feature location 85-2, the third bud with agricultural feature location 85-3, and the fourth bud with agricultural feature location 85-4 associated with the second cane mask 50 when the proposed location 172 of the two-dimensional grab-point is within a predetermined distance (e.g., a predetermined number of pixels) of one of the agricultural feature location 85-1, the agricultural feature location 85-2, the agricultural feature location 85-3, and the agricultural feature location 85-4. For example, it can be determined that the proposed location 172 of the two-dimensional grab-point falls/lies on the second bud with the agricultural feature location 85-2 when the proposed location 172 is within a predetermined distance (e.g., a predetermined number of pixels) of the agricultural feature location 85-2. For example, the proposed location 172 of the two-dimensional grab-point can be assigned a search radius of the predetermined distance (e.g., a predetermined number of pixels). In this case, if the agricultural feature location 85-1 falls/lies within the search radius of the proposed location 172 of the two-dimensional grab-point, then the proposed location 172 is determined to fall/lie on the first bud. If the agricultural feature location 85-2 falls/lies within the search radius of the proposed location 172 of the two-dimensional grab-point, then the proposed location 172 is determined to fall/lie on the second bud. If the agricultural feature location 85-3 falls/lies within the search radius of the proposed location 172 of the two-dimensional grab-point, then the proposed location 172 is determined to fall/lie on the third bud. If the agricultural feature location 85-4 falls/lies within the search radius of the proposed location 172 of the two-dimensional grab-point, then the proposed location 172 is determined to fall/lie on the fourth bud.

In step 3903c, if the proposed location 172 of the two-dimensional grab-point does not fall/lie on any of the agricultural features associated with the particular segment/individual component of the agricultural item of interest (NO in step 3903c), then the process proceeds to step S3903d in which the proposed location 172 of the two-dimensional grab-point is set as a final two-dimensional grab-point. For example, in FIG. 38A, because the proposed location 172 of the two-dimensional grab-point does not fall/lie on any of the first bud with agricultural feature location 85-1, the second bud with agricultural feature location 85-2, the third bud with agricultural feature location 85-3, and the fourth bud with agricultural feature location 85-4, the proposed location 172 of the two-dimensional grab-point is set as a final two-dimensional grab-point, which is the two-dimensional grab-point 168b.

On the other hand, if in step 3903c the proposed location 172 of the two-dimensional grab-point does fall/lie on any of the agricultural features associated with the particular segment/individual component of the agricultural item of interest (YES in step 3903c), then the proposed location 172 of the two-dimensional grab-point is not set as a final two-dimensional grab-point, and the process proceeds to step S3903e. For example, although not shown in FIG. 38A, if the proposed location of the two-dimensional grab-point did fall/lied on the second bud with agricultural feature location 85-2, then the proposed location of the two-dimensional grab-point is not set as a final two-dimensional grab-point, and the process proceeds to step S3903e.

In step S3903e, the final two-dimensional grab-point is set in a location that does not fall/lie on any of the agricultural features associated with the particular segment/individual component of the agricultural item of interest. For example, in FIG. 38A, the final two-dimensional grab-point is set so as not to fall/lie on any of the first bud with agricultural feature location 85-1, the second bud with agricultural feature location 85-2, the third bud with agricultural feature location 85-3, and the fourth bud with agricultural feature location 85-4. More specifically, in step S3903e, the final two-dimensional grab-point is set at a point between two of the agricultural features associated with the particular segment/individual component of the agricultural item of interest.

In a preferred embodiment, the final two-dimensional grab-point set in step S3903e is located farther away from the center line CL of the base component mask 154 than the proposed location of the two-dimensional grab-point that was determined to fall/lie on one of the agricultural features associated with the particular segment/individual component of the agricultural item of interest in step S3903c. For example, in FIG. 38A, if the proposed location of the two-dimensional grab-point falls/lies on the second bud with agricultural feature location 85-2, then in step S3903e, the final two-dimensional grab-point can be set at a point between the second bud with agricultural feature location 85-2 and the third bud with agricultural feature location 85-3. More specifically, the final two-dimensional grab-point can be set at a middle point (an approximately 50% point) between the second bud with agricultural feature location 85-2 and the third bud with agricultural feature location 85-3. Alternatively, the final two-dimensional grab-point can be set at another point (e.g., an approximately 30% point or an approximately 70% point) between the second bud with agricultural feature location 85-2 and the third bud with agricultural feature location 85-3. Alternatively, the final two-dimensional grab-point can be set at a predetermined distance from the second bud with agricultural feature location 85-2 towards the third bud with agricultural feature location 85-3.

In another preferred embodiment, the final two-dimensional grab-point set in step S3903e is closer to the center line CL of the base component mask 154 than the proposed location of the two-dimensional grab-point that was determined to fall/lie on one of the agricultural features associated with the particular segment/individual component of the agricultural item of interest in step S3903c. For example, in FIG. 38A, if the proposed location of the two-dimensional grab-point falls/lies on the second bud with agricultural feature location 85-2, then in step S3903e, the final two-dimensional grab-point can be set at a point between the second bud with agricultural feature location 85-2 and the first bud with agricultural feature location 85-1. More specifically, the final two-dimensional grab-point can be set at a middle point (an approximately 50% point) between the second bud with agricultural feature location 85-2 and the first bud with agricultural feature location 85-1. Alternatively, the final two-dimensional grab-point can be set at another point (e.g., an approximately 30% point or an approximately 70% point) between the second bud with agricultural feature location 85-2 and the first bud with agricultural feature location 85-1. Alternatively, the final two-dimensional grab-point can be set at a predetermined distance from the second bud with agricultural feature location 85-2 towards the first bud with agricultural feature location 85-1.

In a preferred embodiment of the present invention, it is possible that the final two-dimensional grab-point initially set in step S3903e is not located on a cane/located within the cane mask. For example, if the final two-dimensional grab-point is set at a middle point (an approximately 50% point) between the second bud with agricultural feature location 85-2 and the third bud with agricultural feature location 85-3 and the cane between the agricultural feature location 85-2 and the third bud with agricultural feature location 85-3 is bent or curved, it is possible that the final two-dimensional grab-point initially set in step S3903e is not located on the cane/located within the cane mask (e.g., the second cane mask 50 in FIG. 38A). In order to address this point, the final two-dimensional grab-point set in step S3903e is assigned a search radius. If the final two-dimensional grab-point initially set in step S3903e is determined to be located within the area of the cane mask (e.g., the second cane mask 50), then the location of the final two-dimensional grab-point is maintained. On the other hand, if the final two-dimensional grab-point initially set in step S3903e is determined not to be located within the area of the cane mask, then the search radius is used to determine if the final two-dimensional grab-point is located within a predetermined distance of the cane mask. If the final two-dimensional grab-point is determined to be located within a predetermined distance of the cane mask using the search radius, then the location of the final two-dimensional grab-point initially set is moved to a point within the area of the cane mask, such as the point within the area of the cane mask that is closest to the final two-dimensional grab-point initially set in step S3903e.

In a preferred embodiment of the present invention, a grab-point angle is determined for the final two-dimensional grab-point. An example of the process used to determine the grab-point angle is shown in the flowchart of FIG. 38B. In step S3801, the agricultural feature locations 85 between which the final two-dimensional grab-point (e.g., the two-dimensional grab-point 168b) was generated are identified. For example, as shown in FIG. 38A, the agricultural feature location 85-2 and the agricultural feature location 85-3 between which the two-dimensional grab-point 168b was generated are identified. In step S3802, an angle of the portion of the particular segment/individual component of the agricultural item on which the final two-dimensional grab-point (e.g., the two-dimensional grab-point 168b) is located is determined using the agricultural feature locations identified in step S3801. For example, the angle of the portion of cane on which the final two-dimensional grab-point (e.g., the two-dimensional grab-point 168b) is located is determined by forming a first line that connects the agricultural feature location 85-2 and the agricultural feature location 85-3. Once the angle of the portion of the particular segment/individual component of the agricultural item on which the final two-dimensional grab-point (e.g., the two-dimensional grab-point 168b) is located is determined in step S3802, a grab-point angle for the final two-dimensional grab-point can be determined in step S3803 by forming a second line at an angle with respect to the first line, for example, perpendicular to the first line. The second line can also be formed at another angle with respect to the first line, such as about 30 degrees or about 45 degrees with respect to the first line, for example. The angle of the second line defines the grab-point angle of the final two-dimensional grab-point, which is an angle with respect to the particular segment/individual component of the agricultural item on which the final two-dimensional grab-point is located. FIG. 38A shows an example of a first line 167 and a second line 169 for the final two-dimensional grab-point for the left cane (e.g., the two-dimensional grab-point 168a).

Figure 40:
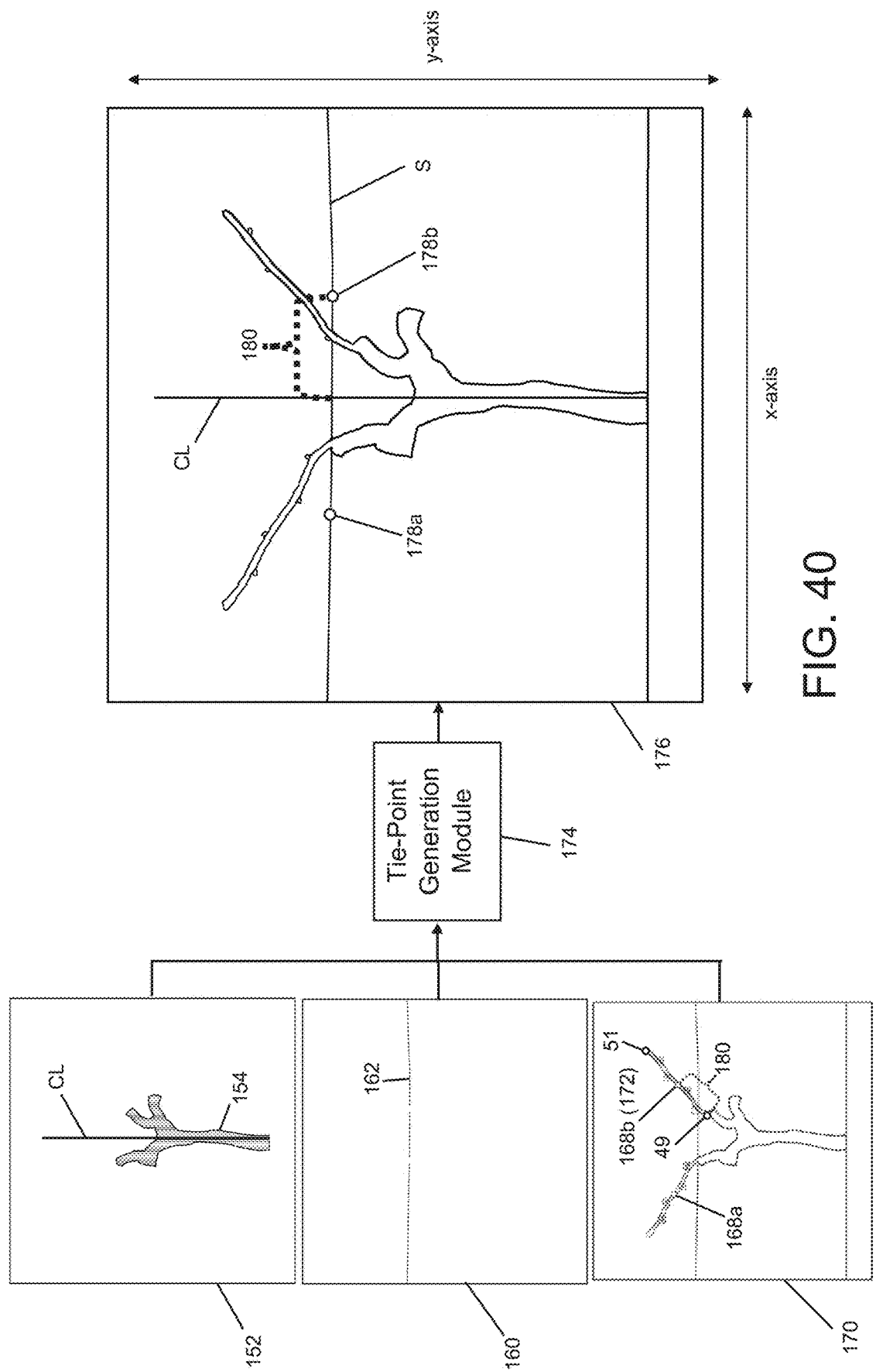
FIG. 40 shows an example of a tie-point generation step according to a preferred embodiment of the present invention.

In a preferred embodiment of the present invention, the tie-point generation step S2808 includes using a tie-point generation module 174 to generate a two-dimensional tie-point. When the support structure S is a trellis wire, the tie-point generation module 174 generates a two-dimensional tie-point on/for the trellis wire. Preferably, the tie-point generation module 174 generates a two-dimensional tie-point for each of the canes included in the grape vine (e.g., each of the canes for which a final two-dimensional grab-point was generated). For illustrative purposes, FIG. 40 shows an example of a two-dimensional tie-point 178a (a two-dimensional tie-point for the left cane) and a two-dimensional tie-point 178b (a two-dimensional tie-point for the right cane) on a tie-point image 176. The location of each of the two-dimensional tie-points 178a and 178b can be represented by an x-coordinate and a y-coordinate. For example, the location of the two-dimensional tie-points can be defined by the x-coordinate and y-coordinate of the pixel of the tie-point image 176 that includes the two-dimensional tie-point.

As shown in FIG. 40, the tie-point generation module 174 receives inputs including the base component mask 154 of the segmented image 152 generated by the semantic segmentation AI architecture 150 during the base component segmentation step S2805, the support structure (e.g., trellis wire) mask 162 of the segmented image 160 generated by the semantic segmentation AI architecture 150 during the support structure segmentation step S2806, and the two-dimensional grab-point (e.g., the two-dimensional grab-point 168a or the two-dimensional grab-point 168b) of the grab-point image 170 generated during the grab-point generation step S2807. For example, FIG. 40 shows that the inputs to the tie-point generation module 174 include the base component mask 154 of the segmented image 152, the support structure (e.g., trellis wire) mask 162 of the segmented image 160, and the two-dimensional grab-point (e.g., two-dimensional grab-point 168a and two-dimensional grab-point 168b) of the grab-point image 170, which were each generated using the image 44 generated from the data captured during the data capture step S2801.

Figure 41:
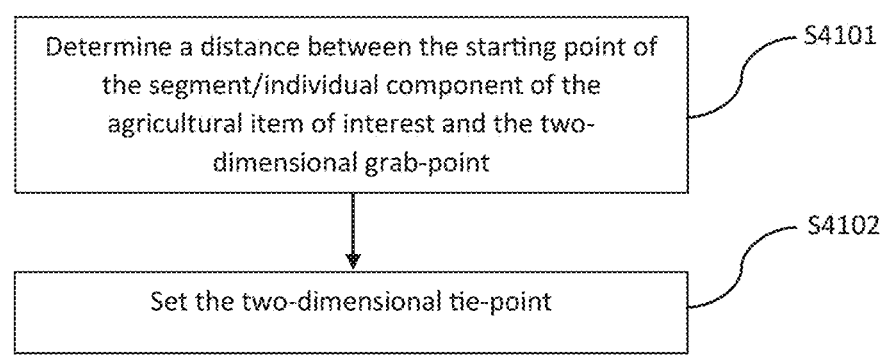
FIG. 41 is a flow chart that shows an example of a tie-point generation step according to a preferred embodiment of the present invention.

In a preferred embodiment of the present invention, the tie-point generation module 174 performs a tie-point distancing step S4101 and a tie-point determination step S4102 to generate a two-dimensional tie-point. FIG. 41 shows a flow chart of the tie-point generation step S2808 including the tie-point distancing step S4101 and a tie-point determination step S4102. In the example discussed below, the tie-point generation module 174 generates a two-dimensional tie-point 178b, which is a two-dimensional tie-point for a right cane of the agricultural item of interest shown in FIG. 40. The tie-point generation module 174 can similarly generate a two-dimensional tie-point 178a, which is a two-dimensional tie-point for a left cane of the agricultural item of interest shown in FIG. 40.

In the tie-point distancing step S4101, the tie-point generation module 174 determines a distance between a starting point of the segment/individual component of the agricultural item of interest A (e.g., the starting point 49 of the second cane mask 50) and the two-dimensional grab-point (e.g., the two-dimensional grab-point 168b). For example, as shown in FIG. 40, the tie-point generation module 174 can determine the distance 180 between the starting point of the cane mask (e.g., the starting point 49 of the second cane mask 50) and the two-dimensional grab-point (e.g., the two-dimensional grab-point 168b). Once the distance 180 has been determined in the tie-point distancing step S4101, the process proceeds to the tie-point determination step S4102.

In the tie-point determination step S4102, the tie-point generation module 174 sets the tie-point at a location that falls/lies on the support structure S and is spaced away from the center line CL of the base component mask 154 by the distance 180 (the distance between the starting point of the cane mask and the two-dimensional grab-point) and to a same side of the center line CL as the two-dimensional grab-point. For example, in FIG. 40, the tie-point generation module 174 sets the tie-point 178b at a location that falls/lies on the support structure S and is spaced away from the center line CL of the base component mask 154 by the distance 180 (the distance between the starting point of the cane mask and the two-dimensional grab-point) and to a same side of the center line CL of the base component mask 154 as the two-dimensional grab-point 168b. In a preferred embodiment, the tie-point generation module 174 can set the tie-point at a location that falls/lies on the support structure S based on the support structure (e.g., trellis wire) mask 162. For example, the tie-point generation module 174 can trace/follow the support structure (e.g., trellis wire) mask 162 from the center line CL of the base component mask 154 towards the same side of the center line CL as the two-dimensional grab-point by the distance 180 (the distance between the starting point of the cane mask and the two-dimensional grab-point).

Figure 42:
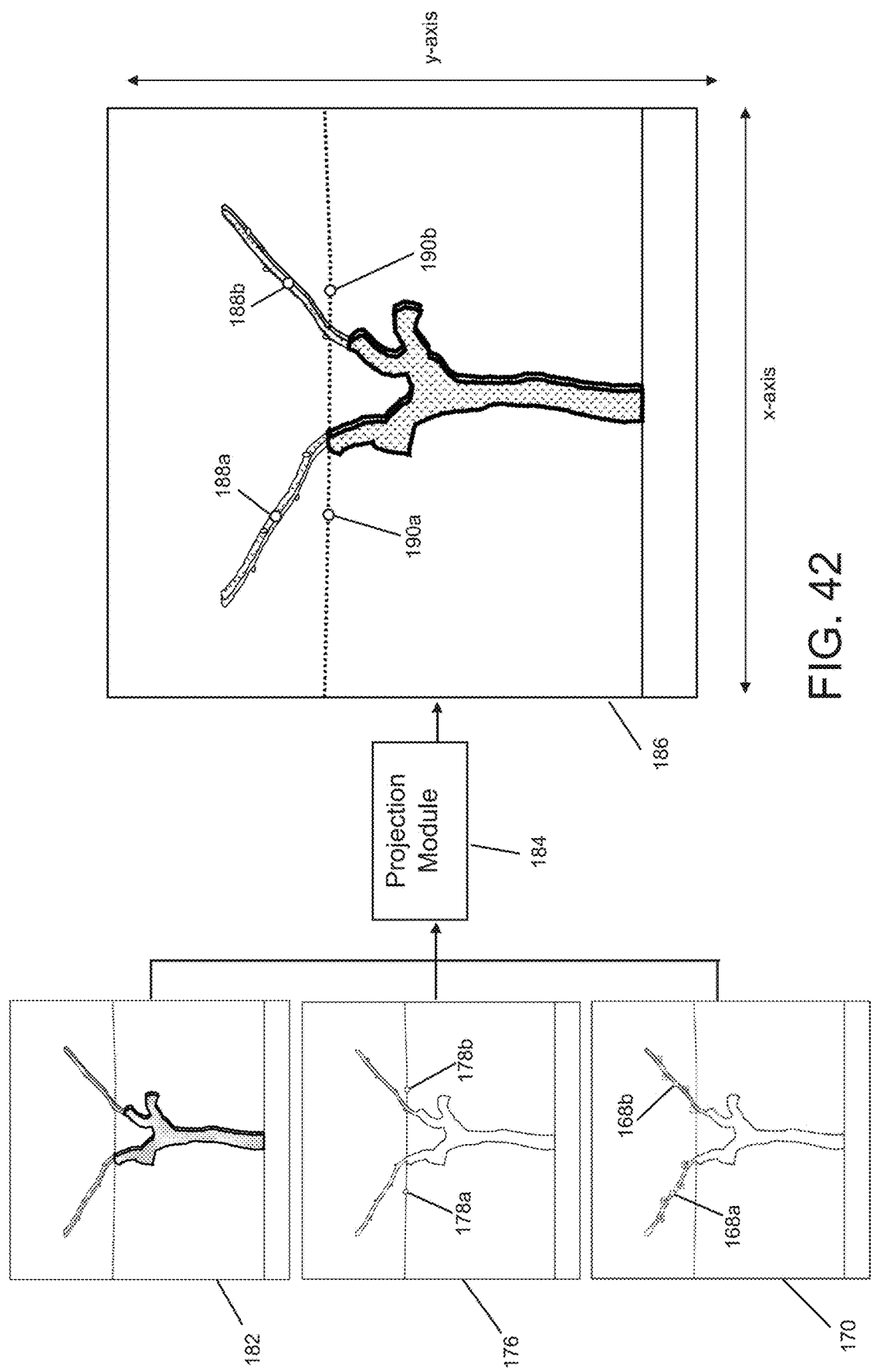
FIG. 42 shows an example of a projection step according to a preferred embodiment of the present invention.

In a preferred embodiment of the present invention, the projection step S2809 includes using a projection module 184 to generate a three-dimensional grab-point 188 and a three-dimensional tie-point 190. For example, as shown in FIG. 42, the projection module 184 can generate a three-dimensional grab-point 188a and a three-dimensional tie-point 190a for a first segment/individual component of the agricultural item of interest A (e.g., a first cane of the grape vine), and a three-dimensional grab-point 188b and a three-dimensional tie-point 190b for a second segment/individual component of the agricultural item of interest A (e.g., a second cane of the grape vine). As shown in FIG. 42, the projection module 184 receives inputs including a depth estimation of the agricultural item of interest A and the support structure S (e.g., a point cloud 182 generated during a point cloud generation step S2802B using the data captured by the camera 20 in the data capture step S2801), a two-dimensional grab-point (e.g., two-dimensional grab-point 168a and two-dimensional grab-point 168b) included in the grab-point image 170, and a two-dimensional tie-point (e.g., two-dimensional tie-point 178a and two-dimensional tie-point 178b) included in the tie-point image 176. The depth estimation of the agricultural item of interest A and the support structure S can alternatively be obtained from a LIDAR sensor, a time-of-flight (TOF) sensor, or another depth sensor that can generate a depth estimation of the agricultural item of interest and the support structure. For example, the depth estimation of the agricultural item of interest and the support structure can be obtained from point cloud data generated by a LIDAR sensor that has been calibrated to have a coordinate system that is aligned with a coordinate system of the camera 20.

The projection module 184 outputs a three-dimensional grab-point (three-dimensional grab-point 188a and three-dimensional grab-point 188b) and a three-dimensional tie-point (three-dimensional tie-point 190a and three-dimensional tie-point 190b), as shown in FIG. 42, for example. For illustrative purposes, in FIG. 42, the three-dimensional grab-point and a three-dimensional tie-point are shown on an image of a three-dimensional point cloud 186. The projection module 184 generates a three-dimensional grab-point (e.g., the three-dimensional grab-point 188b) by determining a depth value of the corresponding two-dimensional grab-point (e.g., the two-dimensional grab-point 168b) based on the depth estimation of the agricultural item of interest A to generate the three-dimensional grab-point (e.g., the three-dimensional grab-point 188b) that corresponds to the two-dimensional grab-point (e.g., the two-dimensional grab-point 168b). For example, a coordinate (a pixel) of the grab-point image 170 that includes the two-dimensional grab-point (e.g., the two-dimensional grab-point 168b) can be identified, and then a corresponding coordinate can be identified in the depth estimation of the agricultural item of interest A, such as a corresponding coordinate in the point cloud 182 generated using the data captured by the camera 20 in the data capture step S2801. The depth value of the corresponding coordinate from the depth estimation of the agricultural item of interest A can be used as the depth value of the two-dimensional grab-point (e.g., the two-dimensional grab-point 168b). In this way, the two-dimensional grab-point (e.g., the two-dimensional grab-point 168b) can be projected to a three-dimensional grab-point (e.g., the three-dimensional grab-point 188b) that includes X, Y, and Z coordinates.

Similarly, the projection module 184 generates a three-dimensional tie-point (e.g., the three-dimensional tie-point 190b) by determining a depth value of a corresponding two-dimensional tie-point (e.g., the two-dimensional tie-point 178b) based on the depth estimation of the support structure S to generate the three-dimensional tie-point (e.g., the three-dimensional tie-point 190b) that corresponds to the two-dimensional tie-point (e.g., the two-dimensional tie-point 178b). For example, a coordinate (a pixel) of the tie-point image 176 that includes the two-dimensional tie-point (e.g., the two-dimensional tie-point 178b) can be identified, and then a corresponding coordinate can be identified in the depth estimation of the support structure S, such as the corresponding coordinate in the point cloud 182 generated using the data captured by the camera 20 in the data capture step S2801. The depth value of the corresponding coordinate from the depth estimation of the support structure S can be used as the depth value of the two-dimensional tie-point (e.g., the two-dimensional tie-point 178b). In this way, the two-dimensional tie-point (e.g., the two-dimensional tie-point 178b) can be projected to a three-dimensional tie-point (e.g., three-dimensional tie-point 190b) that includes X, Y, and Z coordinates.

In an alternative preferred embodiment of the present invention, the projection step S2809 can include the projection module 184 generating the three-dimensional grab-point 188 and the three-dimensional tie-point 190 based on inputs including a disparity map of the agricultural item of interest A and the support structure S, a two-dimensional grab-point (e.g., two-dimensional grab-point 168a and two-dimensional grab-point 168b) included in the grab-point image 170, and a two-dimensional tie-point (e.g., two-dimensional tie-point 178a and two-dimensional tie-point 178b) included in the tie-point image 176. The disparity map of the agricultural item of interest A and the support structure S can be generated using a plurality of approaches including an Artificial Intelligence (AI) Deep Learning approach or a Classic Computer Vision approach (e.g., a Stereo Semi Global Block Matching (SGMB) function) based on rectified stereo image pair of the agricultural item of interest A and the support structure S. For example, the disparity map of the agricultural item of interest A and the support structure S can be generated using an Artificial Intelligence (AI) Deep Learning approach (e.g., a stereomatching AI framework such as a RAFT-Stereo architecture) based on rectified stereo image pair of the agricultural item of interest A and the support structure S. Alternatively, AI Deep Learning approaches such as EdgeStereo, HSM-Net, LEAStereo, MC-CNN, LocalExp, CRLE, HITNet, NOSS-ROB, HD3, gwcnet, PSMNet, GANet, DSMNet can be used to generate the disparity map.

The projection module 184 can generate a three-dimensional grab-point (e.g., the three-dimensional grab-point 188b) by slicing the location of a two-dimensional grab-point (e.g., the two-dimensional grab-point 168b) from the disparity map, and reprojecting the sliced disparity with known camera configurations of the camera (e.g., camera 20) to generate the three-dimensional grab-point (e.g., the three-dimensional grab-point 188b) that corresponds to the two-dimensional grab-point (e.g., the two-dimensional grab-point 168b). For example, a coordinate (a pixel) of the grab-point image 170 that includes the two-dimensional grab-point (e.g., the two-dimensional grab-point 168b) can be identified, and then a corresponding pixel can be identified in the disparity map. The depth value of the corresponding pixel from the disparity map can be used as the depth value of the two-dimensional grab-point (e.g., the two-dimensional grab-point 168b). In this way, the two-dimensional grab-point can be projected to a three-dimensional grab-point that includes X, Y, and Z coordinates.

Similarly, the projection module 184 generates a three-dimensional tie-point (e.g., the three-dimensional tie-point 190b) by slicing the location of a two-dimensional tie-point (e.g., the two-dimensional tie-point 178b) from the disparity map, and reprojecting the sliced disparity with known camera configurations of the camera (e.g., camera 20) to generate the three-dimensional tie-point (e.g., the three-dimensional tie-point 190b) that corresponds to the two-dimensional tie-point (e.g., the two-dimensional tie-point 178b). For example, a coordinate (a pixel) of the tie-point image 176 that includes the two-dimensional tie-point (e.g., the two-dimensional tie-point 178b) can be identified, and then a corresponding pixel can be identified in the disparity map. The depth value of the corresponding pixel from the disparity map can be used as the depth value of the two-dimensional tie-point (e.g., the two-dimensional tie-point 178b). In this way, the two-dimensional tie-point can be projected to a three-dimensional tie-point that includes X, Y, and Z coordinates.

Figure 43:
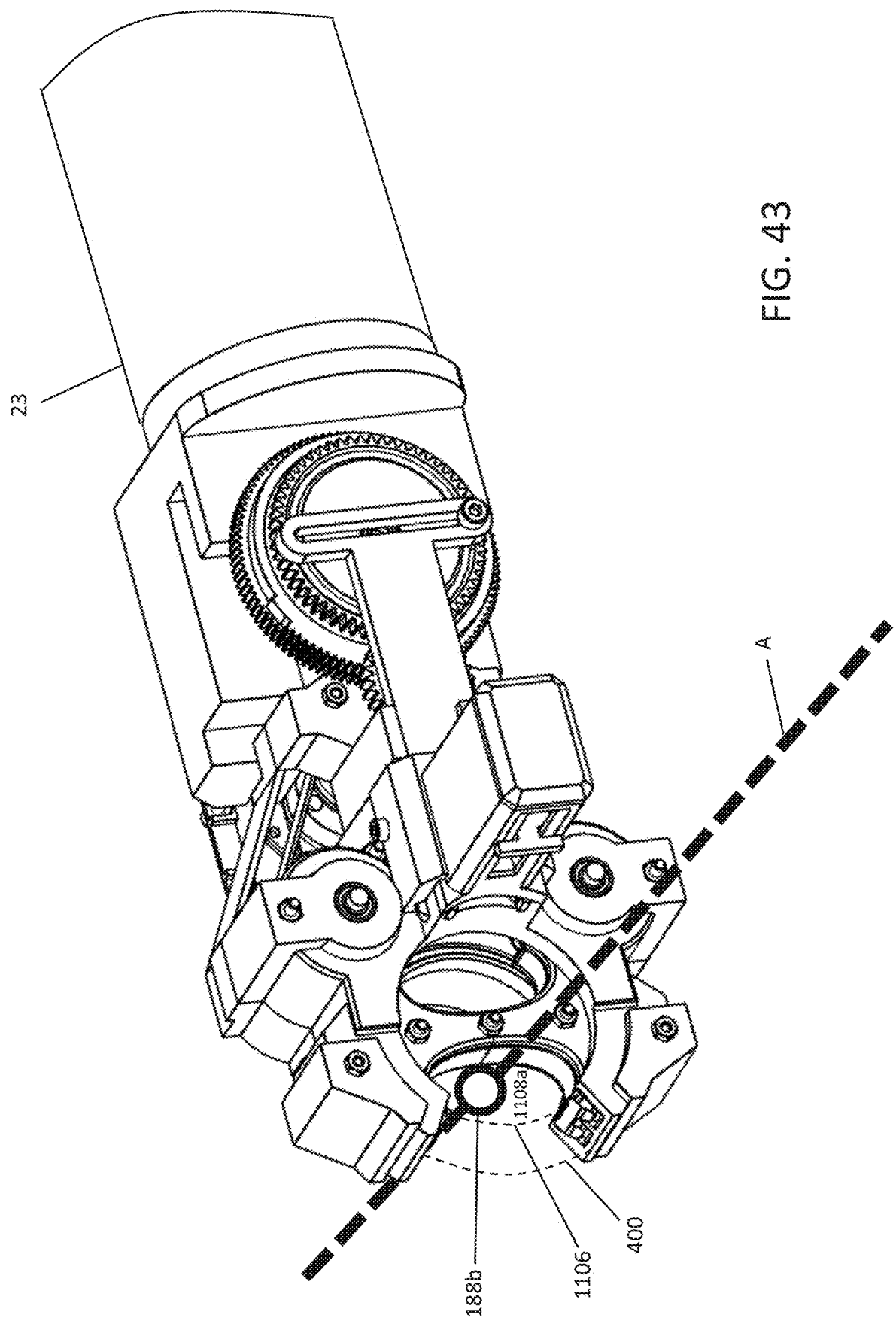
FIG. 43 shows a step of a tying/twisting process performed according to a preferred embodiment of the present invention.

Returning to FIG. 27, in step S2702, the first opening 1106 of the main gear 110 (see FIG. 14, for example) is aligned with the frame opening 400 (see FIG. 6, for example), as shown in FIG. 43, for example. More specifically, in a preferred embodiment, the motor 106 is driven to rotate the main gear 110 such that the first opening 1106 of the main gear 110 is aligned with the frame opening 400 of the frame 104.

In step 2703, the agricultural tool 100 is positioned with respect to the three-dimensional grab-point (e.g., the three-dimensional grab-point 188b). In FIG. 43, the three-dimensional grab-point 188b is shown in relation to the agricultural item of interest A, which is indicated with the dashed line A in FIG. 43. More specifically, in step 2703, the robotic arm 22 and the robotic arm mount assembly 23 to which the agricultural tool 100 is attached are controlled to move the agricultural tool 100 such that the three-dimensional grab-point (e.g., the three-dimensional grab-point 188b) is positioned within the first receiving space 1108a of the main gear 110, as shown in FIG. 43.

Figure 44:
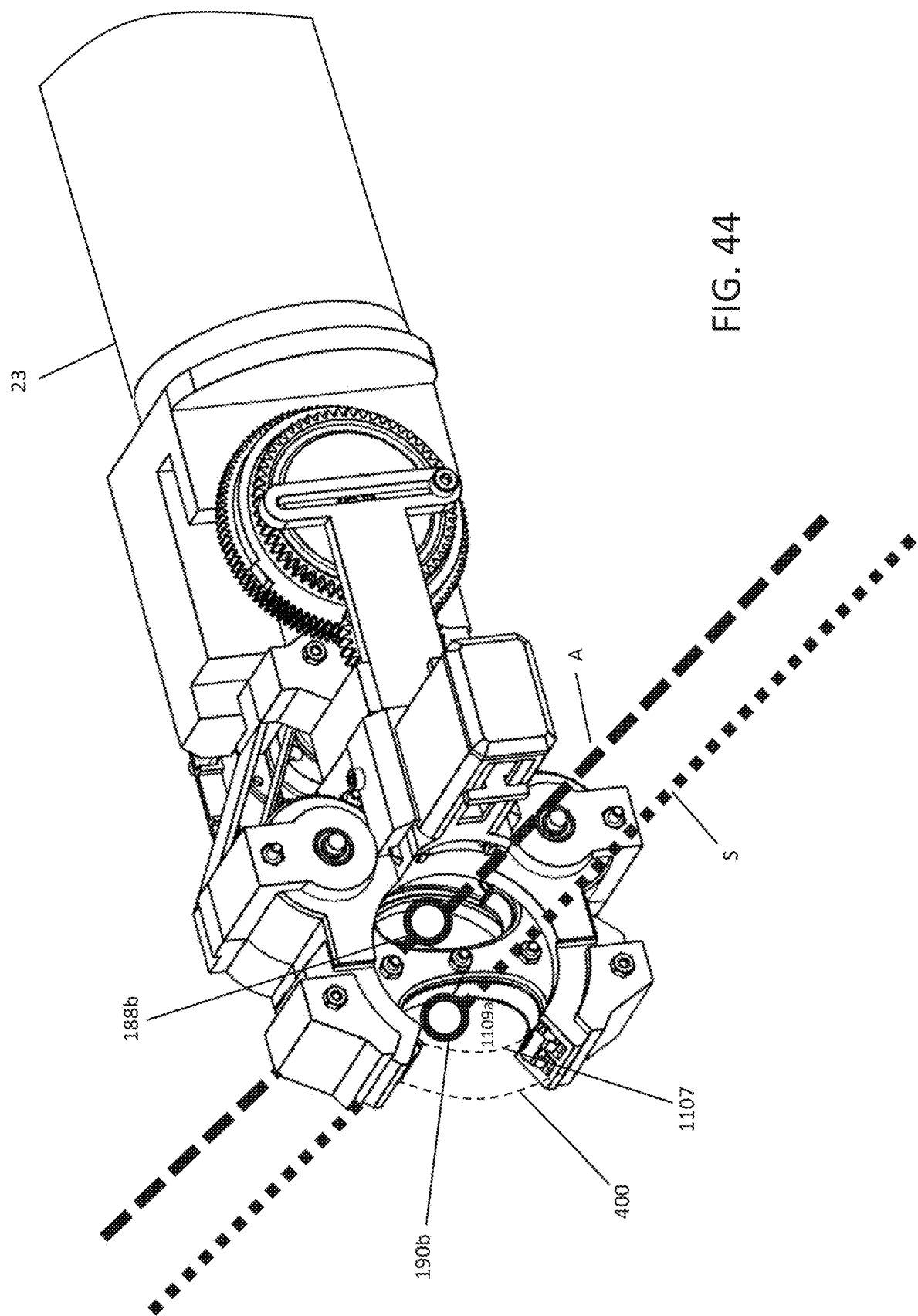
FIG. 44 shows a step of a tying/twisting process performed according to a preferred embodiment of the present invention.

In step 2704, the main gear 110 is rotated to capture the agricultural item of interest A within a first enclosed space defined by the first receiving space 1108a and the frame 104, as shown in FIG. 44, for example. More specifically, the motor 106 is driven by a predetermined amount that causes the main gear 110 to rotate 0.5 rotations, for example, such that the agricultural item of interest A is captured within a first enclosed space defined by the first receiving portion 1108, facing rearwardly after the 0.5 rotations of the main gear 110, and the frame 104. As shown in FIG. 44, the second opening 1107 of the main gear 110 (see FIG. 14, for example) is aligned with the frame opening 400 after the main gear 110 has been rotated in step 2704.

In step 2705, the agricultural tool 100 is positioned with respect to the three-dimensional tie-point (e.g., the three-dimensional tie-point 190b). In FIG. 44, the three-dimensional tie-point (e.g., the three-dimensional tie-point 190b) is shown in relation to the support structure S, which is indicated by the fine dashed line S in FIG. 44. More specifically, in step 2705, the robotic arm 22 and the robotic arm mount assembly 23 to which the agricultural tool 100 is attached are controlled to move the agricultural tool 100 such that the three-dimensional tie-point (e.g., the three-dimensional tie-point 190b) is positioned within the second receiving space 1109a of the main gear 110, as shown in FIG. 44.

Figure 45:
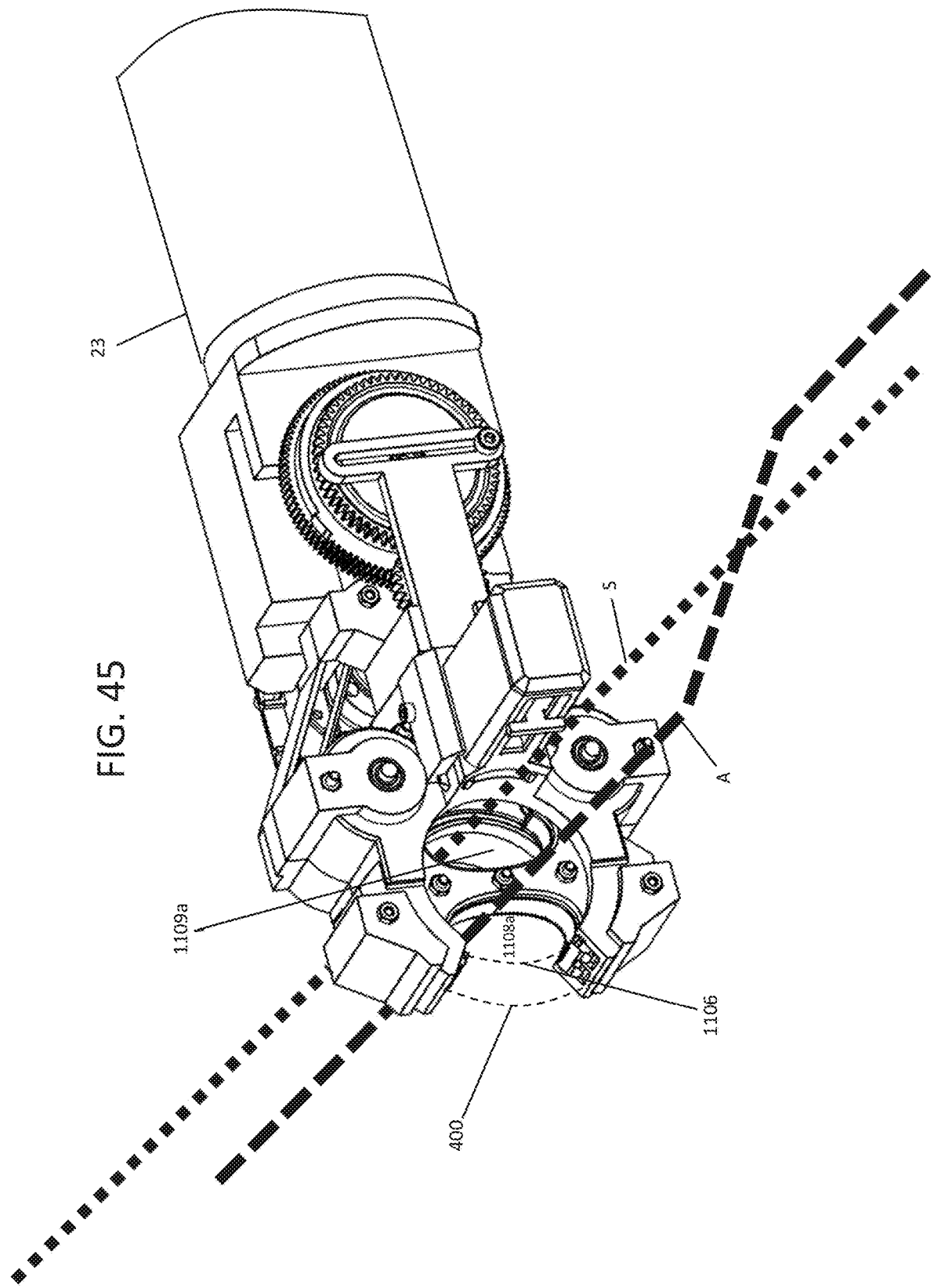
FIG. 45 shows a step of a tying/twisting process performed according to a preferred embodiment of the present invention.

In step 2706, the main gear 110 is rotated to capture the support structure S within a second enclosed space defined by the second receiving portion 1109 and the frame 104, as shown in FIG. 45, for example. More specifically, the motor 106 is driven by a predetermined amount that causes the main gear 110 to rotate 0.5 rotations, for example, such that the support structure S is captured within the second enclosed space defined by the second receiving portion 1109 (facing rearwardly after the 0.5 rotations of the main gear 110 in step S2706) and the frame 104. As shown in FIG. 45, the first opening 1106 of the main gear 110 is aligned with the frame opening 400 after the main gear 110 has been rotated in step 2706, and the agricultural item of interest A remains positioned within the first receiving space 1108a.

Figure 46:
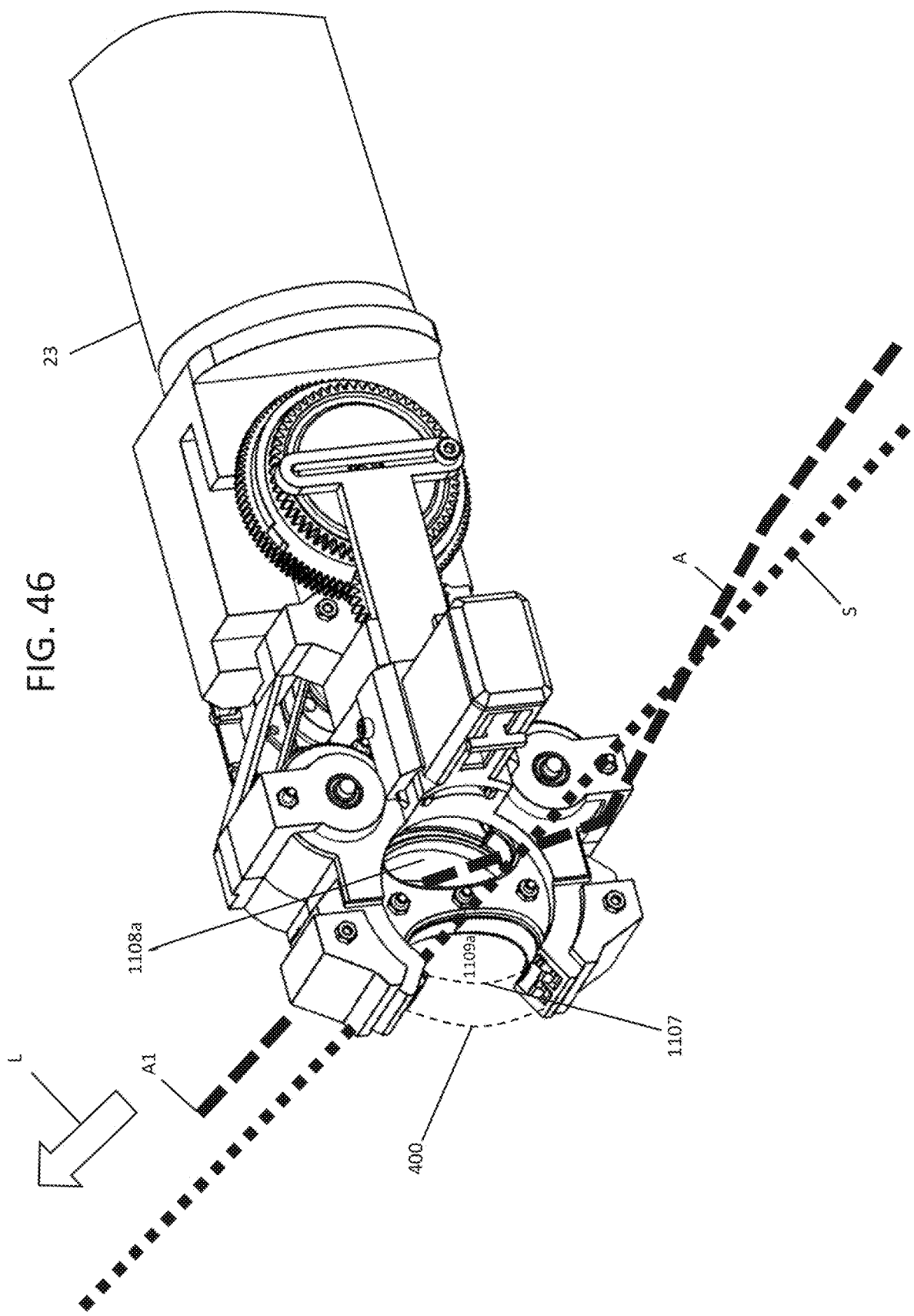
FIG. 46 shows a step of a tying/twisting process performed according to a preferred embodiment of the present invention.

In step 2707, the main gear 110 is further rotated to tie/twist the agricultural item of interest A and the support structure S together, as shown in FIG. 46, for example. More specifically, the motor 106 is driven by a predetermined amount that causes the main gear 110 to rotate 0.5 rotations such that the agricultural item of interest A and the support structure S are twisted/tied together (e.g., the agricultural item of interest A and the support structure S are intertwined). When the agricultural item of interest A and the support structure S are twisted/tied together, the support structure S supports the agricultural item of interest A which has been twisted over and under the support structure S.

In a preferred embodiment of the present invention, the agricultural tool 100 can fasten or attach the agricultural item of interest A to the support structure S using a clip, such as the clip 146 described above. For example, in a preferred embodiment, the agricultural tool 100 can fasten the agricultural item of interest A to the support structure S using the clip 146, after the agricultural item of interest A and the support structure S have been twisted/tied together in step 2707.

Figure 47:
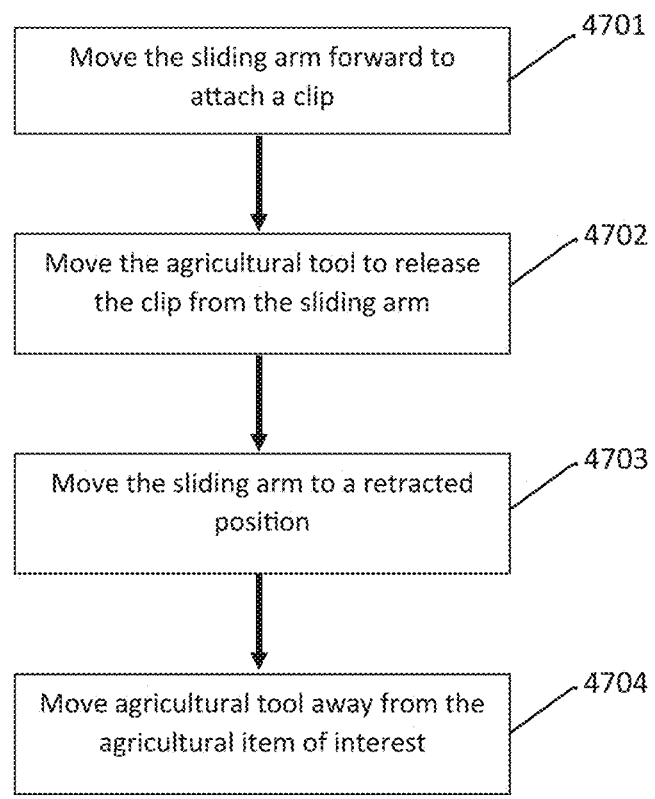
FIG. 47 is a flowchart showing a fastening process performed according to a preferred embodiment of the present invention.

The task of fastening the agricultural item of interest A to the support structure S using a clip is discussed below with reference to steps 4701 through 4704 in the flow chart shown in FIG. 47.

In step 4701, the sliding arm 114 is moved forward from a retracted position to a deployed position to attach a clip 146 to the agricultural item of interest A and the support structure S. More specifically, a forward movement of the sliding arm 114 pushes the agricultural item of interest A and the support structure S through the space 1469 located between the tip of the left protrusion 1468a and the tip of the right protrusion 1468b of the clip 146 and into the clip receiving space 1466 of the clip 146 (see FIG. 25).

In a preferred embodiment of the present invention, the sliding arm 114 starts to move forward from the retracted position (e.g., a rearmost position of the sliding arm 114) towards the deployed position (e.g., a forwardmost position of the sliding arm 114) when the teeth portion 1385 of the timing gear 138 starts to contact and drive the first diameter portion 1401 of the linking gear 140. As discussed above with respect to FIG. 17, the teeth portion 1385 of the timing gear 138 is only attached to a portion of a periphery of the timing gear 138, such that a portion of the periphery of the timing gear 138 does not have teeth attached thereto.

When the timing gear 138 has been rotated such that the teeth portion 1385 contact and drive the first diameter portion 1401 of the linking gear 140, the linking gear 140 is driven, which in turn rotates the sliding arm gear 142 and the bolt or shaft 1424 attached thereto which causes the sliding arm 114 to move in a forward-rearward direction. On the contrary, when the timing gear 138 has been rotated such that the teeth portion 1385 do not contact the first diameter portion 1401 of the linking gear 140, i.e., when a portion of the periphery of the timing gear 138 that does not have teeth attached thereto faces the first diameter portion 1401 of the linking gear 140, then the linking gear 140 is not driven, and the sliding arm 114 does not move in a forward-rearward direction.

In a preferred embodiment of the present invention, a number of teeth of each of the taping gear 134, the base gear 136, the timing gear 138, the linking gear 140, and the sliding arm gear 142 can be set such that the sliding arm 114 starts to move forward from the retracted position towards the deployed position (i.e., when the teeth portion 1385 of the timing gear 138 starts to drive the first diameter portion 1401 of the linking gear 140) after a predetermined number of rotations of the main gear 110 (after the motor 106 has been driven by a predetermined amount). For example, in a preferred embodiment of the present invention, a number of teeth of each of the taping gear 134, the base gear 136, the timing gear 138, the linking gear 140, and the sliding arm gear 142 can be set such that the sliding arm 114 starts to move forward from the retracted position towards the deployed position after the main gear 110 has been rotated 1.5 times, which is a number of rotations of the main gear 110 completed in steps 2704 (0.5 rotations), 2706 (0.5 rotations), and 2707 (0.5 rotations) during which the agricultural item of interest A and the support structure S are tied/twisted together. Thus, the sliding arm 114 can be controlled to start to move forward from a retracted position to a deployed position to attach a clip 146 to the agricultural item of interest A and the support structure S, which have been tied/twisted together, in response to step 2707 in FIG. 27 having been completed.

In step 4702, the agricultural tool 100 is moved to release the clip 146 from the sliding arm 114. For example, in step 4702, the robotic arm 22 to which the agricultural tool 100 (and the sliding arm 114) is attached can be controlled to move the agricultural tool 100 (and the sliding arm 114) laterally, e.g., in the direction of arrow L in FIG. 46 (e.g., away from the center line CL of the base component mask 154), by a first predetermined distance to release the clip 146 from the holder of the sliding arm 114.

In step 4703, the sliding arm 114 is moved back to a retracted position from the deployed position. For example, the motor 106 can be driven in reverse by a predetermined amount to retract the sliding arm 114 from the deployed position to the retracted position.

In step 4704, the agricultural tool 100 (and the sliding arm 114) is moved so that the agricultural item of interest A is no longer located within the first receiving space 1108*a*. For example, in step 4704, the robotic arm 22 to which the agricultural tool 100 is attached can be controlled to move the agricultural tool 100 laterally (e.g., direction of arrow L in FIG. 46) by a second predetermined distance so that the agricultural item of interest A is no longer located within the first receiving space 1108*a*. For example, the agricultural tool 100 can be moved laterally so that an end A1 of the agricultural item of interest A passes through the first receiving space 1108*a* such that the agricultural item of interest A is no longer located within the first receiving space 1108*a*. After the agricultural tool 100 is moved so that the agricultural item of interest A is no longer located within the first receiving space 1108*a*, the agricultural tool 100 can be moved freely (e.g., to a new location). In a preferred embodiment of the present invention, the second predetermined distance in step 4704 is larger than the first predetermined distance in step 4702.

In a preferred embodiment of the present invention discussed above, a number of teeth of each of the taping gear 134, the base gear 136, the timing gear 138, the linking gear 140, and the sliding arm gear 142 can be set such that the sliding arm 114 starts to move forward from the retracted position towards the deployed position (i.e., when the teeth portion 1385 of the timing gear 138 starts to drive the first diameter portion 1401 of the linking gear 140) after a predetermined number of rotations of the main gear 110 (after the motor 106 has been driven by a predetermined amount). Accordingly, the motor 106 (a single motor) can effectively be used to rotate the main gear 110 to tie/twist the agricultural item of interest A and the support structure S together as well as move the sliding arm 114 from a retracted position to deployed position to attach a clip 146 to the agricultural item of interest A and the support structure S which have been tied/twisted together. However, as an alternative, the agricultural tool can include a first motor to rotate the main gear, and a second motor to control the forward-rearward movement of the sliding arm 114.

Figure 48:
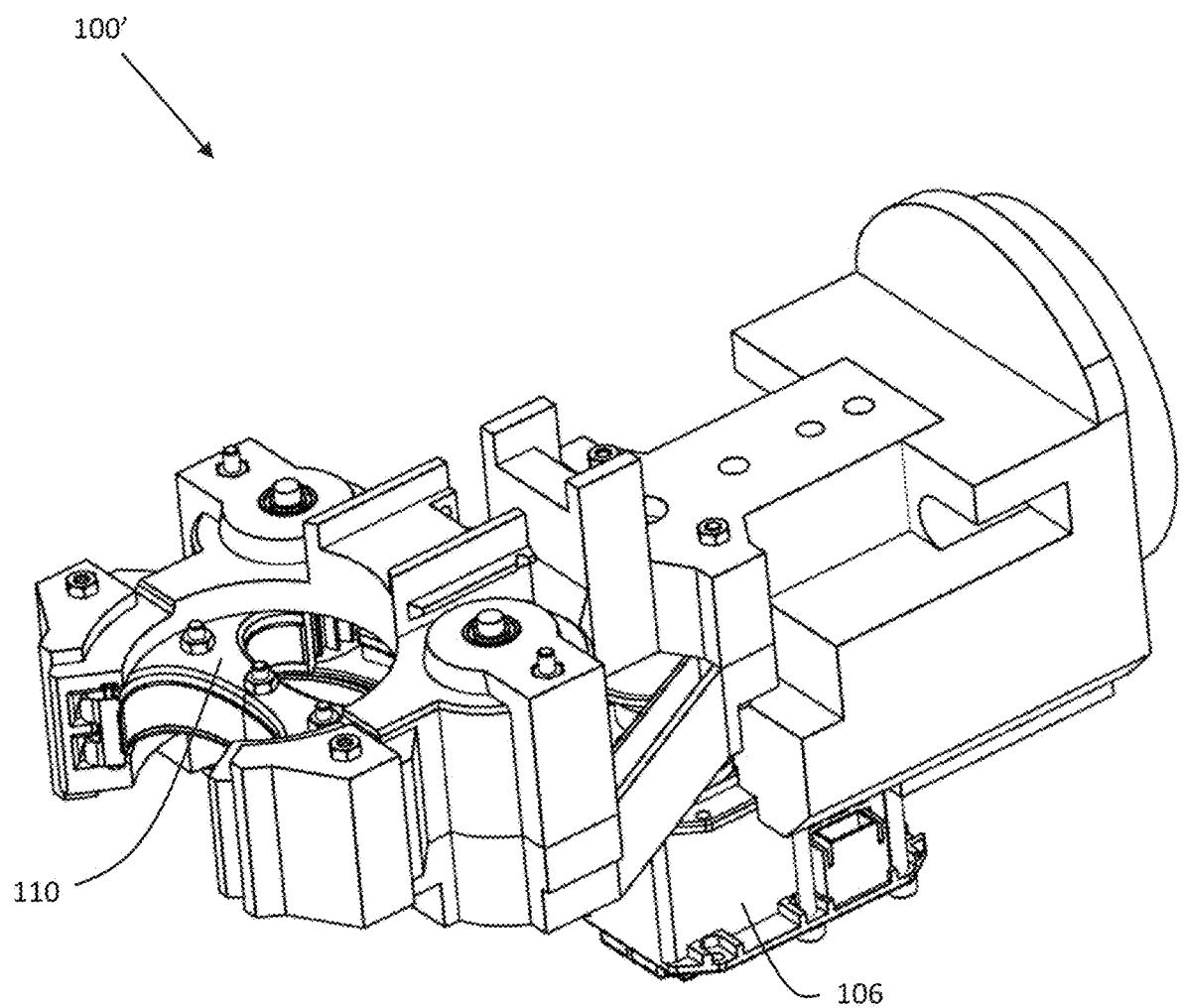
FIG. 48 shows a front perspective view of an agricultural tool according to another preferred embodiment of the present invention.

In a preferred embodiment of the present invention discussed above, the agricultural tool 100 can be used to perform a plurality of tasks including tying/twisting an agricultural item of interest A and a support structure S together, and fastening or attaching the agricultural item of interest A to the support structure S using a clip, such as the clip 146 described above. However, an agricultural tool 100' according to a preferred embodiment may be configured to perform the task of tying/twisting an agricultural item of interest A and a support structure S together without also being configured to perform the task of fastening the agricultural item of interest A to the support structure S using a clip. For example, the agricultural tool 100' shown in FIG. 48 may not include the taping gear 134, the base gear 136, the timing gear 138, the linking gear 140, the sliding arm gear 142, the sliding arm 114, and the magazine 144. Preferably, the agricultural tool 100' may only perform the steps 2702 through 2707 discussed with respect to FIG. 27.

Figure 49:
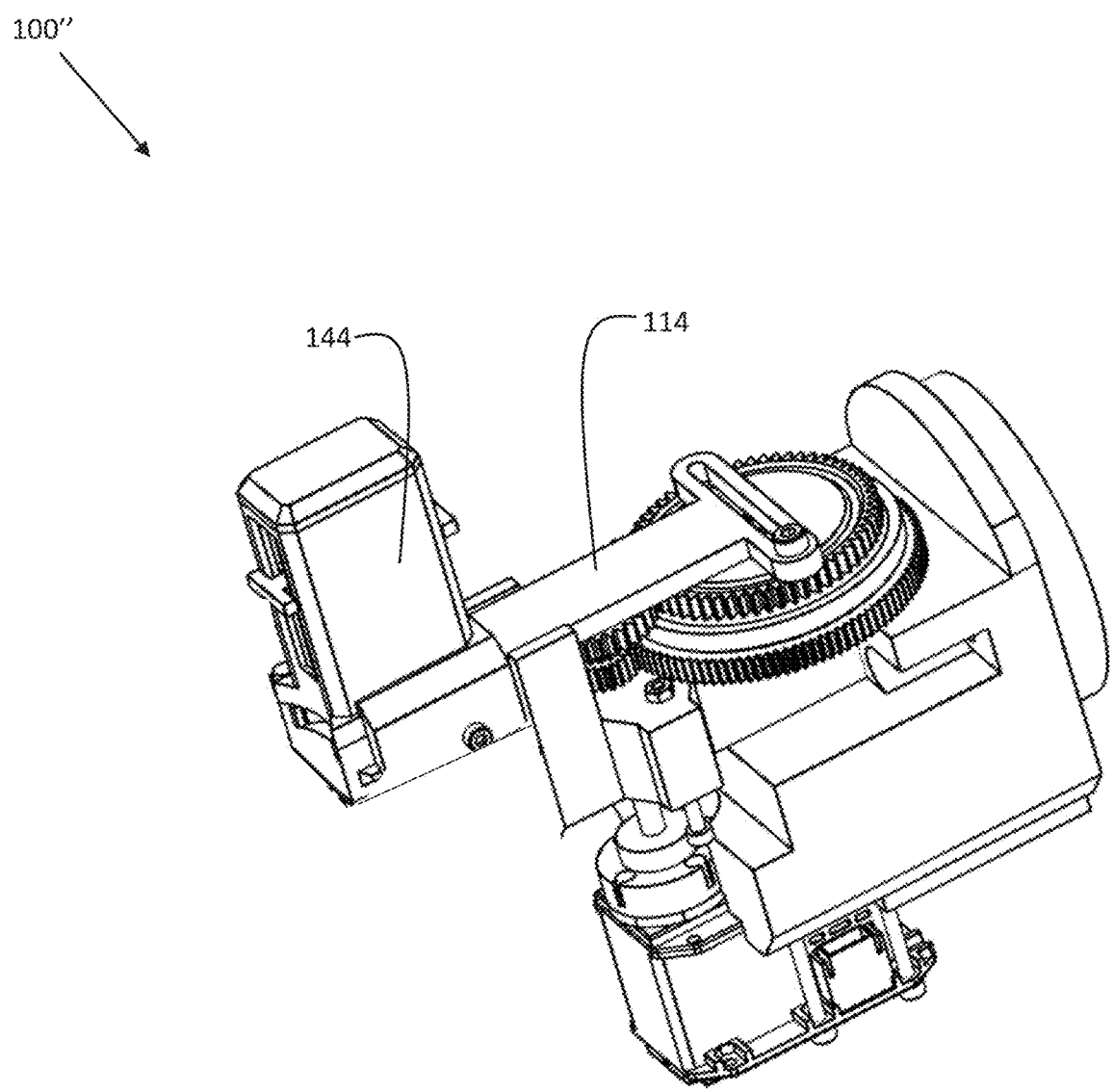
FIG. 49 shows a front perspective view of an agricultural tool according to yet another preferred embodiment of the present invention.

An agricultural tool 100" according to a preferred embodiment may be configured to perform the task of fastening or attaching the agricultural item of interest A to the support structure S using a clip, such as the clip 146, without also being configured to perform the task of tying/twisting an agricultural item of interest A and a support structure S together. For example, the agricultural tool 100" shown in FIG. 49 may not include the motor pulley 116, the belt 118, the first driving pulley 120, the second driving pulley 122, the first driving gear 128, the second driving gear 130, and the main gear 110. Preferably, the agricultural tool 100" may only perform the steps 4701 through 4704 discussed with respect to FIG. 47.

In a preferred embodiment of the present invention, the agricultural tool 100 can include a controller 148 configured or programed to control the motor 106. For example, the controller 148 can be configured or programed to control the timing, and in what direction, the motor 106 is running. For example, the controller 148 can be configured or programed to control the timing, and in what direction, the motor 106 is running in accordance with the steps discussed above with respect to FIGS. 27 and 47. More specifically, in step 2702, the controller 148 can be configured or programed to drive the motor 106 by a predetermined amount, and in a predetermined direction, to rotate the main gear 110 such that the first opening 1106 of the main gear 110 is aligned with the frame opening 400 of the frame 104.

In step 2704, the controller 148 can be configured or programed to drive the motor 106 by a predetermined amount, and in a predetermined direction (forward direction), that causes the main gear 110 to rotate 0.5 rotations such that the agricultural item of interest A is captured within the first enclosed space defined by the first receiving portion 1108 and the frame 104.

In step 2706, the controller 148 can be configured or programed to drive the motor 106 by a predetermined amount, and in a predetermined direction (forward direction) that causes the main gear 110 to rotate 0.5 rotations, for example, such that the support structure S is captured within the second enclosed space defined by the second receiving portion 1109 and the frame 104.

In step 2707, the controller 148 can be configured or programed to drive the motor 106 by a predetermined amount, and in a predetermined direction (forward direction), that causes the main gear 110 to rotate 0.5 rotations, for example, such that the agricultural item of interest A and the support structure S are twisted/tied together.

In step 4701, the controller 148 can be configured or programed to drive the motor 106 by a predetermined amount, and in a predetermined direction (forward direction), that causes the sliding arm 114 to move from a retracted position to a deployed position to attach a clip to the agricultural item of interest A and the support structure S.

In step 4703, the controller 148 can be configured or programed to drive the motor 106 by a predetermined amount, and in a determined direction (reverse direction), that causes the sliding arm 114 to move to a retracted position of the sliding arm 114.

In a preferred embodiment of the present invention, the controller 148 can be located within a housing of the motor 106 as shown in FIG. 4, but may be provided in other locations. Additionally, part or whole of the controller 148 and/or the functional units or blocks thereof as described herein with respect to the various preferred embodiments of the present invention can be implemented in one or more circuits or circuitry, such as an integrated circuit(s) or as an LSI (large scale integration). Each functional unit or block of the controller 148 may be individually made into an integrated circuit chip. Alternatively, part or whole of the functional units or blocks may be integrated and made into an integrated circuit chip. Additionally, the method of forming a circuit or circuitry defining the controller 148 is not limited to LSI, and an integrated circuit may be implemented by a dedicated circuit or a general-purpose processor or controller that is specifically programmed to define a special-purpose processor or controller. Further, if technology of forming an integrated circuit, which replaces LSI, arises as a result of advances in semiconductor technology, an integrated circuit formed by that technology may be used.

Furthermore, a program which is operated in the controller 148 and/or other elements of various preferred embodiments of the present invention, is a program (program causing a computer to perform a function or functions) controlling a controller, in order to realize functions of the various preferred embodiments according to the present invention, including each of the various circuits or circuitry described herein and recited in the claims. Therefore, information which is handled by the controller is temporarily accumulated in a RAM at the time of the processing. Thereafter, the information is stored in various types of circuitry in the form of ROMs and HDDs, and is read out by circuitry within, or included in combination with, the controller as necessary, and modification or write-in is performed thereto. As a recording medium storing the program, any one of a semiconductor medium (for example, the ROM, a nonvolatile memory card or the like), an optical recording medium (for example, a DVD, an MO, an MD, a CD, a BD or the like), and a magnetic recording medium (for example, a magnetic tape, a flexible disc or the like) may be used. Moreover, by executing the loaded program, the functions of the various preferred embodiments of the present invention are not only realized, but the functions of preferred embodiments of the present invention may be realized by processing the loaded program in combination with an operating system or other application programs, based on an instruction of the program.

Moreover, in a case of being distributed in a market, the program can be distributed by being stored in the portable recording medium, or the program can be transmitted to a server computer which is connected through a network such as the Internet. In this case, a storage device of the server computer is also included in preferred embodiments of the present invention. In addition, in the preferred embodiments described above, a portion or an entirety of the various functional units or blocks may be realized as an LSI which is typically an integrated circuit. Each functional unit or block of the controller may be individually chipped, or a portion thereof, or the whole thereof may be chipped by being integrated. In a case of making each functional block or unit as an integrated circuit, an integrated circuit controller that controls the integrated circuits, may be added.

Additionally, the method for making an integrated circuit is not limited to the LSI, and may be realized by a single-purpose circuit or a general-purpose processor that is programmable to perform the functions described above to define a special-purpose computer. Moreover, in a case of an appearance of a technology for making an integrated circuit which replaces the LSI due to an advance of a semiconductor technology, it is possible to use an integrated circuit depending on the technology.

Finally, it should be noted that the description and recitation in claims of this patent application referring to "controller", "circuit", or "circuitry" is in no way limited to an implementation that is hardware only, and as persons of ordinary skill in the relevant art would know and understand, such descriptions and recitations of "controller", "circuit", or "circuitry" include combined hardware and software implementations in which the controller, circuit, or circuitry is operative to perform functions and operations based on machine readable programs, software or other instructions in any form that are usable to operate the controller, circuit, or circuitry.

In a preferred embodiment of the present invention, the motor 106 may not be controlled by the controller 148, or may not fully be controlled by the controller 148. For example, a timing and/or in what direction the motor 106 is running can be controlled by a user operated device or another technique of controlling the motor 106.

In a preferred embodiment of the present invention, the agricultural tool 100 can include a battery which is arranged to supply power to components, such as, the motor 106 and the controller 148, etc. For example, the battery can be a rechargeable battery. Alternatively, components included in the agricultural tool, such as the motor 106 and the controller 148, can be provided power using an external power supply.

In a preferred embodiment of the present invention, the robotic arm 22 discussed above can include a robotic arm known to a person of ordinary skill in the art. For example, the robotic arm 22, also known as an articulated robotic arm, can include a plurality of joints that act as axes that enable a degree of movement, wherein the higher number of rotary joints the robotic arm 22 includes, the more freedom of movement the robotic arm has. For example, the robotic arm 22 can include four to six joints, which provide the same number of axes of rotation for movement.

In a preferred embodiment of the present invention, the controller 148 can be configured or programed to control movement of the robotic arm 22 and/or the robotic arm mount assembly 23. For example, the controller 148 can be configured or programed to control the movement of the robotic arm 22 and/or the robotic arm mount assembly 23 to which the agricultural tool 100 is attached to position the agricultural tool 100 in accordance with the steps (e.g., step 2703, step 2705, step 4702, and step 4704) discussed above with respect to FIGS. 27 and 47. In a preferred embodiment, step 2703, step 2705, step 4702, and step 4704 discussed above with respect to FIGS. 27 and 47 can also be performed by controlling one or more of the horizontal frame motor 28, the vertical frame motor 30, the robotic arm 22, or the robotic arm mount assembly 23 to position the agricultural tool 100. For example, the one or more of the horizontal frame motor 28, the vertical frame motor 30, the robotic arm 22, or the robotic arm mount assembly 23 can be controlled through a Robot Operating System (ROS) and a free-space motion planning framework, such as "MoveIt!", which is used to plan motions of the robotic arm 22 and the agricultural tool 100 between two points in space without collision. For example, the free-space motion planning framework can plan motions of the robotic arm 22 and the agricultural tool 100 between two points in space without colliding into any portion of the agricultural item of interest or the support structure. For example, the controller 148 can be configured or programed to control movement of the robotic arm 22 based on a three-dimensional grab-point and a three-dimensional tie-point as discussed above with respect to FIGS. 27 and 47. In a preferred embodiment, the manipulation step S2810 shown in FIG. 28 includes step 2703 and step 2705 discussed above.

In a preferred embodiment of the present invention, the robotic arm 22 and the robotic arm mount assembly 23 may not be controlled by the controller 148, or may not fully be controlled by the controller 148. For example, movement of the robotic arm 22 and the robotic arm mount assembly 23 can be controlled by a user-operated device or another known technique of controlling a robotic arm and a robotic arm mount assembly. Furthermore, in a preferred embodiment of the present invention that does not include a robotic arm, such as a preferred embodiment in which the base plate 1021 is mounted to another structure such as a handle, the movement of the agricultural tool 100 can be performed by a person holding and moving the handle.

In a preferred embodiment of the present invention discussed above, the agricultural feature detection step S2804, in which a particular agricultural feature of the agricultural item of interest is detected, is distinct from the component segmentation step S2803. However, in another preferred embodiment of the present invention, the component segmentation step S2803 can include identifying the particular agricultural feature of the agricultural item of interest. For example, in a case in which the agricultural item of interest is a grape vine, the component segmentation step S2803 can include identifying the buds of the grape vine when identifying the different segments of the grape vine. For example, the component segmentation step S2803 can be performed using an instance segmentation AI architecture 45 that identifies different segments of the grape vine including each individual bud. In this case, the agricultural feature locations 85 can be determined based on the results of the component segmentation step S2803 such as agricultural feature masks (bud masks) output by the instance segmentation AI architecture 45. Therefore, a separate agricultural feature detection step S2804 may not be necessary.

Alternatively, in another preferred embodiment of the present invention, the agricultural feature detection step S2804 can be performed using a semantic segmentation architecture such as a U-NET semantic segmentation architecture, a Convolutional Neural Network (CNN), a Fully Convolutional Network (FCN), a SegNet, a HRNet, a Feature Pyramid Network (FPN), a Region-Convolutional Neural Network (R-CNN), or a Recurrent Neural Network (RNN). For example, the agricultural feature detection step S2804 can be performed using a semantic segmentation AI architecture that receives the input of the image 44 and outputs a segmented image that includes one or more masks that identify particular agricultural features of the agricultural item of interest (e.g., the buds of the grape vine) included in the image 44 input to the semantic segmentation AI architecture. In this case, the agricultural feature locations 85 can be determined based on the one or more masks included in the segmented image output by the semantic segmentation AI architecture.

In a preferred embodiment of the present invention discussed above, the support structure segmentation step S2806, in which a semantic segmentation AI architecture 150 is used to identify a support structure S, is distinct from the component segmentation step S2803. However, in another preferred embodiment of the present invention, the component segmentation step S2803 can include identifying the support structure. For example, the component segmentation step S2803 can include identifying the support structure S when identifying the different segments of the grape vine. For example, the component segmentation step S2803 can be performed using an instance segmentation AI architecture 45 that identifies different segments of the support structure S and also identifies different segments of the grape vine. In this case, the support structure S can be determined based on the results of the component segmentation step S2803 such as support structure masks output by the instance segmentation AI architecture 45. Therefore, a separate support structure segmentation step S2806 may not be necessary.

In another preferred embodiment of the present invention, the instance segmentation AI architecture 45 can be trained to perform each of the component segmentation step S2803, the agricultural feature detection step S2804, the base component segmentation step S2805, and the support structure segmentation step S2806.

In a preferred embodiment of the present invention, the data and/or images captured or generated during the data capture step S2801, the image generation step S2802, the point cloud generation step S2802B, the component segmentation step S2803, the agricultural feature detection step S2804, the base component segmentation step S2805, the support structure segmentation step S2806, the grab point generation step S2807, the tie point generation step S2808, and the projection step S2809, or portions thereof, can be saved as data structures to perform the various steps discussed above. However, one or more of the data and/or images captured or generated during the data capture step S2801, the image generation step S2802, the point cloud generation step S2802B, the component segmentation step S2803, the agricultural feature detection step S2804, the base component segmentation step S2805, the support structure segmentation step S2806, the grab point generation step S2807, the tie point generation step S2808, and the projection step S2809, or portions thereof, can also be displayed to a user, for example, on the display device 43 or through the user platform.

As discussed above, the processor and memory components of the imaging electronics 42 can be configured or programmed to control the one or more devices, including the camera 20, the robotic arm 22, the robotic arm mount assembly 23, and the agricultural tool 100, as well as be configured or programmed to process image data obtained by the camera 20. In a preferred embodiment of the present invention, the processor and memory components of the imaging electronics 42 are configured or programmed to perform the functions discussed above including the data capture step S2801, the image generation step S2802, the point cloud generation step S2802B, the component segmentation step S2803, the agricultural feature detection step S2804, the base component segmentation step S2805, the support structure segmentation step S2806, the grab point generation step S2807, the tie point generation step S2808, and the projection step S2809. In other words, the processor and memory components of the imaging electronics 42 can be configured or programmed to define and function as components including the instance segmentation AI architecture 45, the object detection model 82, the semantic segmentation AI architecture 150, the grab-point generation module 166, the tie-point generation module 174, and the projection module 184 discussed above.

In a preferred embodiment of the present invention discussed above, the agricultural item of interest is a grape vine. However, preferred embodiments of the present invention are applicable to other agricultural item of interests such as fruit trees and flowering plants such as rose bushes.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. A method comprising:
generating an image;
segmenting the image to identify a component of an agricultural item;
detecting one or more agricultural features of the agricultural item based on the image, the one or more agricultural features being associated with the component of the agricultural item;
generating a two-dimensional grab-point based on the component of the agricultural item and the one or more agricultural features;
generating a three-dimensional grab-point based on the two-dimensional grab-point and a depth estimation of the agricultural item;
segmenting the image to identify a support structure;
generating a two-dimensional tie-point that lies on the support structure;
generating a three-dimensional tie-point based on the two-dimensional tie-point and a depth estimation of the support structure;
positioning an agricultural tool based on the three-dimensional grab-point;
capturing the agricultural item with the agricultural tool that has been positioned based on the three-dimensional grab-point;
positioning the agricultural tool based on the three-dimensional tie-point;
capturing the support structure with the agricultural tool that has been positioned based on the three-dimensional tie-point; and
attaching the agricultural item and the support structure together.

2. The method of claim 1, wherein the segmenting the image to identify the component of the agricultural item includes segmenting the image using an instance segmentation AI architecture.

3. The method of claim 1, further comprising:
determining agricultural feature locations of the one or more agricultural features; and
associating the one or more agricultural features with the component of the agricultural item based on the agricultural feature locations of the one or more agricultural features.

4. The method of claim 3, wherein
the segmenting the image to identify the component of the agricultural item includes generating a segmented image that identifies different components of the agricultural item including the component of the agricultural item;
the segmented image includes masks that identify the different components of the agricultural item;
the masks that identify the different components include a particular mask that identifies the component of the agricultural item; and
the one or more agricultural features are associated with the component of the agricultural item when the agricultural feature locations of the one or more agricultural features are within the particular mask or are within a predetermined distance of the particular mask.

5. The method of claim 1, further comprising:
determining agricultural feature locations of the one or more agricultural features using an object detection model that receives the image and detects the one or more agricultural features within the image.

6. The method of claim 1, further comprising:
segmenting the image to identify a base component of the agricultural item; wherein
the two-dimensional grab-point is generated based on the component of the agricultural item, the one or more agricultural features, and the base component of the agricultural item.

7. The method of claim 6, wherein
the segmenting the image to identify the base component of the agricultural item includes segmenting the image using a semantic segmentation AI architecture.

8. The method of claim 1, further comprising:
determining a proposed location of the two-dimensional grab-point;
determining whether or not the proposed location of the two-dimensional grab-point lies on any of the one or more agricultural features; and
determining a start point and an end point of the component of the agricultural item; wherein
a point between the start point and the end point of the component of the agricultural item is determined as the proposed location of the two-dimensional grab-point.

9. The method of claim 1, further comprising:
determining a proposed location of the two-dimensional grab-point;
determining whether or not the proposed location of the two-dimensional grab-point lies on any of the one or more agricultural features;
setting the proposed location of the two-dimensional grab-point as a final location of the two-dimensional grab-point when the proposed location of the two-dimensional grab-point does not lie on any of the one or more agricultural features; and
setting the final location of the two-dimensional grab-point in a location that does not lie on any of the one or more agricultural features when the proposed location of the two-dimensional grab-point lies on any of the one or more agricultural features.

10. The method of claim 9, wherein
when the proposed location of the two-dimensional grab-point lies on any of the one or more agricultural features and the one or more agricultural features includes a plurality of agricultural features, the location in which the final location of the two-dimensional grab-point is set is between two of the plurality of agricultural features.

11. The method of claim 1, further comprising:
determining an angle of a portion of the component of the agricultural item on which the two-dimensional grab-point is generated; and
determining a grab-point angle of the two-dimensional grab-point based on the angle of the portion of the component of the agricultural item on which the two-dimensional grab-point is generated.

12. The method of claim 1, wherein the segmenting the image to identify the support structure includes segmenting the image using a semantic segmentation AI architecture.

13. The method of claim 1, further comprising:
segmenting the image to identify a base component of the agricultural item; wherein
the two-dimensional tie-point is generated based on the base component of the agricultural item, the support structure, and the two-dimensional grab-point.

14. The method of claim 13, wherein
the two-dimensional tie-point is set at a location that lies on the support structure, is spaced away from the base component of the agricultural item, and is located on a same side of the base component of the agricultural item where the two-dimensional grab-point is located.

15. The method of claim 14, wherein a distance between the base component and the location at which the two-dimensional tie-point is set is based on a distance between a start point of the component of the agricultural item and the two-dimensional grab-point.

16. The method of claim 1, wherein the attaching includes twisting the agricultural item and the support structure such that the agricultural item and the support structure are intertwined.

17. A system comprising:
a camera to capture image data;
one or more processors; and
an agricultural tool; wherein
the one or more processors are configured or programmed to:
generate an image based on the image data;
segment the image to identify a component of an agricultural item;
detect one or more agricultural features of the agricultural item based on the image, the one or more agricultural features being associated with the component of the agricultural item;
generate a two-dimensional grab-point based on the component of the agricultural item and the one or more agricultural features;
generate a three-dimensional grab-point based on the two-dimensional grab-point and a depth estimation of the agricultural item;
segment the image to identify a support structure;
generate a two-dimensional tie-point that lies on the support structure;
generate a three-dimensional tie-point based on the two-dimensional tie-point and a depth estimation of the support structure;
position the agricultural tool based on the three-dimensional grab-point;
control the agricultural tool to capture the agricultural item when the agricultural tool has been positioned based on the three-dimensional grab-point;
position the agricultural tool based on the three-dimensional tie-point;
control the agricultural tool to capture the support structure when the agricultural tool has been positioned based on the three-dimensional tie-point; and
control the agricultural tool to attach the agricultural item and the support structure together.

* * * * *